US012641256B2

(12) United States Patent
Filippov et al.

(10) Patent No.: US 12,641,256 B2
(45) Date of Patent: May 26, 2026

(54) BLOCK VECTOR SIGNALING FOR RECONSTRUCTION-REORDERED INTRA BLOCK COPY

(71) Applicant: Comcast Cable Communications, LLC, Philadelphia, PA (US)

(72) Inventors: Alexey Konstantinovich Filippov, Khimki (RU); Vasily Alexeevich Rufitskiy, Vladimir (RU); Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 70 days.

(21) Appl. No.: 18/530,484

(22) Filed: Dec. 6, 2023

(65) Prior Publication Data

US 2024/0187613 A1      Jun. 6, 2024

Related U.S. Application Data

(60) Provisional application No. 63/430,424, filed on Dec. 6, 2022.

(51) Int. Cl.
H04N 19/176      (2014.01)
H04N 19/103      (2014.01)
H04N 19/593      (2014.01)

(52) U.S. Cl.
CPC ......... H04N 19/176 (2014.11); H04N 19/103 (2014.11); H04N 19/593 (2014.11)

(58) Field of Classification Search
CPC .. H04N 19/103; H04N 19/105; H04N 19/176; H04N 19/593; H04N 19/70
See application file for complete search history.

(56) References Cited

U.S. PATENT DOCUMENTS

| | | | | |
|---|---|---|---|---|
| 9,860,559 B2 | 1/2018 | Zhang et al. | | |
| 2015/0264396 A1* | 9/2015 | Zhang | .................. | H04N 19/593 |
| | | | | 375/240.16 |
| 2015/0373370 A1* | 12/2015 | Rapaka | .................. | H04N 19/52 |
| | | | | 375/240.02 |
| 2017/0195677 A1* | 7/2017 | Ye | ......................... | H04N 19/593 |
| 2020/0404287 A1* | 12/2020 | Xu | ......................... | H04N 19/105 |
| 2021/0235076 A1 | 7/2021 | Xu et al. | | |
| 2022/0182664 A1 | 6/2022 | Xu et al. | | |
| 2023/0100650 A1* | 3/2023 | Bae | ......................... | H04N 19/52 |
| | | | | 375/240.16 |

(Continued)

OTHER PUBLICATIONS

JVET-AA0070-v1, Joint Video Experts Team (JVET) of ITU-T SG 16 WP 3 and ISO/IEC JTC 1/SC 29 27th Meeting, by teleconference, Jul. 13-22, 2022, Source: Bytedance Inc., Title: EE2-3.2: Reconstruction-Reordered IBC for screen content coding.

(Continued)

*Primary Examiner* — Md N Haque
(74) *Attorney, Agent, or Firm* — Banner & Witcoff, Ltd.

(57) ABSTRACT

A block vector predictor (BVP) may be adjusted to provide a more accurate prediction of a block vector (BV). A coder (e.g., encoder or decoder) may determine that the at least one component of the BVD may be equal to zero (or, e.g., null), for example, based on a position of the Current Block (CB) relative to a boundary of the reference region. Consequently, the encoder may skip signaling, and the decoder may skip parsing, of the at least one component of the BVD in the bitstream.

20 Claims, 27 Drawing Sheets

(56) References Cited

U.S. PATENT DOCUMENTS

2023/0291932 A1 * 9/2023 Park ..................... H04N 19/119
2024/0031558 A1 * 1/2024 Jeon ..................... H04N 19/593

OTHER PUBLICATIONS

JVET-Ab2025, Joint Video Experts Team (JVET) of ITU-T SG 16 WP 3 and ISO/IEC JTC 1/SC 29 28th Meeting, Mainz, DE, Oct. 20-28, 2022, Source: Editors, Title: Algorithm Description of Enhanced Compression Model 7 (ECM 7).
JVET-Z0159-v1, Joint Video Experts Team (JVET) of ITU-T SG16 WP3, 26th Meeting, by teleconference, Apr. 20-29, 2022, Source: Bytedance Inc., Title: Non-EE2: Reconstruction-Reordered IBC for screen content coding.
JCTVC-R0204, Joint Collaborative Team on Video Coding (JCT-VC) of ITU-T SG16 WP3, 18th Meeting, Sapporo, Japan, Jun. 30-Jul. 9, 2014, Source: MediaTek, Title: Non-SSCE1: PU intra block copy with flipping mode.
Jan. 29, 2024—European Search Report—EP App. No. 23214723.1.

* cited by examiner

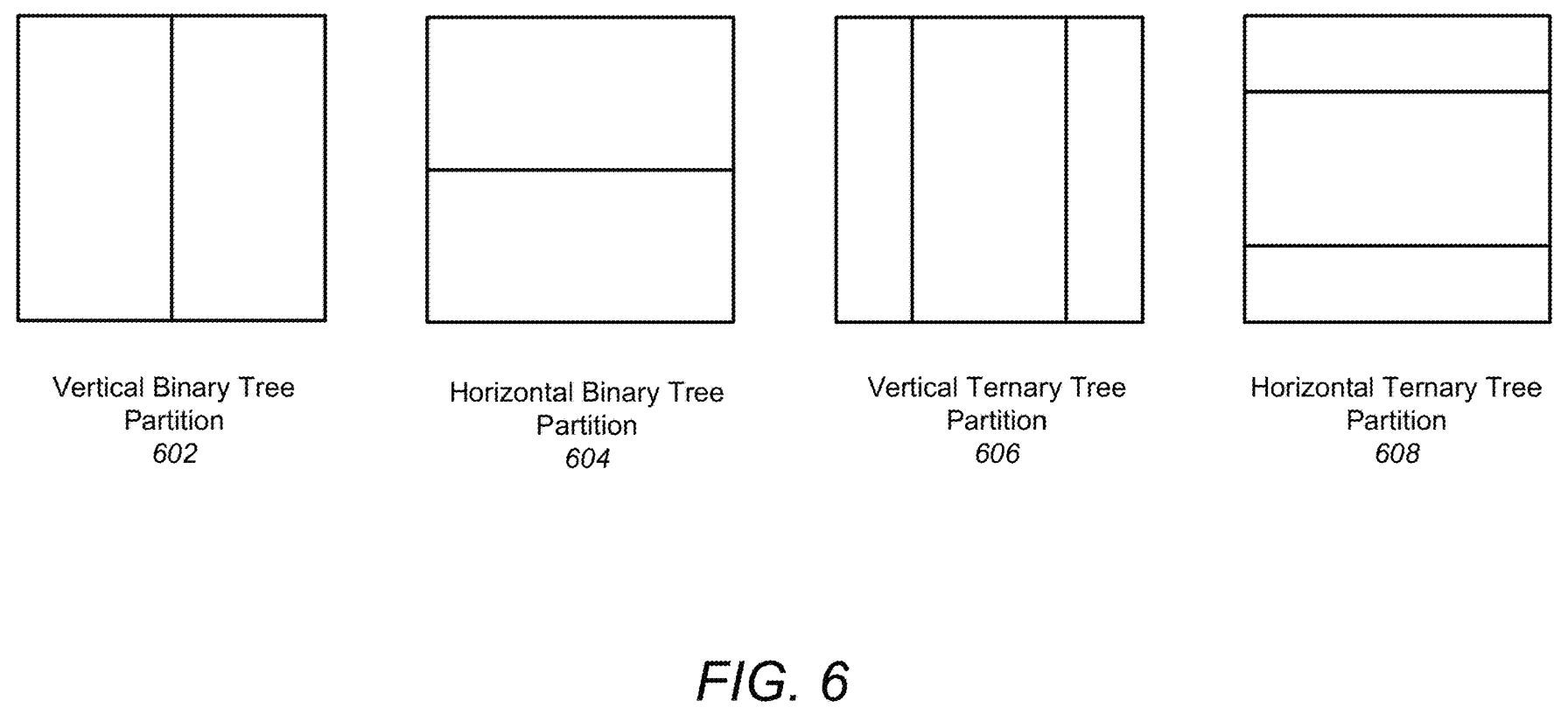

Horizontal Ternary Tree
Partition
608

Vertical Ternary Tree
Partition
606

Horizontal Binary Tree
Partition
604

Vertical Binary Tree
Partition
602

*FIG. 6*

Current
Block
1500

Current
Block
1500

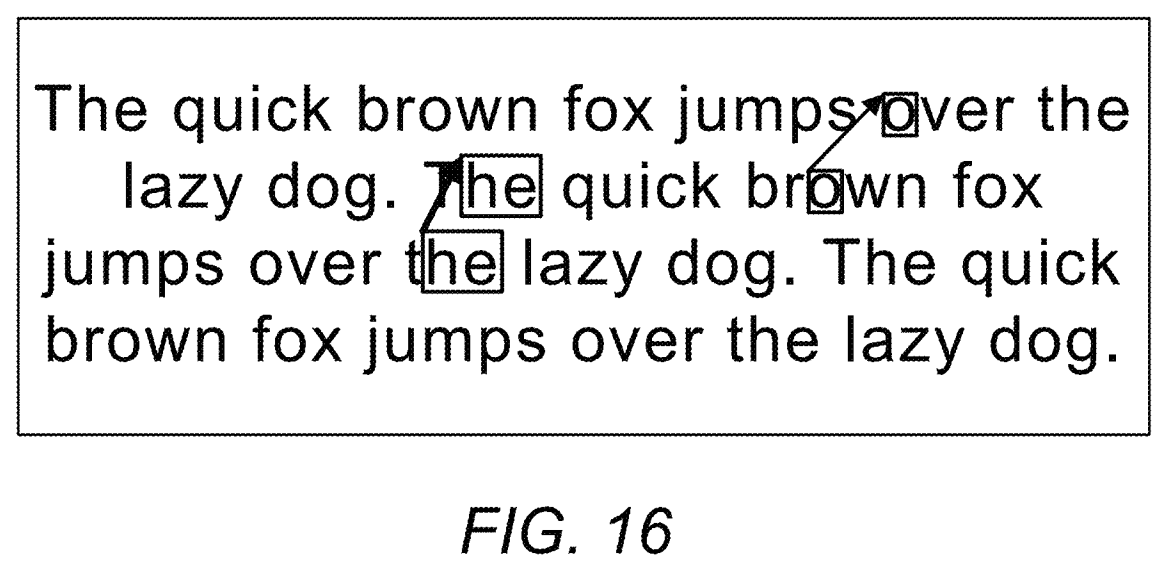

The quick brown fox jumps over the lazy dog. The quick brown fox jumps over the lazy dog. The quick brown fox jumps over the lazy dog.

*FIG. 16*

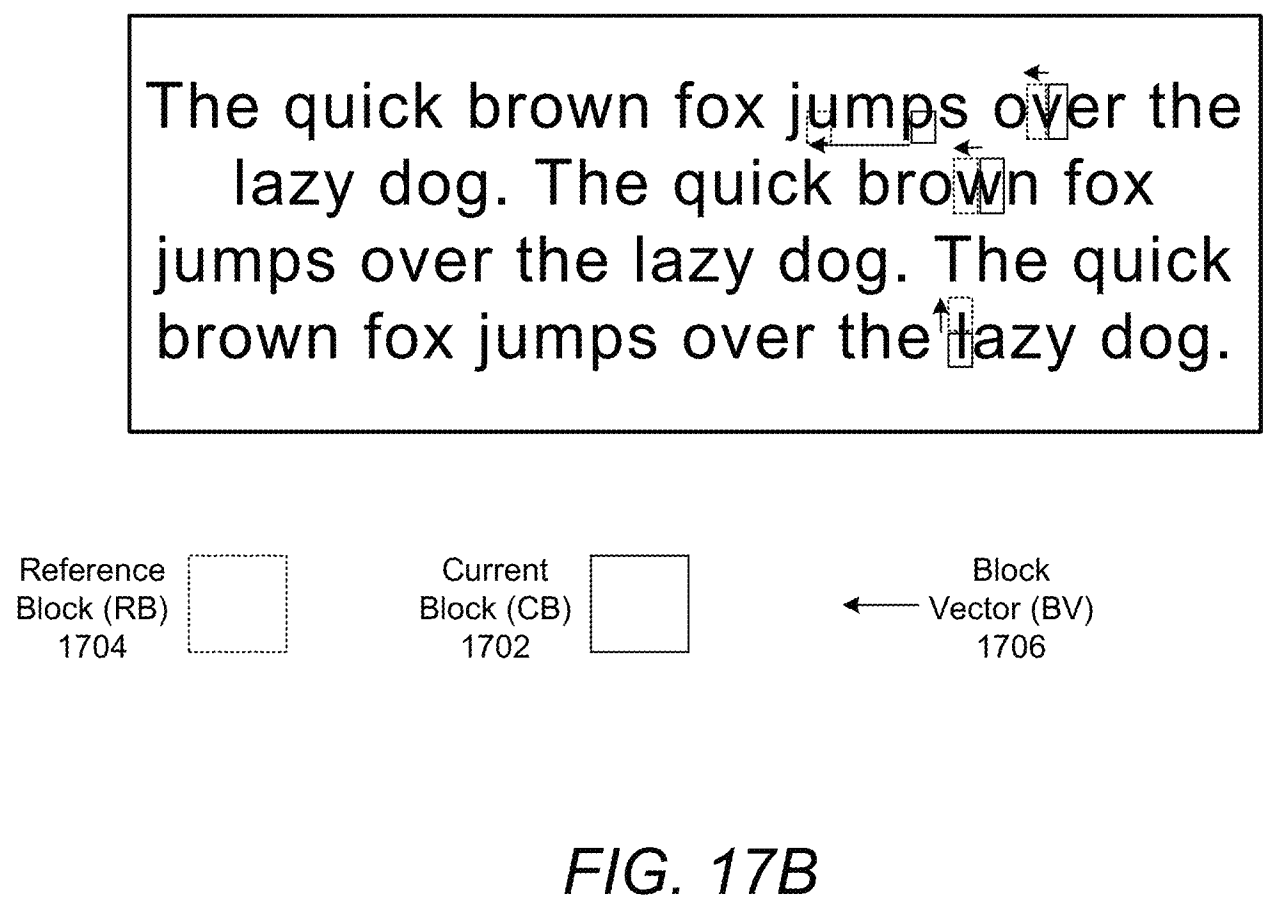

The quick brown fox jumps over the lazy dog. The quick brown fox jumps over the lazy dog. The quick brown fox jumps over the lazy dog.

Current
Block (CB)
1702

Reference
Block (RB)
1704

Block
Vector (BV)
1706

*FIG. 17B*

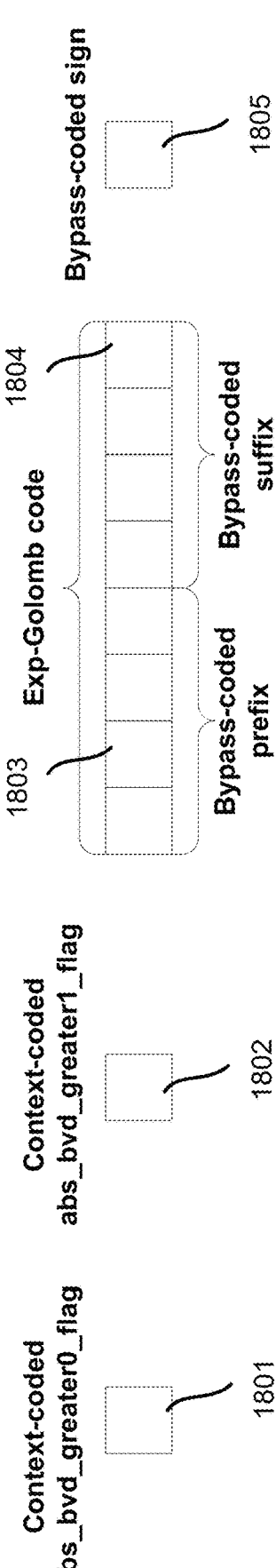
*FIG. 18*

Figure 25:
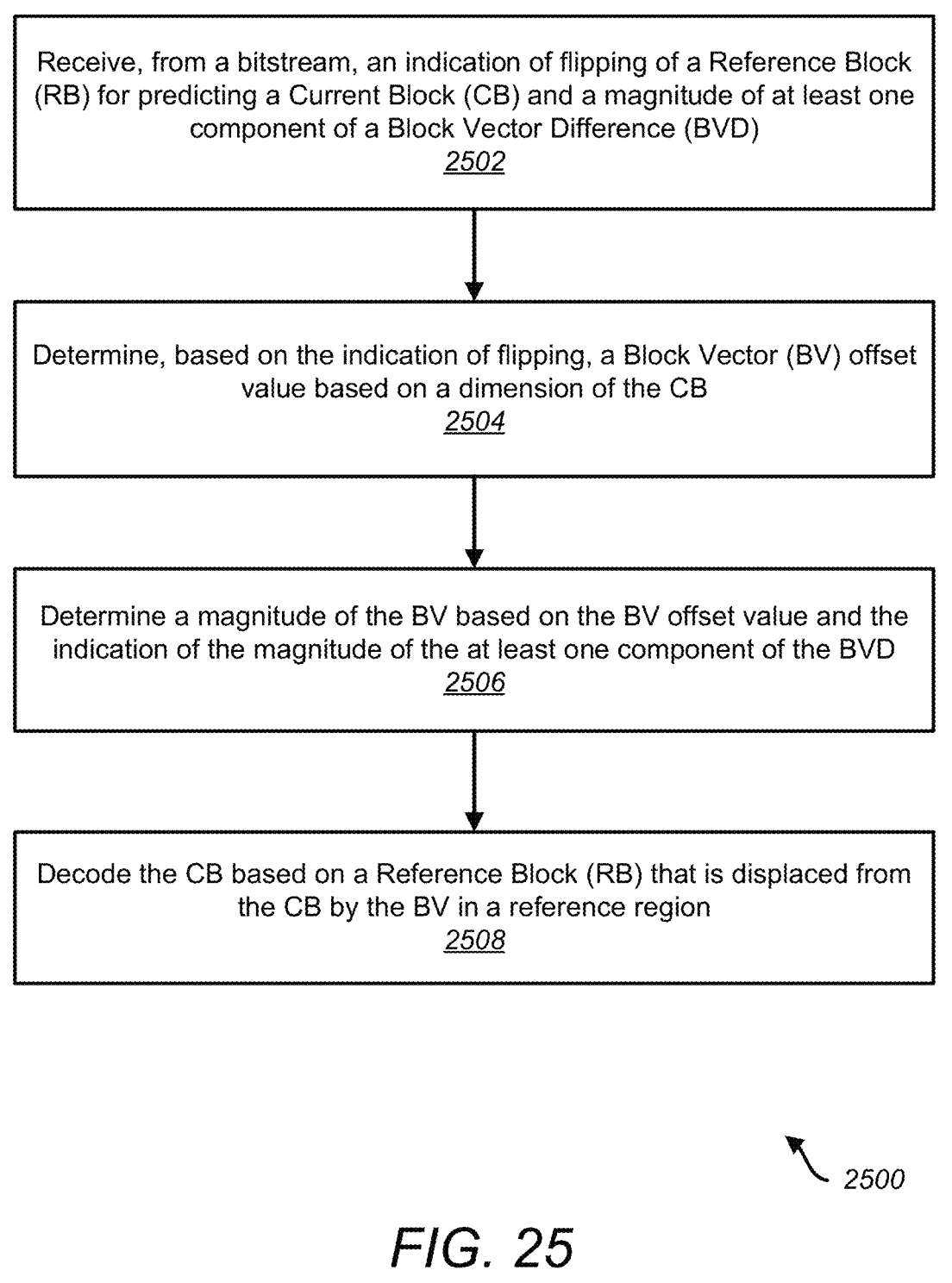

Receive, from a bitstream, an indication of flipping of a Reference Block (RB) for predicting a Current Block (CB) and a magnitude of at least one component of a Block Vector Difference (BVD)
2502

Determine, based on the indication of flipping, a Block Vector (BV) offset value based on a dimension of the CB
2504

Determine a magnitude of the BV based on the BV offset value and the indication of the magnitude of the at least one component of the BVD
2506

Decode the CB based on a Reference Block (RB) that is displaced from the CB by the BV in a reference region
2508

Figure 26:
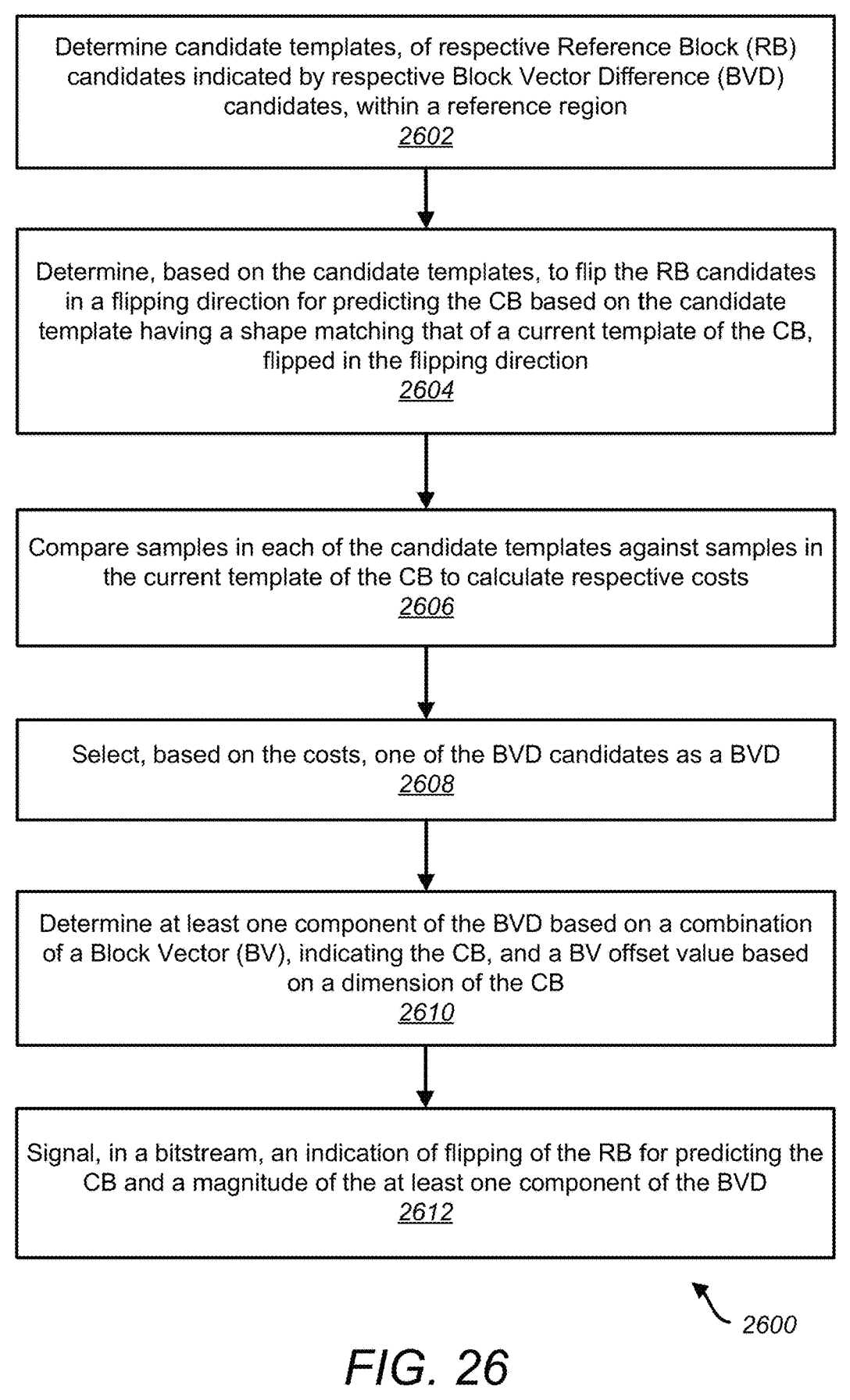

Determine candidate templates, of respective Reference Block (RB) candidates indicated by respective Block Vector Difference (BVD) candidates, within a reference region
2602

Determine, based on the candidate templates, to flip the RB candidates in a flipping direction for predicting the CB based on the candidate template having a shape matching that of a current template of the CB, flipped in the flipping direction
2604

Compare samples in each of the candidate templates against samples in the current template of the CB to calculate respective costs
2606

Select, based on the costs, one of the BVD candidates as a BVD
2608

Determine at least one component of the BVD based on a combination of a Block Vector (BV), indicating the CB, and a BV offset value based on a dimension of the CB
2610

Signal, in a bitstream, an indication of flipping of the RB for predicting the CB and a magnitude of the at least one component of the BVD
2612

BLOCK VECTOR SIGNALING FOR RECONSTRUCTION-REORDERED INTRA BLOCK COPY

CROSS-REFERENCE TO RELATED APPLICATIONS

This application claims the benefit of U.S. Provisional Application No. 63/430,424 filed on Dec. 6, 2022. The above referenced application is hereby incorporated by reference in its entirety.

BACKGROUND

A computing device processes video for storage, transmission, reception, and/or display. Processing a video comprises encoding and decoding, for example, to reduce a data size associated with the video.

SUMMARY

The following summary presents a simplified summary of certain features. The summary is not an extensive overview and is not intended to identify key or critical elements.

A video may comprise a sequence of frames displayed consecutively. A block vector predictor (BVP) may be adjusted to provide a more accurate prediction of a block vector (BV). The BV may be determined, for example, using a reconstruction-reordered intra block copy (RRIBC) mode. However, at least some approaches for RRIBC do not take into account these restricted valid ranges of components of the BV for signaling the BV in the bitstream, or for reconstructing the BV based on a Block Vector Predictor (BVP) and a Block Vector Difference (BVD). A coder (e.g., encoder or decoder) may determine that the at least one component of the BVD may be equal to zero (or, e.g., null), for example, based on a position of the CB relative to a boundary of the reference region. Consequently, the encoder may skip (e.g., not perform) signaling, and the decoder may skip (e.g., not perform) parsing, of the at least one component of the BVD in the bitstream, which may lead to improved compression/depression performance.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 6 shows example binary tree and ternary tree partitions.

FIG. 16 shows an example of intra block copy (IBC) for encoding.

FIG. 17B shows an example of RRIBC or IBC mirror mode for horizontal flipping and vertical flipping for predictive coding of screen content.

FIG. 18 shows an example of Block Vector Difference (BVD) signaling.

FIG. 25 shows an example method for determining a Block Vector (BV).

FIG. 26 shows an example method for determining at least one component of a Block Vector Difference (BVD).

DETAILED DESCRIPTION

Figure 1:
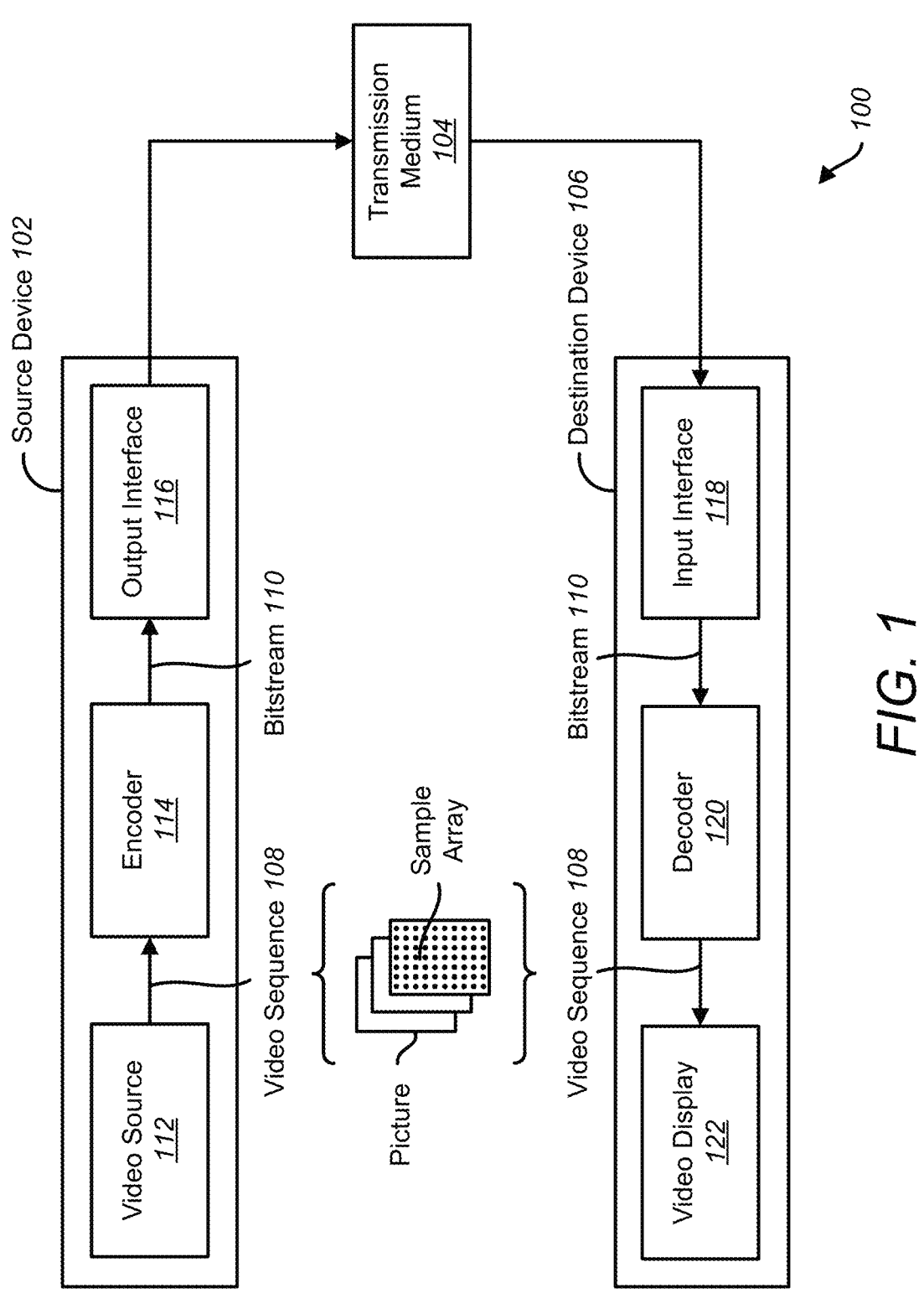
FIG. 1 shows an example video coding/decoding system.

The accompanying drawings and descriptions provide examples. It is to be understood that the examples shown in the drawings and/or described are non-exclusive, and that features shown and described may be practiced in other examples. Examples are provided for operation of video encoding and decoding systems, which may be used in the technical field of video data storage and/or transmission/reception. More particularly, the technology disclosed herein may relate to video compression as used in encoding and/or decoding devices and/or systems.

A video sequence, comprising multiple pictures/frames, may be represented in digital form for storage and/or transmission. Representing a video sequence in digital form may require a large quantity of bits. Large data sizes that may be associated with video sequences may require significant resources for storage and/or transmission. Video encoding may be used to compress a size of a video sequence for more efficient storage and/or transmission. Video decoding may be used to decompress a compressed video sequence for display and/or other forms of consumption.

FIG. 1 shows an example video coding/decoding system. Video coding/decoding system 100 may comprise a source device 102, a transmission medium 104, and a destination device 106. The source device 102 may encode a video sequence 108 into a bitstream 110 for more efficient storage and/or transmission. The source device 102 may store and/or send/transmit the bitstream 110 to the destination device 106 via the transmission medium 104. The destination device 106 may decode the bitstream 110 to display the video sequence 108. The destination device 106 may receive the bitstream 110 from the source device 102 via the transmission medium 104. The source device 102 and/or the destination device 106 may be any of a plurality of different devices (e.g., a desktop computer, laptop computer, tablet computer, smart phone, wearable device, television, camera, video gaming console, set-top box, video streaming device, etc.).

The source device 102 may comprise (e.g., for encoding the video sequence 108 into the bitstream 110) one or more of a video source 112, an encoder 114, and/or an output interface 116. The video source 112 may provide and/or generate the video sequence 108 based on a capture of a natural scene and/or a synthetically generated scene. A synthetically generated scene may be a scene comprising computer generated graphics and/or screen content. The video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A video sequence, such as video sequence 108, may comprise a series of pictures (also referred to as frames). A video sequence may achieve an impression of motion based on successive presentation of pictures of the video sequence using a constant time interval or variable time intervals between the pictures. A picture may comprise one or more sample arrays of intensity values. The intensity values may be taken (e.g., measured, determined, provided) at a series of regularly spaced locations within a picture. A color picture may comprise (e.g., typically comprises) a luminance sample array and two chrominance sample arrays. The luminance sample array may comprise intensity values representing the brightness (e.g., luma component, Y) of a picture. The chrominance sample arrays may comprise intensity values that respectively represent the blue and red components of a picture (e.g., chroma components, Cb and Cr) separate from the brightness. Other color picture sample arrays may be possible based on different color schemes (e.g., a red, green, blue (RGB) color scheme). A pixel, in a color picture, may refer to/comprise/be associated with all intensity values (e.g., luma component, chroma components), for a given location, in the sample arrays used to represent color pictures. A monochrome picture may comprise a single, luminance sample array. A pixel, in a monochrome picture, may refer to/comprise/be associated with the intensity value (e.g., luma component) at a given location in the single, luminance sample array used to represent monochrome pictures.

The encoder 114 may encode the video sequence 108 into the bitstream 110. The encoder 114 may apply/use (e.g., to encode the video sequence 108) one or more prediction techniques to reduce redundant information in the video sequence 108. Redundant information may comprise information that may be predicted at a decoder and need not be transmitted to the decoder for accurate decoding of the video sequence 108. For example, the encoder 114 may apply spatial prediction (e.g., intra-frame or intra prediction), temporal prediction (e.g., inter-frame prediction or inter prediction), inter-layer prediction, and/or other prediction techniques to reduce redundant information in the video sequence 108. The encoder 114 may partition pictures comprising the video sequence 108 into rectangular regions referred to as blocks, for example, prior to applying one or more prediction techniques. The encoder 114 may then encode a block using the one or more of the prediction techniques.

The encoder 114 may search for a block similar to the block being encoded in another picture (e.g., a reference picture) of the video sequence 108, for example, for temporal prediction. The block determined during the search (e.g., a prediction block) may then be used to predict the block being encoded. The encoder 114 may form a prediction block based on data from reconstructed neighboring samples of the block to be encoded within the same picture of the video sequence 108, for example, for spatial prediction. A reconstructed sample may be a sample that was encoded and then decoded. The encoder 114 may determine a prediction error (e.g., a residual) based on the difference between a block being encoded and a prediction block. The prediction error may represent non-redundant information that may be sent/transmitted to a decoder for accurate decoding of the video sequence 108.

The encoder 114 may apply a transform to the prediction error (e.g. using a discrete cosine transform (DCT), or any other transform) to generate transform coefficients. The encoder 114 may form the bitstream 110 based on the transform coefficients and other information used to determine prediction blocks using/based on prediction types, motion vectors, and prediction modes. The encoder 114 may perform one or more of quantization and entropy coding of the transform coefficients and/or the other information used to determine the prediction blocks, for example, prior to forming the bitstream 110. The quantization and/or the entropy coding may further reduce the quantity of bits needed to store and/or transmit the video sequence 108.

The output interface 116 may be configured to write and/or store the bitstream 110 onto the transmission medium 104 for transmission to the destination device 106. The output interface 116 may be configured to send/transmit, upload, and/or stream the bitstream 110 to the destination device 106 via the transmission medium 104. The output interface 116 may comprise a wired and/or a wireless transmitter configured to send/transmit, upload, and/or stream the bitstream 110 in accordance with one or more proprietary, open-source, and/or standardized communication protocols (e.g., Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol).

The transmission medium 104 may comprise wireless, wired, and/or computer readable medium. For example, the transmission medium 104 may comprise one or more wires, cables, air interfaces, optical discs, flash memory, and/or magnetic memory. The transmission medium 104 may comprise one or more networks (e.g., the internet) or file servers configured to store and/or send/transmit encoded video data.

The destination device 106 may decode the bitstream 110 into the video sequence 108 for display. The destination device 106 may comprise one or more of an input interface 118, a decoder 120, and/or a video display 122. The input interface 118 may be configured to read the bitstream 110 stored on the transmission medium 104 by the source device 102. The input interface 118 may be configured to receive, download, and/or stream the bitstream 110 from the source device 102 via the transmission medium 104. The input interface 118 may comprise a wired and/or a wireless receiver configured to receive, download, and/or stream the bitstream 110 in accordance with one or more proprietary, open-source, standardized communication protocols, and/or any other communication protocol (e.g., such as referenced herein).

The decoder 120 may decode the video sequence 108 from the encoded bitstream 110. The decoder 120 may generate prediction blocks for pictures of the video sequence 108 in a similar manner as the encoder 114 and determine the prediction errors for the blocks, for example, to decode the video sequence 108. The decoder 120 may generate the prediction blocks using/based on prediction types, prediction modes, and/or motion vectors received in the bitstream 110. The decoder 120 may determine the prediction errors using the transform coefficients received in the bitstream 110. The decoder 120 may determine the prediction errors by weighting transform basis functions using the transform coefficients. The decoder 120 may combine the prediction blocks and the prediction errors to decode the video sequence 108. The video sequence 108 at the destination device 106 may be, or may not necessarily be, the same video sequence sent, such as the video sequence 108 as sent by the source device 102. The decoder 120 may decode a video sequence that approximates the video sequence 108, for example, because of lossy compression of the video sequence 108 by the encoder 114 and/or errors introduced into the encoded bitstream 110 during transmission to the destination device 106.

The video display 122 may display the video sequence 108 to a user. The video display 122 may comprise a cathode rate tube (CRT) display, a liquid crystal display (LCD), a plasma display, a light emitting diode (LED) display, and/or any other display device suitable for displaying the video sequence 108.

The video encoding/decoding system 100 is merely an example and video encoding/decoding systems different from the video encoding/decoding system 100 and/or modified versions of the video encoding/decoding system 100 may perform the methods and processes as described herein. For example, the video encoding/decoding system 100 may comprise other components and/or arrangements. The video source 112 may be external to the source device 102. The video display device 122 may be external to the destination device 106 or omitted altogether (e.g., if the video sequence 108 is intended for consumption by a machine and/or storage device). The source device 102 may further comprise a video decoder and the destination device 106 may further comprise a video encoder. For example, the source device 102 may be configured to further receive an encoded bit stream from the destination device 106 to support two-way video transmission between the devices.

The encoder 114 and/or the decoder 120 may operate according to one or more proprietary or industry video coding standards. For example, the encoder 114 and/or the decoder 120 may operate in accordance with one or more proprietary, open-source, and/or standardized protocols (e.g., International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC)), ITU-T H.265 and MPEG-I Part 3 (also known as Versatile Video Coding (VVC)), the WebM VP8 and VP9 codecs, and/or AOMedia Video 1 (AV1), and/or any other video coding protocol).

Figure 2:
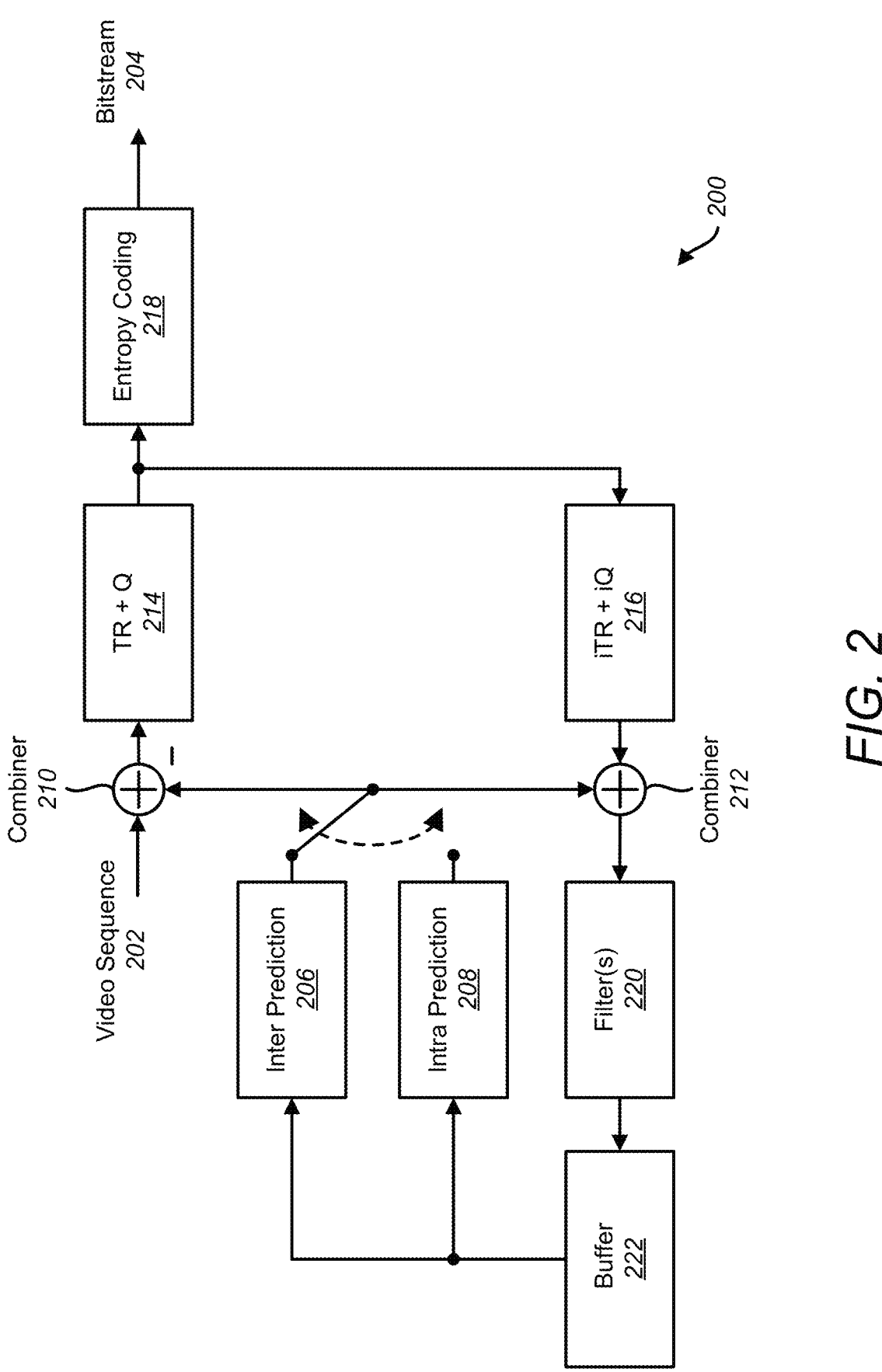
FIG. 2 shows an example encoder.

FIG. 2 shows an example encoder. The encoder 200 as shown in FIG. 2 may implement one or more processes described herein. The encoder 200 may encode a video sequence 202 into a bitstream 204 for more efficient storage and/or transmission. The encoder 200 may be implemented in the video coding/decoding system 100 as shown in FIG. 1 (e.g., as the encoder 114) or in any computing, commu-nication, or electronic device (e.g., desktop computer, laptop computer, tablet computer, smart phone, wearable device, television, camera, video gaming console, set-top box, video streaming device, etc.). The encoder 200 may comprise one or more of an inter prediction unit 206, an intra prediction unit 208, combiners 210 and 212, a transform and quanti-zation unit (TR+Q) 214, an inverse transform and quanti-zation unit (iTR+iQ) 216, an entropy coding unit 218, one or more filters 220, and/or a buffer 222.

The encoder 200 may partition pictures (e.g., frames) of (e.g., comprising) the video sequence 202 into blocks and encode the video sequence 202 on a block-by-block basis. The encoder 200 may perform/apply a prediction technique on a block being encoded using either the inter prediction unit 206 or the intra prediction unit 208. The inter prediction unit 206 may perform inter prediction by searching for a block similar to the block being encoded in another, recon-structed picture (e.g., a reference picture) of the video sequence 202. The reconstructed picture may be a picture that was encoded and then decoded. The block determined during the search (e.g., a prediction block) may then be used to predict the block being encoded to remove redundant information. The inter prediction unit 206 may exploit temporal redundancy or similarities in scene content from picture to picture in the video sequence 202 to determine the prediction block. For example, scene content between pic-tures of the video sequence 202 may be similar except for differences due to motion and/or affine transformation of the screen content over time.

The intra prediction unit 208 may perform intra prediction by forming a prediction block based on data from recon-structed neighboring samples of the block to be encoded within the same picture of the video sequence 202. The reconstructed sample may be a sample that was encoded and then decoded. The intra prediction unit 208 may exploit spatial redundancy or similarities in scene content within a picture of the video sequence 202 to determine the predic-tion block. For example, the texture of a region of scene content in a picture may be similar to the texture in the immediate surrounding area of the region of the scene content in the same picture.

The combiner 210 may determine a prediction error (e.g., a residual) based on the difference between the block being encoded and the prediction block. The prediction error may represent non-redundant information that may be sent/trans-mitted to a decoder for accurate decoding of the video sequence 202.

The transform and quantization unit (TR+Q) 214 may transform and quantize the prediction error. The transform and quantization unit 214 may transform the prediction error into transform coefficients by applying, for example, a DCT to reduce correlated information in the prediction error. The transform and quantization unit 214 may quantize the coefficients by mapping data of the transform coefficients to a predefined set of representative values. The transform and quantization unit 214 may quantize the coefficients to reduce irrelevant information in the bitstream 204. The Irrelevant information may be information that may be removed from the coefficients without producing visible and/or perceptible distortion in the video sequence 202 after decoding (e.g., at a receiving device).

The entropy coding unit 218 may apply one or more entropy coding methods to the quantized transform coefficients to further reduce the bit rate. For example, the entropy coding unit 218 may apply context adaptive variable length coding (CAVLC), context adaptive binary arithmetic coding (CABAC), and/or syntax-based context-based binary arithmetic coding (SBAC). The entropy coded coefficients may be packed to form the bitstream 204.

The inverse transform and quantization unit (iTR+iQ) 216 may inverse quantize and inverse transform the quantized transform coefficients to determine a reconstructed prediction error. The combiner 212 may combine the reconstructed prediction error with the prediction block to form a reconstructed block. The filter(s) 220 may filter the reconstructed block, for example, using a deblocking filter and/or a sample-adaptive offset (SAO) filter. The buffer 222 may store the reconstructed block for prediction of one or more other blocks in the same and/or different picture of the video sequence 202.

The encoder 200 may further comprise an encoder control unit. The encoder control unit may be configured to control one or more units of the encoder 200 as shown in FIG. 2. The encoder control unit may control the one or more units of the encoder 200 such that the bitstream 204 may be generated in conformance with the requirements of one or more proprietary coding protocols, industry video coding standards, and/or any other video cording protocol. For example, the encoder control unit may control the one or more units of the encoder 200 such that bitstream 204 may be generated in conformance with one or more of ITU-T H.263, AVC, HEVC, VVC, VP8, VP9, AV1, and/or any other video coding standard/format.

The encoder control unit may attempt to minimize (or reduce) the bitrate of bitstream 204 and/or maximize (or increase) the reconstructed video quality (e.g., within the constraints of a proprietary coding protocol, industry video coding standard, and/or any other video cording protocol). For example, the encoder control unit may attempt to minimize or reduce the bitrate of bitstream 204 such that the reconstructed video quality may not fall below a certain level/threshold, and/or may attempt to maximize or increase the reconstructed video quality such that the bit rate of bitstream 204 may not exceed a certain level/threshold. The encoder control unit may determine/control one or more of: partitioning of the pictures of the video sequence 202 into blocks, whether a block is inter predicted by the inter prediction unit 206 or intra predicted by the intra prediction unit 208, a motion vector for inter prediction of a block, an intra prediction mode among a plurality of intra prediction modes for intra prediction of a block, filtering performed by the filter(s) 220, and/or one or more transform types and/or quantization parameters applied by the transform and quantization unit 214. The encoder control unit may determine/control one or more of the above based on a rate-distortion measure for a block or picture being encoded. The encoder control unit may determine/control one or more of the above to reduce the rate-distortion measure for a block or picture being encoded.

The prediction type used to encode a block (intra or inter prediction), prediction information of the block (intra prediction mode if intra predicted, motion vector, etc.), and/or transform and/or quantization parameters, may be sent to the entropy coding unit 218 to be further compressed (e.g., to reduce the bit rate). The prediction type, prediction information, and/or transform and/or quantization parameters may be packed with the prediction error to form the bitstream 204.

The encoder 200 is merely an example and encoders different from the encoder 200 and/or modified versions of the encoder 200 may perform the methods and processes as described herein. For example, the encoder 200 may comprise other components and/or arrangements. One or more of the components shown in FIG. 2 may be optionally included in the encoder 200 (e.g., the entropy coding unit 218 and/or the filters(s) 220).

Figure 3:
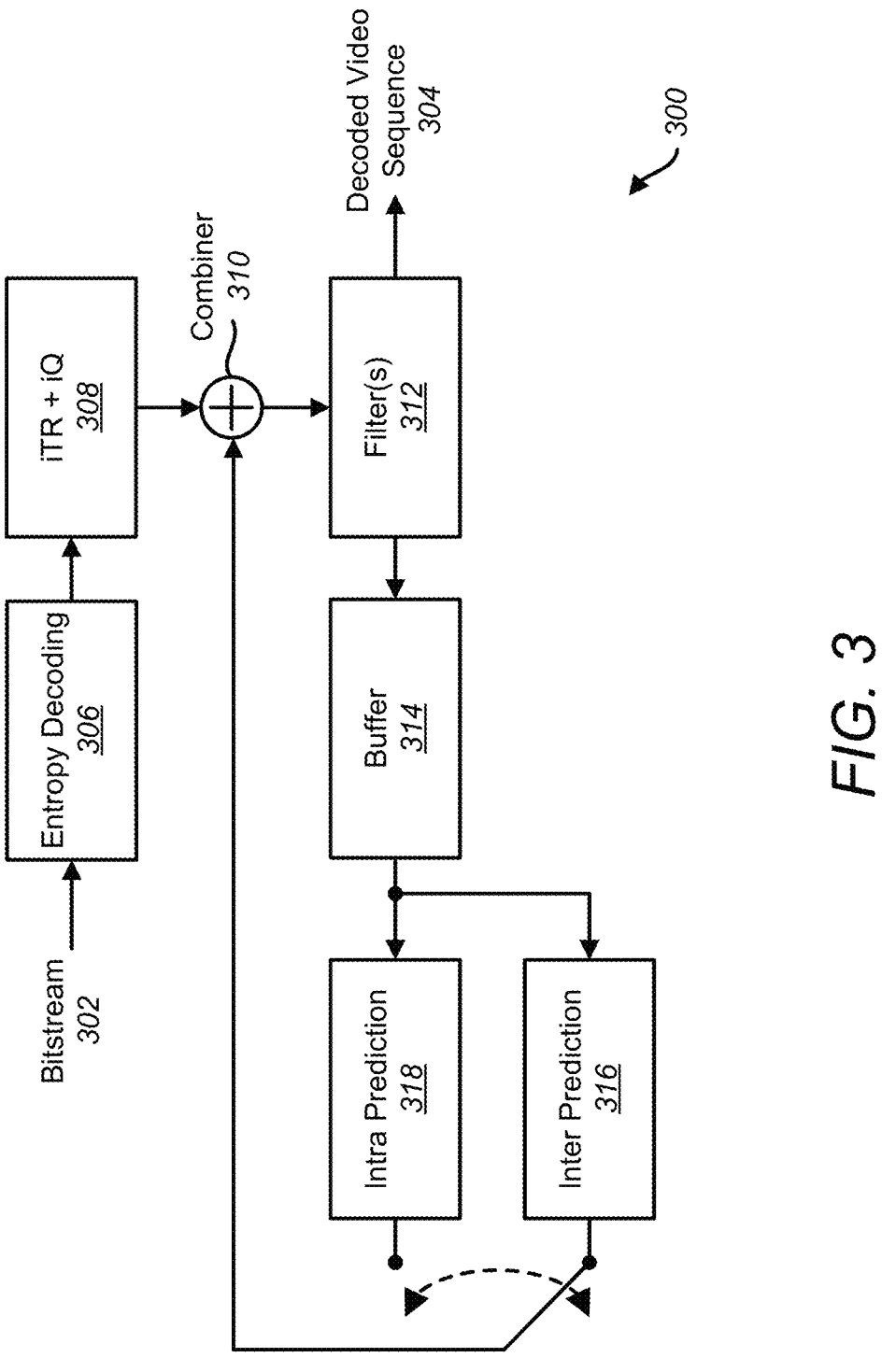
FIG. 3 shows an example decoder.

FIG. 3 shows an example decoder. A decoder 300 as shown in FIG. 3 may implement one or more processes described herein. The decoder 300 may decode a bitstream 302 into a decoded video sequence 304 for display and/or some other form of consumption. The decoder 300 may be implemented in the video encoding/decoding system 100 in FIG. 1 and/or in a computing, communication, or electronic device (e.g., desktop computer, laptop computer, tablet computer, smart phone, wearable device, television, camera, video gaming console, set-top box, and/or video streaming device). The decoder 300 may comprise an entropy decoding unit 306, an inverse transform and quantization (iTR+iQ) unit 308, a combiner 310, one or more filters 312, a buffer 314, an inter prediction unit 316, and/or an intra prediction unit 318.

The decoder 300 may comprise a decoder control unit configured to control one or more units of decoder 300. The decoder control unit may control the one or more units of decoder 300 such that the bitstream 302 is decoded in conformance with the requirements of one or more proprietary coding protocols, industry video coding standards, and/or any other communication protocol. For example, the decoder control unit may control the one or more units of decoder 300 such that the bitstream 302 is decoded in conformance with one or more of ITU-T H.263, AVC, HEVC, VVC, VP8, VP9, AV1, and/or any other video coding standard/format.

The decoder control unit may determine/control one or more of: whether a block is inter predicted by the inter prediction unit 316 or intra predicted by the intra prediction unit 318, a motion vector for inter prediction of a block, an intra prediction mode among a plurality of intra prediction modes for intra prediction of a block, filtering performed by the filter(s) 312, and/or one or more inverse transform types and/or inverse quantization parameters to be applied by the inverse transform and quantization unit 308. One or more of the control parameters used by the decoder control unit may be packed in bitstream 302.

The Entropy decoding unit 306 may entropy decode the bitstream 302. The inverse transform and quantization unit 308 may inverse quantize and/or inverse transform the quantized transform coefficients to determine a decoded prediction error. The combiner 310 may combine the decoded prediction error with a prediction block to form a decoded block. The prediction block may be generated by the intra prediction unit 318 or the inter prediction unit 316 (e.g., as described above with respect to encoder 200 in FIG. 2). The filter(s) 312 may filter the decoded block, for example, using a deblocking filter and/or a sample-adaptive offset (SAO) filter. The buffer 314 may store the decoded block for prediction of one or more other blocks in the same and/or different picture of the video sequence in the bitstream 302. The decoded video sequence 304 may be output from the filter(s) 312 as shown in FIG. 3.

The decoder 300 is merely an example and decoders different from the decoder 300 and/or modified versions of the decoder 300 may perform the methods and processes as described herein. For example, the decoder 300 may have other components and/or arrangements. One or more of the components shown in FIG. 3 may be optionally included in the decoder 300 (e.g., the entropy decoding unit 306 and/or the filters(s) 312).

Although not shown in FIGS. 2 and 3, each of the encoder 200 and the decoder 300 may further comprise an intra block copy unit in addition to inter prediction and intra prediction units. The intra block copy unit may perform/operate similar to an inter prediction unit but may predict blocks within the same picture. For example, the intra block copy unit may exploit repeated patterns that appear in screen content. The screen content may include computer generated text, graphics, animation, etc.

Video encoding and/or decoding may be performed on a block-by-block basis. The process of partitioning a picture into blocks may be adaptive based on the content of the picture. For example, larger block partitions may be used in areas of a picture with higher levels of homogeneity to improve coding efficiency.

A picture (e.g., in HEVC, or any other coding standard/format) may be partitioned into non-overlapping square blocks, which may be referred to as coding tree blocks (CTBs). The CTBs may comprise samples of a sample array. A CTB may have a size of $2''\times2''$ samples, where n may be specified by a parameter of the encoding system. For example, n may be 4, 5, 6, or any other value. A CTB may have any other size. A CTB may be further partitioned by a recursive quadtree partitioning into coding blocks (CBs) of half vertical and half horizontal size. The CTB may form the root of the quadtree. A CB that is not split further as part of the recursive quadtree partitioning may be referred to as a leaf CB of the quadtree, and otherwise may be referred to as a non-leaf CB of the quadtree. A CB may have a minimum size specified by a parameter of the encoding system. For example, a CB may have a minimum size of 4×4, 8×8, 16×16, 32×32, 64×64 samples, or any other minimum size. A CB may be further partitioned into one or more prediction blocks (PBs) for performing inter and/or intra prediction. A PB may be a rectangular block of samples on which the same prediction type/mode may be applied. For transformations, a CB may be partitioned into one or more transform blocks (TBs). A TB may be a rectangular block of samples that may determine/indicate an applied transform size.

Figure 4:
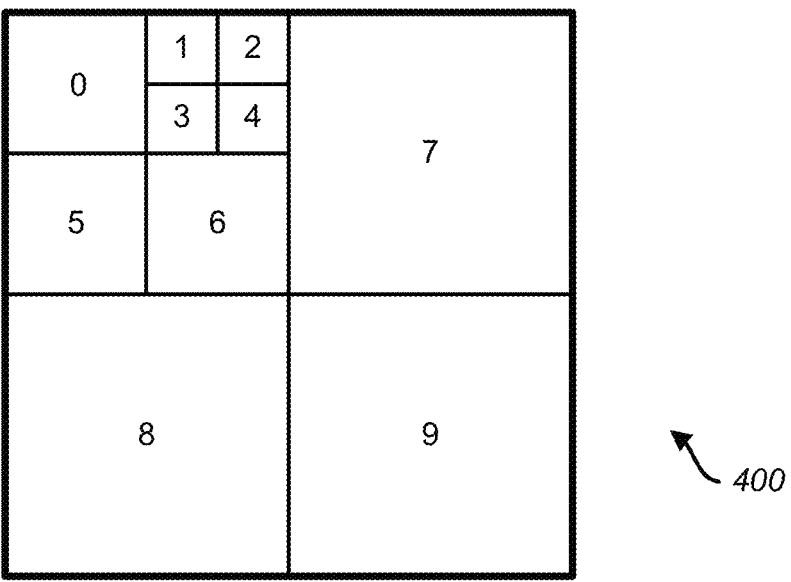
FIG. 4 shows an example quadtree partitioning of a coding tree block (CTB).
Figure 5:
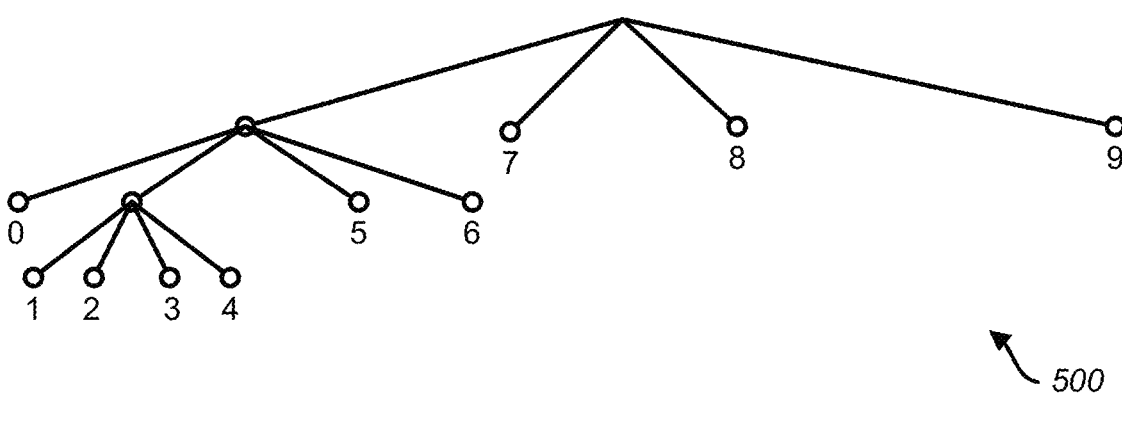
FIG. 5 shows an example quadtree corresponding to the example quadtree partitioning of the CTB in FIG. 4.

FIG. 4 shows an example quadtree partitioning of a CTB. FIG. 5 shows a quadtree corresponding to the example quadtree partitioning of the CTB 400 in FIG. 4. As shown in FIGS. 4 and 5, the CTB 400 may first be partitioned into four CBs of half vertical and half horizontal size. Three of the resulting CBs of the first level partitioning of CTB 400 may be leaf CBs. The three leaf CBs of the first level partitioning of CTB 400 are respectively labeled 7, 8, and 9 in FIGS. 4 and 5. The non-leaf CB of the first level partitioning of CTB 400 may be partitioned into four sub-CBs of half vertical and half horizontal size. Three of the resulting sub-CBs of the second level partitioning of CTB 400 may be leaf CBs. The three leaf CBs of the second level partitioning of CTB 400 are respectively labeled 0, 5, and 6 in FIGS. 4 and 5. The non-leaf CB of the second level partitioning of CTB 400 may be partitioned into four leaf CBs of half vertical and half horizontal size. The four leaf CBs may be respectively labeled 1, 2, 3, and 4 in FIGS. 4 and 5.

The CTB 400 of FIG. 4 may be partitioned into 10 leaf CBs respectively labeled 0-9, and/or any other quantity of leaf CBs. The 10 leaf CBs may correspond to 10 CB leaf nodes (e.g., 10 CB leaf nodes of the quadtree 500 as shown in FIG. 5). In other examples, a CTB may be partitioned into a different number of leaf CBs. The resulting quadtree partitioning of the CTB 400 may be scanned using a z-scan (e.g., left-to-right, top-to-bottom) to form the sequence order for encoding/decoding the CB leaf nodes. A numeric label (e.g., indicator, index) of each CB leaf node in FIGS. 4 and 5 may correspond to the sequence order for encoding/decoding. For example, CB leaf node 0 may be encoded/decoded first and CB leaf node 9 may be encoded/decoded last. Although not shown in FIGS. 4 and 5, each CB leaf node may comprise one or more PBs and/or TBs.

A picture, in VVC (or in any other coding standard/format), may be partitioned in a similar manner (such as in HEVC). A picture may be first partitioned into non-overlapping square CTBs. The CTBs may then be partitioned, using a recursive quadtree partitioning, into CBs of half vertical and half horizontal size. A quadtree leaf node (e.g., in VVC) may be further partitioned by a binary tree or ternary tree partitioning (or any other partitioning) into CBs of unequal sizes.

FIG. 6 shows example binary tree and ternary tree partitions. A binary tree partition may divide a parent block in half in either a vertical direction 602 or a horizontal direction 604. The resulting partitions may be half in size as compared to the parent block. The resulting partitions may correspond to sizes that are less than and/or greater than half of the parent block size. A ternary tree partition may divide a parent block into three parts in either a vertical direction 606 or a horizontal direction 608. FIG. 6 shows an example in which the middle partition may be twice as large as the other two end partitions in the ternary tree partitions. In other examples, partitions may be of other sizes relative to each other and to the parent block. Binary and ternary tree partitions are examples of multi-type tree partitioning. Multi-type tree partitions may comprise partitioning a parent block into other quantities of smaller blocks. The block partitioning strategy (e.g., in VVC) may be referred to as a combination of quadtree and multi-type tree partitioning (quadtree+multi-type tree partitioning) because of the addition of binary and/or ternary tree partitioning to quadtree partitioning.

Figure 7:
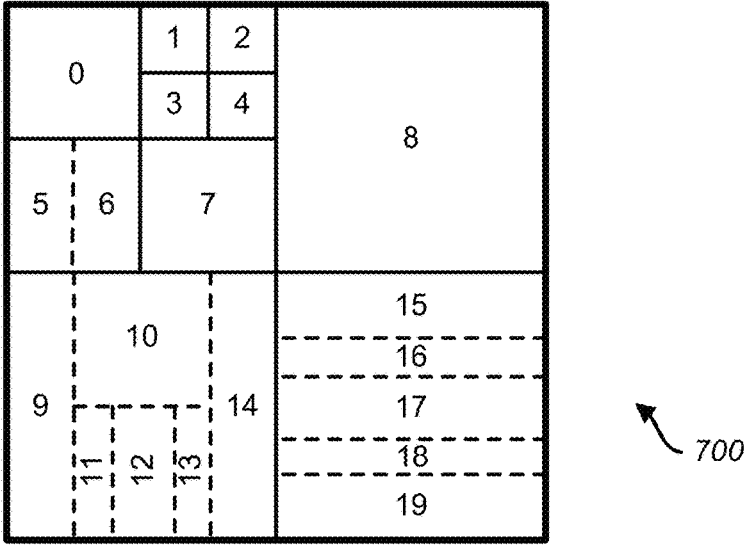
FIG. 7 shows an example of combined quadtree and multi-type tree partitioning of a CTB.
Figure 8:
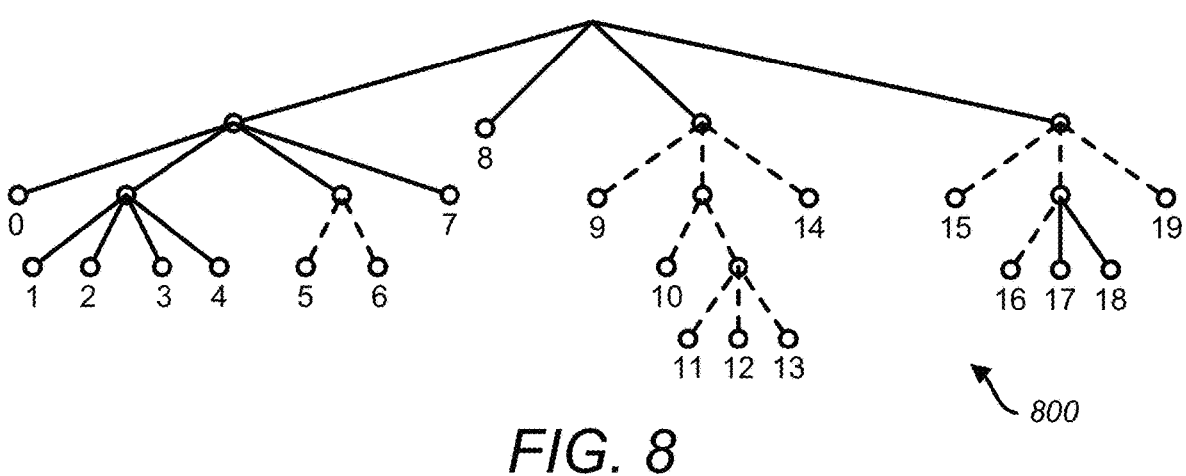
FIG. 8 shows a tree corresponding to the combined quadtree and multi-type tree partitioning of the CTB shown in FIG. 7.

FIG. 7 shows an example of combined quadtree and multi-type tree partitioning of a CTB. FIG. 8 shows a tree corresponding to the combined quadtree and multi-type tree partitioning of the CTB 700 shown in FIG. 7. In both FIGS. 7 and 8, quadtree splits are shown in solid lines and multi-type tree splits are shown in dashed lines. The CTB 700 is shown with the same quadtree partitioning as the CTB 400 described in FIG. 4, and a description of the quadtree partitioning of the CTB 700 is omitted. The quadtree partitioning of the CTB 700 is merely an example and a CTB may be quadtree partitioned in a manner different from the CTB 700. Additional multi-type tree partitions of the CTB 700 may be made relative to three leaf CBs shown in FIG. 4. The three leaf CBs in FIG. 4 that are shown in FIG. 7 as being further partitioned may be leaf CBs 5, 8, and 9. The three leaf CBs may be further partitioned using one or more binary and/or ternary tree partitions.

The leaf CB 5 of FIG. 4 may be partitioned into two CBs based on a vertical binary tree partitioning. The two resulting CBs may be leaf CBs respectively labeled 5 and 6 in FIGS. 7 and 8. The leaf CB 8 of FIG. 4 may be partitioned into three CBs based on a vertical ternary tree partition. Two of the three resulting CBs may be leaf CBs respectively labeled 9 and 14 in FIGS. 7 and 8. The remaining, non-leaf CB may be partitioned first into two CBs based on a horizontal binary tree partition. One of the two CBs may be a leaf CB labeled 10. The other of the two CBs may be further partitioned into three CBs based on a vertical ternary tree partition. The resulting three CBs may be leaf CBs respectively labeled 11, 12, and 13 in FIGS. 7 and 8. The leaf CB 9 of FIG. 4 may be partitioned into three CBs based on a horizontal ternary tree partition. Two of the three CBs may be leaf CBs respectively labeled 15 and 19 in FIGS. 7 and 8. The remaining, non-leaf CB may be partitioned into three CBs based on another horizontal ternary tree partition. The resulting three CBs may all be leaf CBs respectively labeled 16, 17, and 18 in FIGS. 7 and 8.

Altogether, the CTB 700 may be partitioned into 20 leaf CBs respectively labeled 0-19. The 20 leaf CBs may correspond to 20 leaf nodes (e.g., 20 leaf nodes of the tree 800 shown in FIG. 8). The resulting combination of quadtree and multi-type tree partitioning of the CTB 700 may be scanned using a z-scan (left-to-right, top-to-bottom) to form the sequence order for encoding/decoding the CB leaf nodes. A numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and/or TBs.

A coding standard/format (e.g., HEVC, VVC, or any other coding standard/format) may define various units (e.g., in addition to specifying various blocks (e.g., CTBs, CBS, PBS, TBs)). Blocks may comprise a rectangular area of samples in a sample array. Units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBS of the different sample arrays and syntax elements used to predict the PBs. A transform unit (TU) may comprise TBs of the different samples arrays and syntax elements used to transform the TBs.

A block may refer to any of a CTB, CB, PB, TB, CTU, CU, PU, and/or TU (e.g., in the context of HEVC, VVC, or any other coding format/standard). A block may be used to refer to similar data structures in the context of any video coding format/standard/protocol. For example, a block may refer to a macroblock in the AVC standard, a macroblock or a sub-block in the VP8 coding format, a superblock or a sub-block in the VP9 coding format, and/or a superblock or a sub-block in the AV1 coding format.

Samples of a block to be encoded (e.g., a current block) may be predicted from samples of the column immediately adjacent to the left-most column of the current block and samples of the row immediately adjacent to the top-most row of the current block, such as in intra prediction. The samples from the immediately adjacent column and row may be jointly referred to as reference samples. Each sample of the current block may be predicted (e.g., in an intra prediction mode) by projecting the position of the sample in the current block in a given direction to a point along the reference samples. The sample may be predicted by interpolating between the two closest reference samples of the projection point if the projection does not fall directly on a reference sample. A prediction error (e.g., a residual) may be determined for the current block based on differences between the predicted sample values and the original sample values of the current block.

Predicting samples and determining a prediction error based on a difference between the predicted samples and original samples may be performed (e.g., at an encoder) for a plurality of different intra prediction modes (e.g., including non-directional intra prediction modes). The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block, using the intra prediction mode indicated by the encoder, and/or combining the predicted samples with the prediction error.

Figure 9:
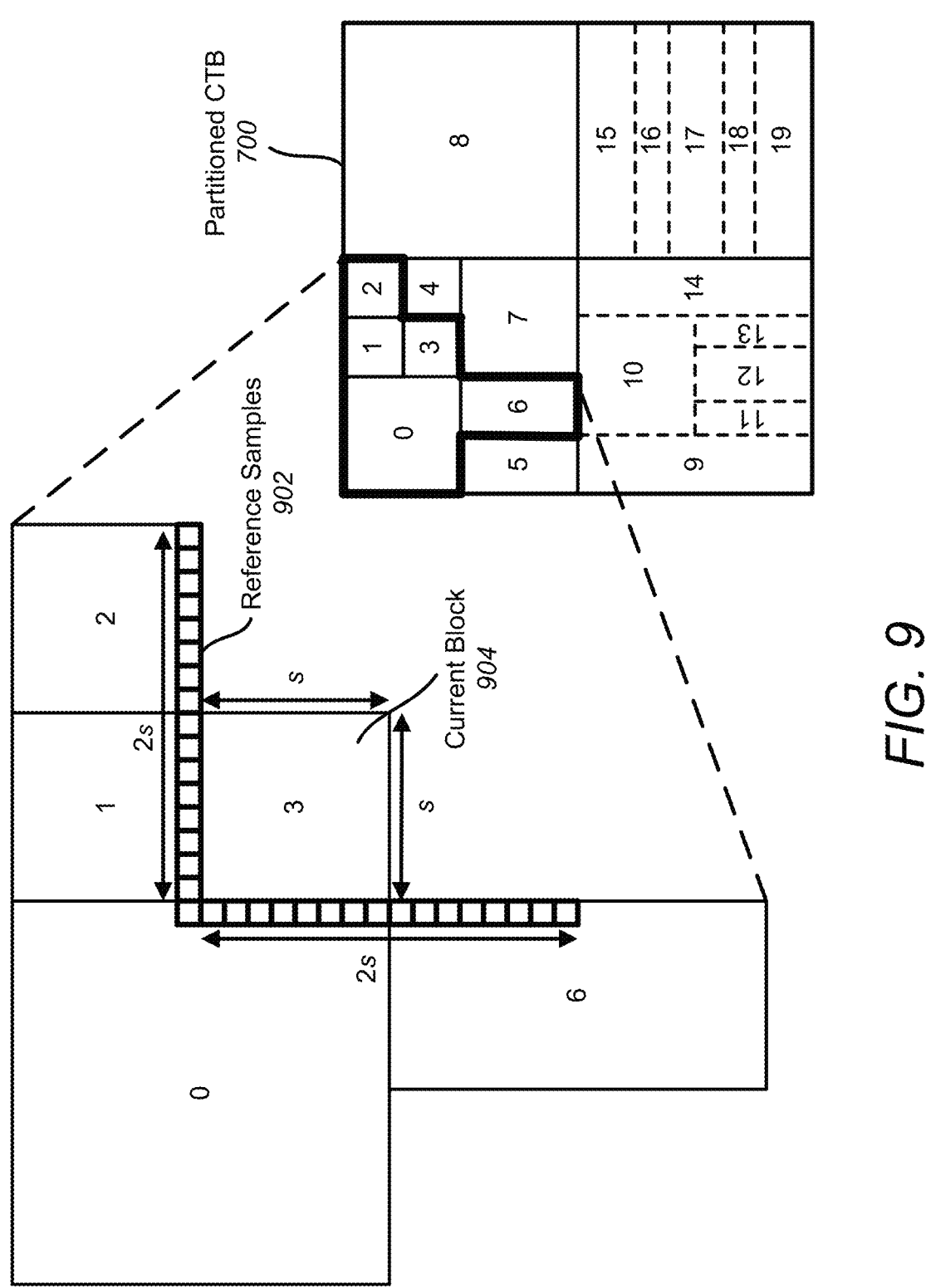
FIG. 9 shows an example set of reference samples determined for intra prediction of a current block.

FIG. 9 shows an example set of reference samples determined for intra prediction of a current block. The current block 904 may correspond to a block being encoded and/or decoded. The current block 904 may correspond to block 3 of the partitioned CTB 700 as shown in FIG. 7. As described herein, the numeric labels 0-19 of the blocks of partitioned CTB 700 may correspond to the sequence order for encoding/decoding the blocks and may be used as such in the example of FIG. 9.

The current block 904 may be w×h samples in size. The reference samples 902 may comprise: 2w samples (or any other quantity of samples) of the row immediately adjacent to the top-most row of the current block 904, 2h samples (or any other quantity of samples) of the column immediately adjacent to the left-most column of the current block 904, and the top left neighboring corner sample to the current block 904. The current block 904 may be square, such that w=h=s. In other examples, a current block need not be square, such that w≠h. Available samples from neighboring blocks of the current block 904 may be used for constructing the set of reference samples 902. Samples may not be available for constructing the set of reference samples 902, for example, if the samples lie outside the picture of the current block, the samples are part of a different slice of the current block (e.g., if the concept of slices is used), and/or the samples belong to blocks that have been inter coded and constrained intra prediction is indicated. Intra prediction may not be dependent on inter predicted blocks, for example, if constrained intra prediction is indicated.

Samples that may not be available for constructing the set of reference samples 902 may comprise samples in blocks that have not already been encoded and reconstructed at an encoder and/or decoded at a decoder based on the sequence order for encoding/decoding. Restriction of such samples from inclusion in the set of reference samples 902 may allow identical prediction results to be determined at both the encoder and decoder. Samples from neighboring blocks 0, 1, and 2 may be available to construct the reference samples 902 given that these blocks are encoded and reconstructed at an encoder and decoded at a decoder prior to coding of the current block 904. The samples from neighboring blocks 0, 1, and 2 may be available to construct reference samples 902, for example, if there are no other issues (e.g., as mentioned above) preventing the availability of the samples from the neighboring blocks 0, 1, and 2. The portion of reference samples 902 from neighboring block 6 may not be available due to the sequence order for encoding/decoding (e.g., because the block 6 may not have already been encoded and reconstructed at the encoder and/or decoded at the decoder based on the sequence order for encoding/decoding).

Unavailable samples from the reference samples 902 may be filled with one or more of the available reference samples 902. For example, an unavailable reference sample may be filled with a nearest available reference sample. The nearest available reference sample may be determined by moving in a clock-wise direction through the reference samples 902 from the position of the unavailable reference. The reference samples 902 may be filled with the mid-value of the dynamic range of the picture being coded, for example, if no reference samples are available.

The reference samples 902 may be filtered based on the size of current block 904 being coded and an applied intra prediction mode. FIG. 9 shows an exemplary determination of reference samples for intra prediction of a block. Reference samples may be determined in a different manner than described above. For example, multiple reference lines may be used in other instances (e.g., in VVC).

Samples of the current block 904 may be intra predicted based on the reference samples 902, for example, based on (e.g., after) determination and (optionally) filtration of the reference samples. At least some (e.g., most) encoders/decoders may support a plurality of intra prediction modes in accordance with one or more video coding standards. For example, HEVC supports 35 intra prediction modes, including a planar mode, a direct current (DC) mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture. Any quantity of intra prediction modes may be supported.

Figure 10A:
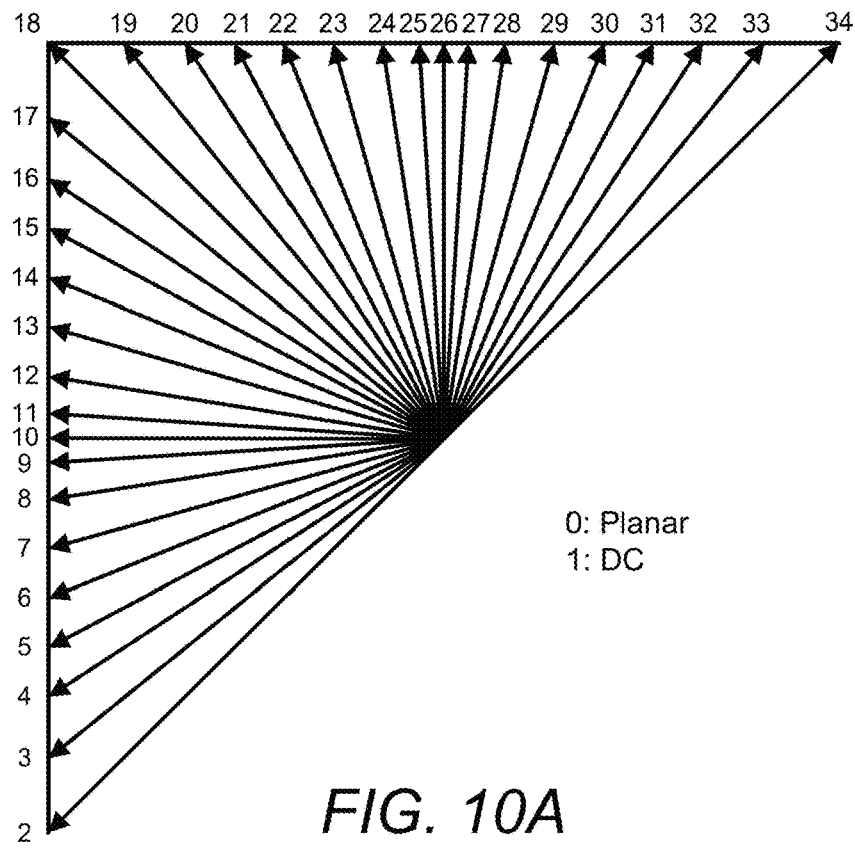
FIGS. 10A and 10B show example intra prediction modes.
Figure 10B:
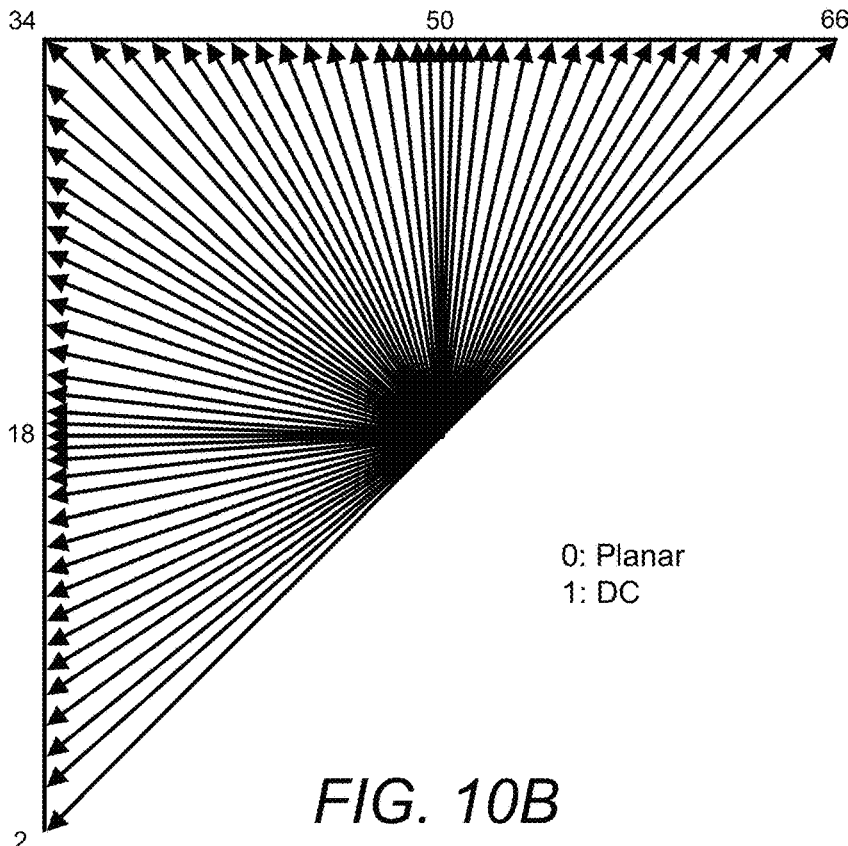

FIGS. 10A and 10B show example intra prediction modes. FIG. 10A shows 35 intra prediction modes, such as supported by HEVC. The 35 intra prediction modes may be indicated/identified by indices 0 to 34. Prediction mode 0 may correspond to planar mode. Prediction mode 1 may correspond to DC mode. Prediction modes 2-34 may correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

FIG. 10B shows 67 intra prediction modes, such as supported by VVC. The 67 intra prediction modes may be indicated/identified by indices 0 to 66. Prediction mode 0 may correspond to planar mode. Prediction mode 1 corresponds to DC mode. Prediction modes 2-66 may correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Some of the intra prediction modes illustrated in FIG. 10B may be adaptively replaced by wide-angle directions because blocks in VVC need not be squares.

Figure 11:
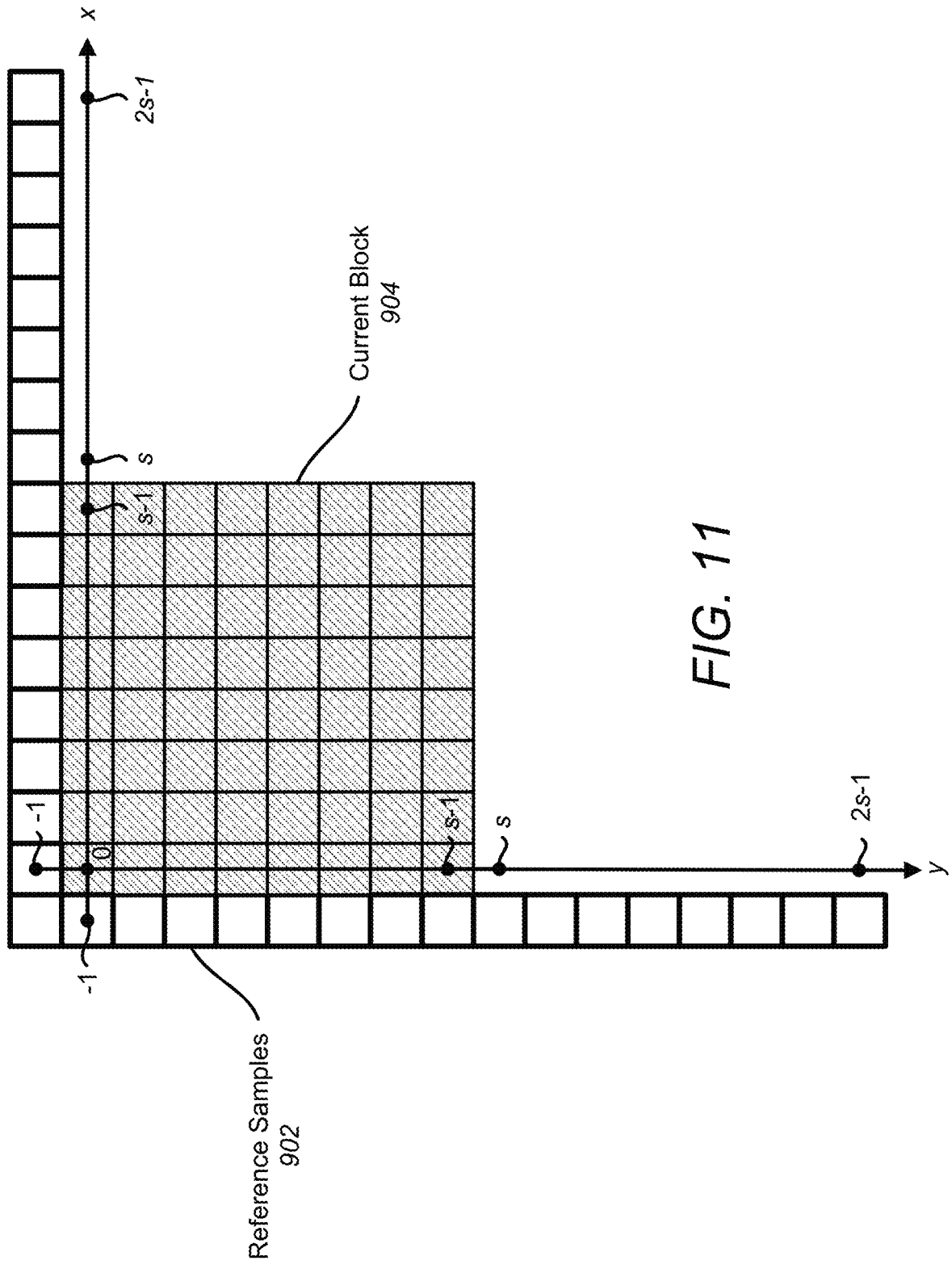
FIG. 11 shows a current block and corresponding reference samples.

FIG. 11 shows a current block and corresponding reference samples. In FIG. 11, the current block 904 and the reference samples 902 from FIG. 9 are shown in a two-dimensional x, y plane, where a sample may be referenced as p[x][y]. In order to simplify the prediction process, the reference samples 902 may be placed in two, one-dimensional arrays. The reference samples 902, above the current block 904, may be placed in the one-dimensional array ref₁[x]:

$$\text{ref}_1[x] = p[-1+x][-1], (x \geq 0) \tag{1}$$

The reference samples 902 to the left of the current block 904 may be placed in the one-dimensional array ref₂[y]:

$$\text{ref}_2[y] = p[-1][-1+y], (y \geq 0) \tag{2}$$

The prediction process may comprise determination of a predicted sample p[x] [y] (e.g., a predicted value) at a location [x][y] in the current block 904. For planar mode, a sample at the location [x][y] in the current block 904 may be predicted by determining/calculating the mean of two interpolated values. The first of the two interpolated values may be based on a horizontal linear interpolation at the location [x][y] in the current block 904. The second of the two interpolated values may be based on a vertical linear interpolation at the location [x][y] in the current block 904. The predicted sample p[x][y] in the current block 904 may be determined/calculated as:

$$p[x][y] = \frac{1}{2 \cdot s}(h[x][y] + v[x][y] + s), \tag{3}$$

where $$h[x][y] = (s-x-1) \cdot \text{ref}_2[y] + (x+1) \cdot \text{ref}_1[s] \tag{4}$$

may be the horizontal linear interpolation at the location [x][y] in the current block 904 and $$v[x][y] = (s-y-1) \cdot \text{ref}_1[x] + (y+1) \cdot \text{ref}_2[s] \tag{5}$$

may be the vertical linear interpolation at the location [x][y] in the current block 904. s may be equal to a length of a side (e.g., a number of samples on a side) of the current block 904.

A sample at a location [x][y] in the current block 904 may be predicted by the mean of the reference samples 902, such as for a DC mode. The predicted sample p[x][y] in the current block 904 may be determined/calculated as:

$$p[x][y] = \frac{1}{2 \cdot s}\left(\sum_{x=0}^{s-1}\text{ref}_1[x] + \sum_{y=0}^{s-1}\text{ref}_2[y]\right). \tag{6}$$

A sample at a location [x][y] in the current block 904 may be predicted by projecting the location [x][y] in a direction specified by a given angular mode to a point on the horizontal or vertical line of samples comprising the reference samples 902, such as for an angular mode. The sample at the location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC). The direction specified by the angular mode may be given by an angle φ defined relative to the x-axis for horizontal prediction modes (e.g., modes 2-18 in HEVC and modes 2-34 in VVC).

Figure 12:
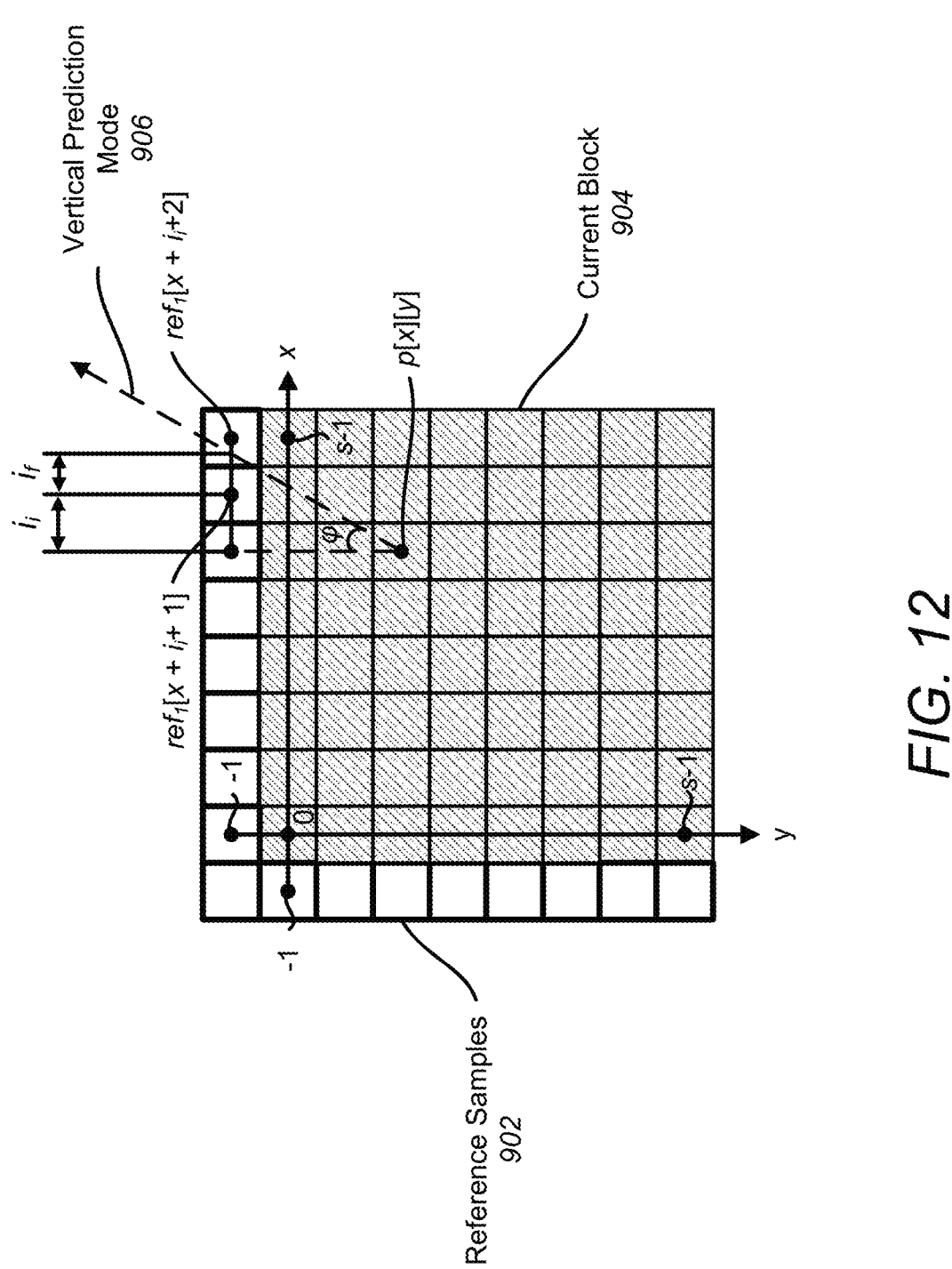
FIG. 12 shows an example application of an intra prediction mode for prediction of a current block.

FIG. 12 shows an example application of an intra prediction mode for prediction of a current block. FIG. 12 specifically shows prediction of a sample at a location [x][y] in the current block 904 for a vertical prediction mode 906. The vertical prediction mode 906 may be given by an angle φ with respect to the vertical axis. The location [x][y] in the current block 904, in vertical prediction modes, may be projected to a point (e.g., a projection point) on the horizontal line of reference samples ref₁[x]. The reference samples 902 are only partially shown in FIG. 12 for ease of illustration. As shown in FIG. 12, the projection point on the horizontal line of reference samples ref₁[x] may not be exactly on a reference sample. A predicted sample p[x][y] in the current block 904 may be determined/calculated by linearly interpolating between the two reference samples, for example, if the projection point falls at a fractional sample position between two reference samples. The predicted sample p[x][y] may be determined/calculated as:

$$p[x][y] = (1-i_f) \cdot \text{ref}_1[x+i_i+1] + i_f \text{ref}_1[x+i_i+2] \tag{7}$$

$i_i$ may be the integer part of the horizontal displacement of the projection point relative to the location [x][y]. $i_i$ may be determined/calculated as a function of the tangent of the angle φ of the vertical prediction mode 906 as:

$$i_i = \lfloor (y+1) \cdot \tan \varphi \rfloor \tag{8}$$

if may be the fractional part of the horizontal displacement of the projection point relative to the location [x][y] and may be determined/calculated as:

$$i_f = ((y+1) \cdot \tan \varphi) - \lfloor (y+1) \cdot \tan \varphi \rfloor \tag{9}$$

where $\lfloor \cdot \rfloor$ is the integer floor function.

A location [x][y] of a sample in the current block 904 may be projected onto the vertical line of reference samples ref₂[y], such as for horizontal prediction modes. A predicted sample p[x][y] for horizontal prediction modes may be determined/calculated as:

$$p[x][y] = (1-i_f) \cdot \text{ref}_2[y+i_i+1] + i_f \text{ref}_2[y+i_i+2] \tag{10}$$

$i_i$ may be the integer part of the vertical displacement of the projection point relative to the location [x][y]. $i_i$ may be determined/calculated as a function of the tangent of the angle φ of the horizontal prediction mode as:

$$i_i = \lfloor (x+1) \cdot \tan \varphi \rfloor \tag{11}$$

$i_f$ may be the fractional part of the vertical displacement of the projection point relative to the location [x][y]. $i_f$ may be determined/calculated as:

$$i_f = ((x+1) \cdot \tan \varphi) - \lfloor (x+1) \cdot \tan \varphi \rfloor \tag{12}$$

where $\lfloor \cdot \rfloor$ is the integer floor function.

The interpolation functions given by Equations (7) and (10) may be implemented by an encoder and/or a decoder (e.g., the encoder 200 in FIG. 2 and/or the decoder 300 in FIG. 3). The interpolation functions may be implemented by finite impulse response (FIR) filters. For example, the interpolation functions may be implemented as a set of two-tap FIR filters. The coefficients of the two-tap FIR filters may be respectively given by $(1-i_f)$ and $i_f$. The predicted sample p[x][y], in angular intra prediction, may be calculated with some predefined level of sample accuracy (e.g., ⅓₂ sample accuracy, or accuracy defined by any other metric). For ⅓₂ sample accuracy, the set of two-tap FIR interpolation filters may comprise up to 32 different two-tap FIR interpolation filters—one for each of the 32 possible values of the fractional part of the projected displacement if. In other examples, different levels of sample accuracy may be used.

The FIR filters may be used for predicting chroma samples and/or luma samples. For example, the two-tap interpolation FIR filter may be used for predicting chroma samples and a same and/or a different interpolation technique/filter may be used for luma samples. For example, a four-tap FIR filter may be used to determine a predicted value of a luma sample. Coefficients of the four tap FIR filter may be determined based on $i_f$ (e.g., similar to the two-tap FIR filter). For ⅓₂ sample accuracy, a set of 32 different four-tap FIR filters may comprise up to 32 different four-tap FIR filters—one for each of the 32 possible values of the fractional part of the projected displacement $i_f$. In other examples, different levels of sample accuracy may be used. The set of four-tap FIR filters may be stored in a look-up table (LUT) and referenced based on $i_f$. A predicted sample p[x][y], for vertical prediction modes, may be determined based on the four-tap FIR filter as:

$$p[x][y] = \sum_{i=0}^{3} fT[i] \cdot \text{ref}_1[x + iIdx + i], \tag{13}$$

where fT[i], i=0 . . . 3, may be the filter coefficients, and Idx is integer displacement. A predicted sample p[x][y], for horizontal prediction modes, may be determined based on the four-tap FIR filter as:

$$p[x][y] = \sum_{i=0}^{3} fT[i] \cdot \text{ref}_2[y + iIdx + i]. \tag{14}$$

Supplementary reference samples may be determined/constructed if the location [x][y] of a sample in the current block 904 to be predicted is projected to a negative x coordinate. The location [x][y] of a sample may be projected to a negative x coordinate, for example, if negative vertical prediction angles φ are used. The supplementary reference samples may be determined/constructed by projecting the reference samples in ref₂[y] in the vertical line of reference samples 902 to the horizontal line of reference samples 902 using the negative vertical prediction angle φ. Supplementary reference samples may be similarly determined/constructed, for example, if the location [x][y] of a sample in the current block 904 to be predicted is projected to a negative y coordinate. The location [x][y] of a sample may be projected to a negative y coordinate, for example, if negative horizontal prediction angles φ are used. The supplementary reference samples may be determined/constructed by projecting the reference samples in ref₁[x] on the horizontal line of reference samples 902 to the vertical line of reference samples 902 using the negative horizontal prediction angle φ.

An encoder may determine/predict samples of a current block being encoded (e.g., the current block 904) for a plurality of intra prediction modes (e.g., using one or more of the functions described herein). For example, an encoder may determine/predict samples of a current block for each of 35 intra prediction modes in HEVC and/or 67 intra prediction modes in VVC. The encoder may determine, for each intra prediction mode applied, a corresponding prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may determine/select one of the intra prediction modes to encode the current block based on the determined prediction errors. For example, the encoder may determine/select one of the intra prediction modes that results in the smallest prediction error for the current block. The encoder may determine/select the intra prediction mode to encode the current block based on a rate-distortion measure (e.g., Lagrangian rate-distortion cost) determined using the prediction errors. The encoder may send an indication of the determined/selected intra prediction mode and its corresponding prediction error (e.g., residual) to a decoder for decoding of the current block.

A decoder may determine/predict samples of a current block being decoded (e.g., the current block 904) for an intra prediction mode. For example, a decoder may receive an indication of an intra prediction mode (e.g., an angular intra prediction mode) from an encoder for a current block. The decoder may construct a set of reference samples and perform intra prediction based on the intra prediction mode indicated by the encoder for the current block in a similar manner (e.g., as described above for the encoder). The decoder may add predicted values of the samples (e.g., determined based on the intra prediction mode) of the current block to a residual of the current block to reconstruct the current block. A decoder need not receive an indication of an angular intra prediction mode from an encoder for a current block. A decoder may determine an intra prediction mode, for example, based on other criteria. While various examples herein correspond to intra prediction modes in HEVC and VVC, the methods, devices, and systems as described herein may be applied to/used for other intra prediction modes (e.g., as used in other video coding standards/formats, such as VP8, VP9, AV1, etc.).

Intra prediction may exploit correlations between spatially neighboring samples in the same picture of a video sequence to perform video compression. Inter prediction is another coding tool that may be used to perform video compression. Inter prediction may exploit correlations in the time domain between blocks of samples in different pictures of a video sequence. For example, an object may be seen across multiple pictures of a video sequence. The object may move (e.g., by some translation and/or affine motion) or remain stationary across the multiple pictures. A current block of samples in a current picture being encoded may have/be associated with a corresponding block of samples in a previously decoded picture. The corresponding block of samples may accurately predict the current block of samples. The corresponding block of samples may be displaced from the current block of samples, for example, due to movement of the object, represented in both blocks, across the respective pictures of the blocks. The previously decoded picture may be a reference picture. The corresponding block of samples in the reference picture may be a reference block for motion compensated prediction. An encoder may use a block matching technique to estimate the displacement (or motion) of the object and/or to determine the reference block in the reference picture.

An encoder may determine a difference between a current block and a prediction for a current block. An encoder may determine a difference, for example, based on/after determining/generating a prediction for a current block (e.g., using inter prediction). The difference may be a prediction error and/or as a residual. The encoder may store and/or send (e.g., signal), in/via a bitstream, the prediction error and/or other related prediction information. The prediction error and/or other related prediction information may be used for decoding and/or other forms of consumption. A decoder may decode the current block by predicting the samples of the current block (e.g., by using the related prediction information) and combining the predicted samples with the prediction error.

Figure 13A:
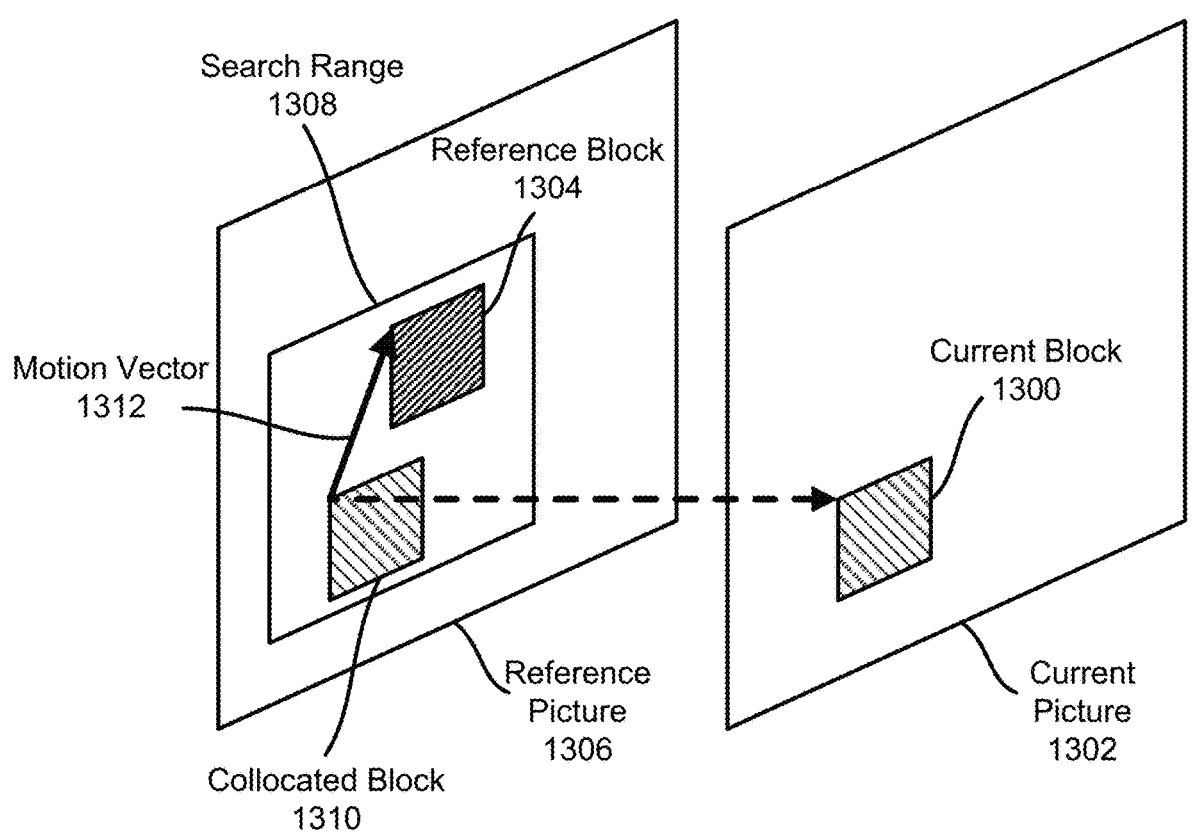
FIG. 13A shows an example of inter prediction.

FIG. 13A shows an example of inter prediction. The inter prediction may be performed for a current block 1300 in a current picture 1302 being encoded. An encoder (e.g., the encoder 200 as shown in FIG. 2) may perform inter prediction to determine and/or generate a reference block 1304 in a reference picture 1306. The reference block 1304 may be used to predict the current block 1300. Reference pictures (e.g., the reference picture 1306) may be prior decoded pictures available at the encoder and/or a decoder. Availability of a prior decoded picture may depend/be based on whether the prior decoded picture is available in a decoded picture buffer, at the time, the current block 1300 is being encoded and/or decoded. The encoder may search the one or more reference pictures 1306 for a block that is similar (or substantially similar) to the current block 1300. The encoder may determine the best matching block from the blocks tested during the searching process. The best matching block may be a reference block 1304. The encoder may determine that the reference block 1304 is the best matching reference block based on one or more cost criteria. The one or more cost criteria may comprise a rate-distortion criterion (e.g., Lagrangian rate-distortion cost). The one or more cost criteria may be based on a difference (e.g., SSD, SAD, and/or SATD) between prediction samples of the reference block 1304 and original samples of the current block 1300.

The encoder may search for the reference block 1304 within a reference region (e.g., a search range 1308). The reference region (e.g., a search range 1308) may be positioned around a collocated position (or block) 1310, of the current block 1300, in the reference picture 1306. The collocated block 1310 may have a same position in the reference picture 1306 as the current block 1300 in the current picture 1302. The reference region (e.g., a search range 1308) may at least partially extend outside of the reference picture 1306. Constant boundary extension may be used, for example, if the reference region (e.g., a search range 1308) extends outside of the reference picture 1306. The constant boundary extension may be used such that values of the samples in a row or a column of reference picture 1306, immediately adjacent to a portion of the reference region (e.g., a search range 1308) extending outside of the reference picture 1306, may be used for sample locations outside of the reference picture 1306. A subset of potential positions, or all potential positions, within the reference region (e.g., a search range 1308) may be searched for the reference block 1304. The encoder may utilize one or more search implementations to determine and/or generate the reference block 1304. For example, the encoder may determine a set of candidate search positions based on motion information of neighboring blocks (e.g., a motion vector 1312) to the current block 1300.

One or more reference pictures may be searched by the encoder during inter prediction to determine and/or generate the best matching reference block. The reference pictures searched by the encoder may be included in (e.g., added to) one or more reference picture lists. For example, in HEVC and VVC (and/or in one or more other communication protocols), two reference picture lists may be used (e.g., a reference picture list 0 and a reference picture list 1). A reference picture list may include one or more pictures. The reference picture 1306 of the reference block 1304 may be indicated by a reference index pointing into a reference picture list comprising the reference picture 1306.

Figure 13B:
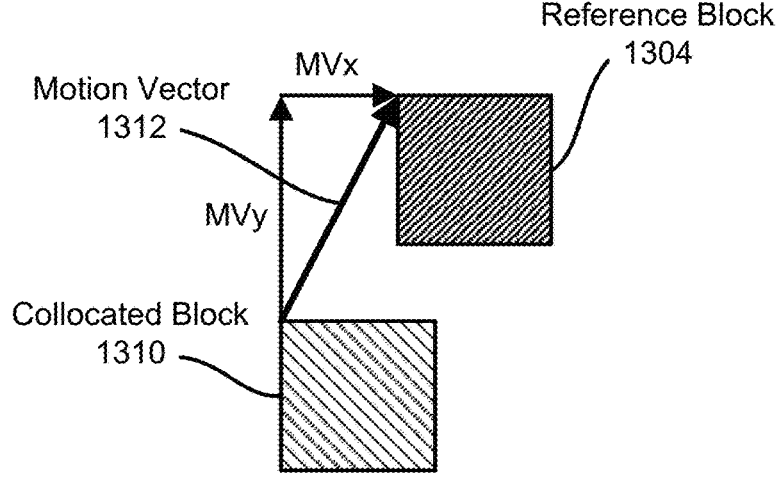
FIG. 13B shows an example motion vector.

FIG. 13B shows an example motion vector. A displacement between the reference block 1304 and the current block 1300 may be interpreted as an estimate of the motion between the reference block 1304 and the current block 1300 across their respective pictures. The displacement may be represented by a motion vector 1312. For example, the motion vector 1312 may be indicated by a horizontal component (MV$_x$) and a vertical component (MV$_y$) relative to the position of the current block 1300. A motion vector (e.g., the motion vector 1312) may have fractional or integer resolution. A motion vector with fractional resolution may point between two samples in a reference picture to provide a better estimation of the motion of the current block 1300. For example, a motion vector may have $\frac{1}{2}$, $\frac{1}{4}$, $\frac{1}{8}$, $\frac{1}{16}$, $\frac{1}{32}$, or any other fractional sample resolution. Interpolation between the two samples at integer positions may be used to generate a reference block and its corresponding samples at fractional positions, for example, if a motion vector points to a non-integer sample value in the reference picture. The interpolation may be performed by a filter with two or more taps.

The encoder may determine a difference (e.g., a corresponding sample-by-sample difference) between the reference block 1304 and the current block 1300. The encoder may determine the difference between the reference block 1304 and the current block 1300, for example, based on/after the reference block 1304 is determined and/or generated, using inter prediction, for the current block 1300. The difference may be a prediction error and/or a residual. The encoder may store and/or send (e.g., signal), in/via a bit-stream, the prediction error and/or related motion information. The prediction error and/or the related motion information may be used for decoding (e.g., decoding the current block 1300) and/or other forms of consumption. The motion information may comprise the motion vector 1312 and/or a reference indicator/index. The reference indicator may indicate the reference picture 1306 in a reference picture list. The motion information may comprise an indication of the motion vector 1312 and/or an indication of the reference index. The reference index may indicate reference picture 1306 in the reference picture list. A decoder may decode the current block 1300 by determining and/or generating the reference block 1304. The decoder may determine and/or generate the reference block 1304, for example, based on the prediction error and/or the related motion information. The reference block 1304 may correspond to/form (e.g., be considered as) a prediction of the current block 1300. The decoder may decode the current block 1300 based on combining the prediction with the prediction error.

Inter prediction, as shown in FIG. 13A, may be performed using one reference picture 1306 as a source of a prediction for the current block 1300. Inter prediction based on a prediction of a current block using a single picture may be referred to as uni-prediction.

Inter prediction of a current block, using bi-prediction, may be based on two pictures. Bi-prediction may be useful, for example, if a video sequence comprises fast motion, camera panning, zooming, and/or scene changes. Bi-prediction may be useful to capture fade outs of one scene or fade outs from one scene to another, where two pictures may effectively be displayed simultaneously with different levels of intensity.

One or both of uni-prediction and bi-prediction may be available/used for performing inter prediction (e.g., at an encoder and/or at a decoder). Performing a specific type of inter prediction (e.g., uni-prediction and/or bi-prediction) may depend on a slice type of current block. For example, for P slices, only uni-prediction may be available/used for performing inter prediction. For B slices, either uni-prediction or bi-prediction may be available/used for performing inter prediction. An encoder may determine and/or generate a reference block, for predicting a current block, from a reference picture list 0, for example, if the encoder is using uni-prediction. An encoder may determine and/or generate a first reference block, for predicting a current block, from a reference picture list 0 and determine and/or generate a second reference block, for predicting the current block, from a reference picture list 1, for example, if the encoder is using bi-prediction.

Figure 14:
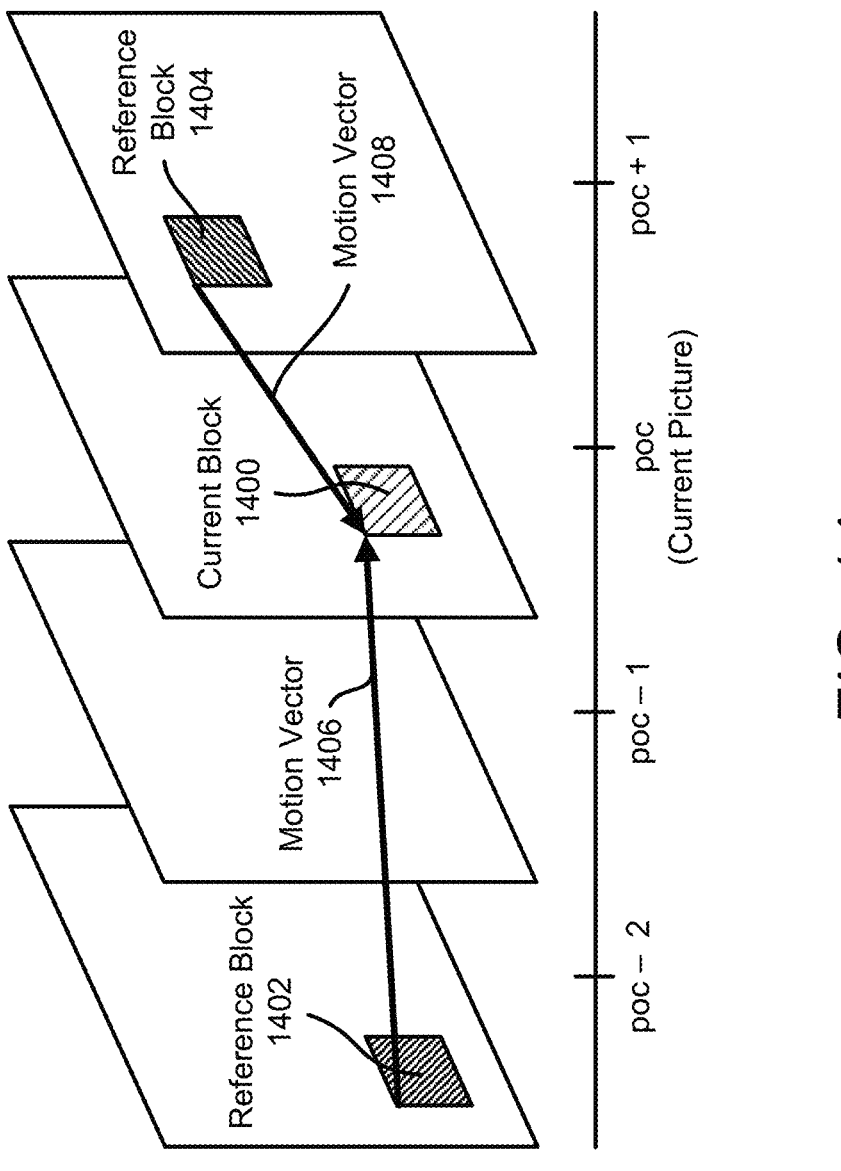
FIG. 14 shows an example of bi-prediction.

FIG. 14 shows an example of bi-prediction. Two reference blocks 1402 and 1404 may be used to predict a current block 1400. The reference block 1402 may be in a reference picture of one of reference picture list 0 or reference picture list 1. The reference block 1404 may be in a reference picture of another one of reference picture list 0 or reference picture list 1. As shown in FIG. 14, the reference block 1402 may be in a first picture that precedes (e.g., in time) a current picture of the current block 1400, and the reference block 1404 may be in a second picture that succeeds (e.g., in time) the current picture of the current block 1400. The first picture may precede the current picture in terms of a picture order count (POC). The second picture may succeed the current picture in terms of the POC. The reference pictures may both precede or both succeed the current picture in terms of POC. A POC may be/indicate an order in which pictures are output (e.g., from a decoded picture buffer). A POC may be/indicate an order in which pictures are generally intended to be displayed. Pictures that are output may not necessarily be displayed but may undergo different processing and/or consumption (e.g., transcoding). The two reference blocks determined and/or generated using/for bi-prediction may correspond to (e.g., be comprised in) a same reference picture. The reference picture may be included in both the reference picture list 0 and the reference picture list 1, for example, if the two reference blocks correspond to the same reference picture.

A configurable weight and/or offset value may be applied to one or more inter prediction reference blocks. An encoder may enable the use of weighted prediction using a flag in a picture parameter set (PPS). The encoder may send/signal the weight and/or offset parameters in a slice segment header for the current block 1400. Different weight and/or offset parameters may be sent/signaled for luma and/or chroma components.

The encoder may determine and/or generate the reference blocks 1402 and 1404 for the current block 1400 using inter prediction. The encoder may determine a difference between the current block 1400 and each of the reference blocks 1402 and 1404. The differences may be prediction errors or residuals. The encoder may store and/or send/signal, in/via a bitstream, the prediction errors and/or their respective related motion information. The prediction errors and their respective related motion information may be used for decoding and/or other forms of consumption. The motion information for the reference block 1402 may comprise a motion vector 1406 and/or a reference indicator/index. The reference indicator may indicate a reference picture, of the reference block 1402, in a reference picture list. The motion information for the reference block 1402 may comprise an indication of the motion vector 1406 and/or an indication of the reference index. The reference index may indicate the reference picture, of the reference block 1402, in the reference picture list.

The motion information for the reference block 1404 may comprise a motion vector 1408 and/or a reference index/indicator. The reference indicator may indicate a reference picture, of the reference block 1404, in a reference picture list. The motion information for the reference block 1404 may comprise an indication of motion vector 1408 and/or an indication of the reference index. The reference index may indicate the reference picture, of the reference block 1404, in the reference picture list.

A decoder may decode the current block 1400 by determining and/or generating the reference blocks 1402 and 1404. The decoder may determine and/or generate the reference blocks 1402 and 1404, for example, based on the prediction errors and/or the respective related motion information for the reference blocks 1402 and 1404. The reference blocks 1402 and 1404 may correspond to/form (e.g., be considered as) the predictions of the current block 1400. The decoder may decode the current block 1400 based on combining the predictions with the prediction errors.

Motion information may be predictively coded, for example, before being stored and/or sent/signaled in/via a bit stream (e.g., in HEVC, VVC, and/or other video coding standards/formats/protocols). The motion information for a current block may be predictively coded based on motion information of one or more blocks neighboring the current block. The motion information of the neighboring block(s) may often correlate with the motion information of the current block because the motion of an object represented in the current block is often the same as (or similar to) the motion of objects in the neighboring block(s). Motion information prediction techniques may comprise advanced motion vector prediction (AMVP) and/or inter prediction block merging.

An encoder (e.g., the encoder 200 as shown in FIG. 2), may code a motion vector. The encoder may code the motion vector (e.g., using AMVP) as a difference between a motion vector of a current block being coded and a motion vector predictor (MVP). An encoder may determine/select the MVP from a list of candidate MVPs. The candidate MVPs may be/correspond to previously decoded motion vectors of neighboring blocks in the current picture of the current block, and/or blocks at or near the collocated position of the current block in other reference pictures. The encoder and/or a decoder may generate and/or determine the list of candidate MVPs.

The encoder may determine/select an MVP from the list of candidate MVPs. The encoder may send/signal, in/via a bitstream, an indication of the selected MVP and/or a motion vector difference (MVD). The encoder may indicate the selected MVP in the bitstream using an index/indicator. The index may indicate the selected MVP in the list of candidate MVPs. The MVD may be determined/calculated based on a difference between the motion vector of the current block and the selected MVP. For example, for a motion vector that indicates a position (e.g., represented by a horizontal component ($MV_x$) and a vertical component ($MV_y$)) relative to a position of the current block being coded, the MVD may be represented by two components $MVD_x$ and $MVD_y$. $MVD_x$ and $MVD_y$ may be determined/calculated as:

$$MVD_x = MV_x - MVP_x \qquad (15)$$

$$MVD_y = MV_y - MVP_y \qquad (16)$$

$MVD_x$ and $MVD_y$ may respectively represent horizontal and vertical components of the MVD. $MVP_x$ and $MVP_y$ may respectively represent horizontal and vertical components of the MVP. A decoder (e.g., the decoder 300 as shown in FIG. 3) may decode the motion vector by adding the MVD to the MVP indicated in/via the bitstream. The decoder may decode the current block by determining and/or generating the reference block. The decoder may determine and/or generate the reference block, for example, based on the decoded motion vector. The reference block may correspond to/form (e.g., be considered as) the prediction of the current block. The decoder may decode the current block by combining the prediction with the prediction error.

The list of candidate MVPs (e.g., in HEVC, VVC, and/or one or more other communication protocols), for AMVP, may comprise two or more candidates (e.g., candidates A and B). Candidates A and B may comprise: up to two (or any other quantity of) spatial candidate MVPs determined/derived from five (or any other quantity of) spatial neighboring blocks of a current block being coded; one (or any other quantity of) temporal candidate MVP determined/derived from two (or any other quantity of) temporal, co-located blocks (e.g., if both of the two spatial candidate MVPs are not available or are identical); and/or zero motion vector candidate MVPs (e.g., if one or both of the spatial candidate MVPs or temporal candidate MVPs are not available). Other quantities of spatial candidate MVPs, spatial neighboring blocks, temporal candidate MVPs, and/or temporal, co-located blocks may be used for the list of candidate MVPs.

Figure 15A:
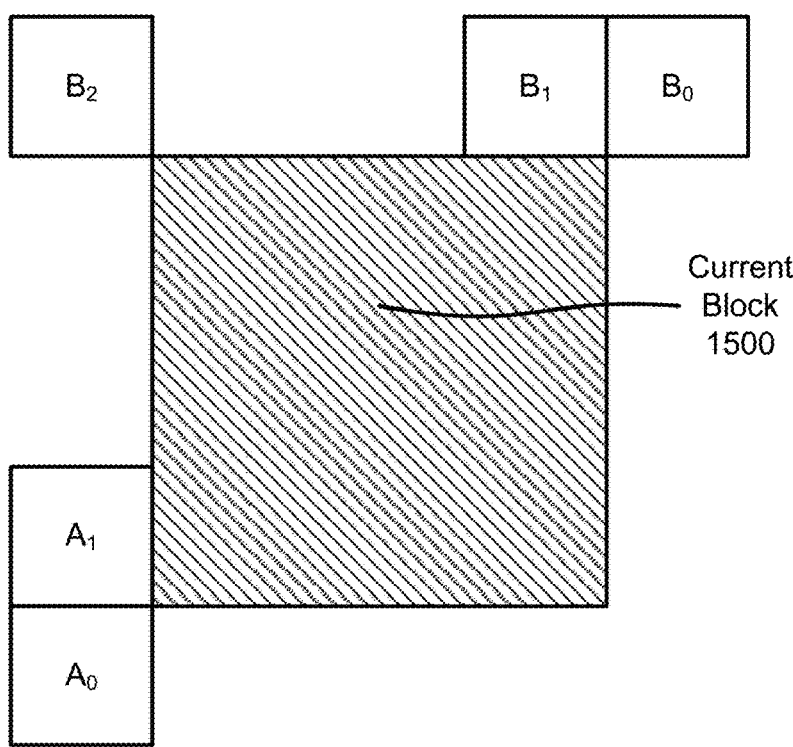
FIG. 15A shows example spatial candidate neighboring blocks for a current block.
Figure 15B:
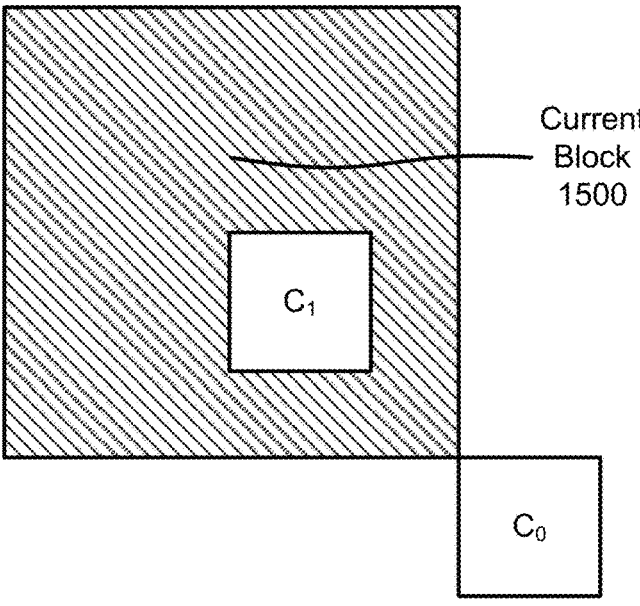
FIG. 15B shows example temporal, co-located blocks for a current block.

FIG. 15A shows spatial candidate neighboring blocks for a current block. For example, five (or any other quantity of) spatial candidate neighboring blocks may be located relative to a current block 1500 being encoded. The five spatial candidate neighboring blocks may be $A_0$, $A_1$, $B_0$, $B_1$, and $B_2$. FIG. 15B shows temporal, co-located blocks for the current block. For example, two (or any other quantity of) temporal, co-located blocks may be located relative to the current block 1500. The two temporal, co-located blocks may be $C_0$ and $C_1$. The two temporal, co-located blocks may be in one or more reference pictures that may be different from the current picture of the current block 1500.

An encoder (e.g., the encoder 200 as shown in FIG. 2) may code a motion vector using inter prediction block merging (e.g., a merge mode). The encoder (e.g., using merge mode) may reuse the same motion information of a neighboring block (e.g., one of neighboring blocks $A_0$, $A_1$, $B_0$, $B_1$, and $B_2$) for inter prediction of a current block. The encoder (e.g., using merge mode) may reuse the same motion information of a temporal, co-located block (e.g., one of temporal, co-located blocks $C_0$ and $C_1$) for inter prediction of a current block. An MVD need not be sent (e.g., indicated, signaled) for the current block because the same motion information as that of a neighboring block or a temporal, co-located block may be used for the current block (e.g., at the encoder and/or a decoder). A signaling overhead for sending/signaling the motion information of the current block may be reduced because the MVD need not be indicated for the current block. The encoder and/or the decoder may generate a candidate list of motion information from neighboring blocks or temporal, co-located blocks of the current block (e.g., in a manner similar to AMVP). The encoder may determine to use (e.g., inherit) motion information, of one neighboring block or one temporal, co-located block in the candidate list, for predicting motion information of the current block being coded. The encoder may signal/send, in/via a bit stream, an indication of the determined motion information from the candidate list. For example, the encoder may signal/send an indicator/index. The index may indicate the determined motion information in the list of candidate motion information. The encoder may signal/send the index to indicate the determined motion information.

A list of candidate motion information for merge mode (e.g., in HEVC, VVC, or any other coding formats/standards/protocols) may comprise: up to four (or any other quantity of) spatial merge candidates derived/determined from five (or any other quantity of) spatial neighboring blocks (e.g., as shown in FIG. 15A); one (or any other quantity of) temporal merge candidate derived from two (or any other quantity of) temporal, co-located blocks (e.g., as shown in FIG. 15B); and/or additional merge candidates comprising bi-predictive candidates and zero motion vector candidates. The spatial neighboring blocks and the temporal, co-located blocks used for merge mode may be the same as the spatial neighboring blocks and the temporal, co-located blocks used for AMVP.

Inter prediction may be performed in other ways and variants than those described herein. For example, motion information prediction techniques other than AMVP and merge mode may be used. While various examples herein correspond to inter prediction modes, such as used in HEVC and VVC, the methods, devices, and systems as described herein may be applied to/used for other inter prediction modes (e.g., as used for other video coding standards/formats such as VP8, VP9, AV1, etc.). History based motion vector prediction (HMVP), combined intra/inter prediction mode (CIIP), and/or merge mode with motion vector difference (MMVD) (e.g., as described in VVC) may be performed/used and are within the scope of the present disclosure.

Block matching may be used (e.g., in inter prediction) to determine a reference block in a different picture than that of a current block being encoded. Block matching may be used to determine a reference block in a same picture as that of a current block being encoded. The reference block, in a same picture as that of the current block, as determined using block matching may often not accurately predict the current block (e.g., for camera captured videos). Prediction accuracy for screen content videos may not be similarly impacted, for example, if a reference block in the same picture as that of the current block is used for encoding. Screen content videos may comprise, for example, computer generated text, graphics, animation, etc. Screen content videos may comprise (e.g., may often comprise) repeated patterns (e.g., repeated patterns of text and/or graphics) within the same picture. Using a reference block (e.g., as determined using block matching), in a same picture as that of a current block being encoded, may provide efficient compression for screen content videos.

A prediction technique may be used (e.g., in HEVC, VVC, and/or any other coding standards/formats/protocols) to exploit correlation between blocks of samples within a same picture (e.g., of screen content videos). The prediction technique may be intra block copy (IBC) or current picture referencing (CPR). An encoder may apply/use a block matching technique (e.g., similar to inter prediction) to determine a displacement vector (e.g., a block vector (BV)). The BV may indicate a relative position of a reference block (e.g., in accordance with intra block compensated prediction), that best matches the current block, from a position of the current block. For example, the relative position of the reference block may be a relative position of a top-left corner (or any other point/sample) of the reference block. The BV may indicate a relative displacement from the current block to the reference block that best matches the current block. The encoder may determine the best matching reference block from blocks tested during a searching process (e.g., in a manner similar to that used for inter prediction). The encoder may determine that a reference block is the best matching reference block based on one or more cost criteria. The one or more cost criteria may comprise a rate-distortion criterion (e.g., Lagrangian rate-distortion cost). The one or more cost criteria may be based on, for example, one or more differences (e.g., an SSD, an SAD, an SATD, and/or a difference determined based on a hash function) between the prediction samples of the reference block and the original samples of the current block. A reference block may correspond to/comprise prior decoded blocks of samples of the current picture. The reference block may comprise decoded blocks of samples of the current picture prior to being processed by in-loop filtering operations (e.g., deblocking and/or SAO filtering).

FIG. 16 shows an example of IBC for encoding. The example IBC shown in FIG. 16 may correspond to screen content. The rectangular portions/sections with arrows beginning at their boundaries may be the current blocks being encoded. The rectangular portions/sections that the arrows point to may be the reference blocks for predicting the current blocks.

A reference block may be determined and/or generated, for a current block, for IBC. The encoder may determine a difference (e.g., a corresponding sample-by-sample difference) between the reference block and the current block. The difference may be a prediction error or residual. The encoder may store and/or send/signal, in/via a bitstream the prediction error and/or related prediction information. The prediction error and/or the related prediction information may be used for decoding and/or other forms of consumption. The prediction information may comprise a BV. The prediction information may comprise an indication of the BV. A decoder (e.g., the decoder 300 as shown in FIG. 3), may decode the current block by determining and/or generating the reference block. The decoder may determine and/or generate the current block, for example, based on the prediction information (e.g., the BV). The reference block may correspond to/form (e.g., be considered as) the prediction of the current block. The decoder may decode the current block by combining the prediction with the prediction error.

A BV may be predictively coded (e.g., in HEVC, VVC, and/or any other coding standards/formats/protocols) before being stored and/or sent/signaled in/via a bit stream. The BV for a current block may be predictively coded based on a BV of one or more blocks neighboring the current block. For example, an encoder may predictively code a BV using the merge mode (e.g., in a manner similar to as described herein for inter prediction), AMVP (e.g., as described herein for inter prediction), or a technique similar to AMVP. The technique similar to AMVP may be BV prediction and difference coding (or AMVP for IBC).

An encoder (e.g., the encoder 200 as shown in FIG. 2) performing BV prediction and coding may code a BV as a difference between the BV of a current block being coded and a block vector predictor (BVP). An encoder may select/determine the BVP from a list of candidate BVPs. The candidate BVPs may comprise/correspond to previously decoded BVs of neighboring blocks in the current picture of the current block. The encoder and/or a decoder may generate or determine the list of candidate BVPs.

The encoder may send/signal, in/via a bitstream, an indication of the selected BVP and a block vector difference (BVD). The encoder may indicate the selected BVP in the bitstream using an index/indicator. The index may indicate the selected BVP in the list of candidate BVPs. The BVD may be determined/calculated based on a difference between a BV of the current block and the selected BVP. For example, for a BV that indicates a position (e.g., represented by a horizontal component ($BV_x$) and a vertical component ($BV_y$)) relative to a position of the current block being coded, the BVD may represented by two components $BVD_x$ and $BVD_y$. $BVD_x$ and $BVD_y$ may be determined/calculated as:

$$BVD_x=BV_x-BVP_x \qquad (17)$$

$$BVD_y=BV_y-BVP_y \qquad (18)$$

$BVD_x$ and $BVD_y$ may respectively represent horizontal and vertical components of the BVD. $BVP_x$ and $BVP_y$ may respectively represent horizontal and vertical components of the BVP. A decoder (e.g., the decoder 300 as shown in FIG. 3), may decode the BV by adding the BVD to the BVP indicated in/via the bitstream. The decoder may decode the current block by determining and/or generating the reference block. The decoder may determine and/or generate the reference block, for example, based on the decoded BV. The reference block may correspond to/form (e.g., be considered as) the prediction of the current block. The decoder may decode the current block by combining the prediction with the prediction error.

A same BV as that of a neighboring block may be used for the current block and a BVD need not be separately signaled/sent for the current block, such as in the merge mode. A BVP (in the candidate BVPs), which may correspond to a decoded BV of the neighboring block, may itself be used as a BV for the current block. Not sending the BVD may reduce the signaling overhead.

A list of candidate BVPs (e.g., in HEVC, VVC, and/or any other coding standard/format/protocol) may comprise two (or more) candidates. The candidates may comprise candidates A and B. Candidates A and B may comprise: up to two (or any other quantity of) spatial candidate BVPs determined/derived from five (or any other quantity of) spatial neighboring blocks of a current block being encoded; and/or one or more of last two (or any other quantity of) coded BVs (e.g., if spatial neighboring candidates are not available). Spatial neighboring candidates may not be available, for example, if neighboring blocks are encoded using intra prediction or inter prediction. Locations of the spatial candidate neighboring blocks, relative to a current block, being encoded using IBC may be illustrated in a manner similar to spatial candidate neighboring blocks used for coding motion vectors in inter prediction (e.g., as shown in FIG. 15A). For example, five spatial candidate neighboring blocks for IBC may be respectively denoted $A_0$, $A_1$, $B_0$, $B_1$, and $B_2$.

Referring back to FIG. 16, in an Intra Block Copy (IBC) mode used for screen content, a Reference Block (RB) may be determined as a "best matching" RB to a Current Block (CB). For example, the arrows in FIG. 16 may correspond to Block Vectors (BVs) that indicate respective displacements from respective Current Blocks (CBs) to respective Reference Blocks (RBs) that "best match" the respective CBs. The RBs may match the respective CBs, and the calculated residuals may be small, if not zero. Video content may be more efficiently encoded by considering symmetry properties. Symmetry may be often present in video content, especially in text character regions and computer-generated graphics in screen content video.

As an extension to Intra Block Copy (IBC) mode, a Reconstruction-Reordered Intra Block Copy (RRIBC) mode (e.g., also referred to as IBC mirror mode) may be for screen content video coding to take advantage of symmetry within video content to further improve the coding efficiency of IBC. The RRIBC mode may be adopted into the Enhanced Compression Model (ECM) software algorithm that is currently under coordinated exploration study by the Joint Video Exploration Team (JVET) of ITU-T Video Coding Experts Group (VCEG) and ISO/IEC MPEG as a potential enhanced video coding technology beyond the capabilities of VVC. A residual for the CB may be calculated based on samples of a Reference Block (RB) (e.g., samples corresponding to an original RB being encoded and decoded to form a reconstructed block) being flipped relative to the CB according to a flip direction indicated for the CB, for example, if the RRIBC mode is indicated for encoding a Current Block (CB). At the encoder side, the CB (to be predicted) may be flipped, for example, before matching and residual calculation, and the RB (used to predict the current block) may be derived without flipping. Similarly, at the decoder side, the CB (that was flipped at the encoder) may be determined based on the RB and residual information, and may be flipped back to restore the original orientation of the current block before being flipped at the encoder side. The RB may be flipped instead of the CB being flipped, such that the RB may be flipped to encode the CB (at the encoder) and may be flipped back (at the decoder) to restore the original orientation of the RB at the encoder. Throughout this detailed specification, reference to flipping the CB may alternatively refer to flipping the RB and not the CB such that the RB and the CB may be flipped in the flipping direction with respect to each other.

The flipping direction, in the RRIBC mode, may include one of a horizontal direction or a vertical direction for RRIBC coded blocks. A first indication (e.g., a first syntax flag; also referred to as a RRIBC type flag or an IBC mirror mode flag) for a Current Block (CB) coded in the RRIBC mode (e.g., an IBC Advanced Motion Vector Prediction (AMVP) coded block) may indicate/signal whether to use flipping to encode/decode the CB. A second indication (e.g., a second syntax flag; also referred to as a RRIBC direction flag or an IBC mirror mode direction flag) for the CB may indicate/signal the direction for flipping (e.g., a vertical or horizontal flipping direction). The flipping direction for IBC merge mode may be inherited from neighboring blocks, without syntax signaling. Flipping of a CB (or a Reference Block (RB) in an alternative embodiment) for RRIBC in a horizontal and a vertical direction can be represented in equations (19) and (20), respectively:

$$\text{Reference}(x,y)=\text{Sample}(w-1-x,y) \qquad (19)$$

$$\text{Reference}(x,y)=\text{Sample}(x,h-1-y) \qquad (20)$$

where w and h are the width and height of a CB, respectively. For example, Sample(x, y) may indicate a sample value located in (x, y), and Reference(x, y) may indicate a corresponding reference sample value, for example, after flipping. In other words, for horizontal flipping, (19) shows that the CB is flipped in the horizontal direction by sampling from right to left. Similarly, for vertical flipping, (20) shows that the CB is flipped in the vertical direction by sampling the CB from down to up.

Figure 17A:
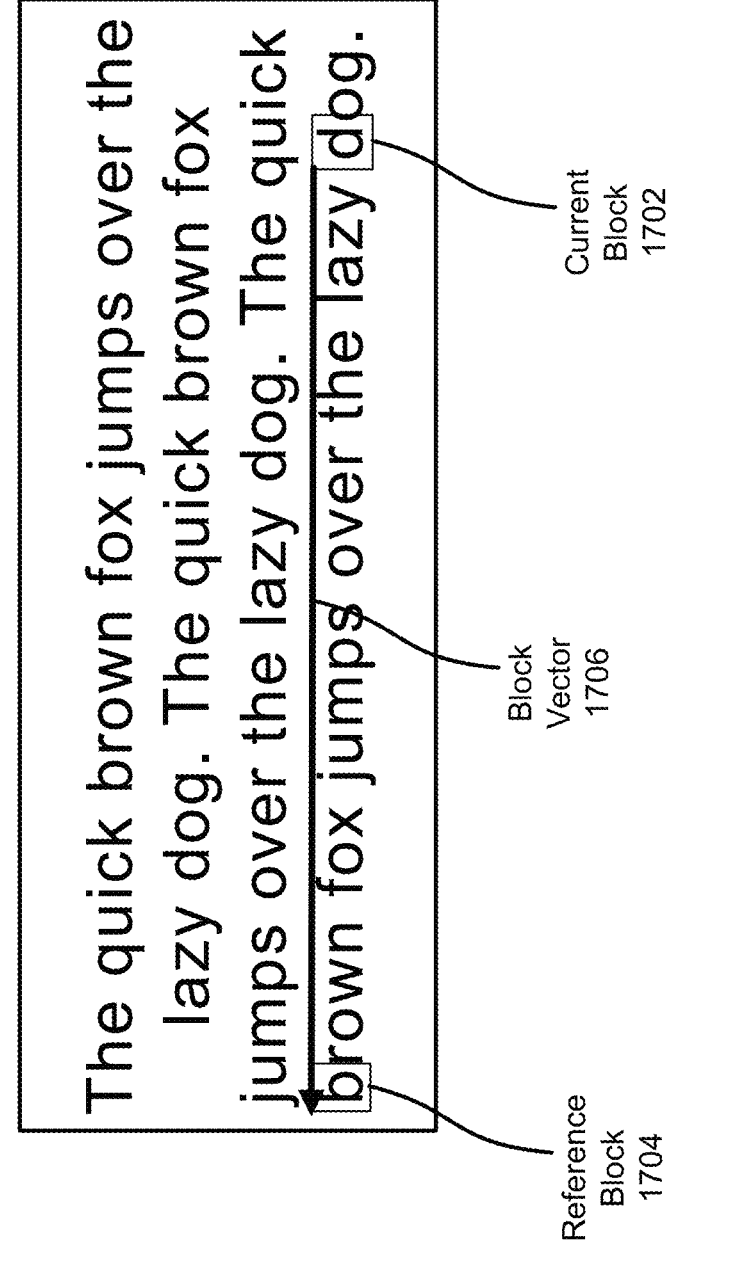
FIG. 17A shows an example of Reconstruction-Reordered Intra Block Copy (RRIBC) or Intra Block Copy (IBC) mirror mode for predictive coding of screen content.

FIG. 17A shows an example of Reconstruction-Reordered Intra Block Copy (RRIBC) or Intra Block Copy (IBC) mirror mode. More specifically, FIG. 17A shows an example of RRIBC or IBC mirror mode used for predictive coding of screen content. A RRIBC mode may be used for screen content to utilize symmetry within text regions to increase efficiency for coding video content. An encoder, similar to the encoder described herein with respect to FIG. 16 (e.g., encoder 114 of FIG. 1), may determine that a Reference Block (RB) 1704 is the "best matching" reference block for a Current Block (CB) 1702. The encoder may determine that RB 1704 is the "best matching" RB for CB 1702, for example, based on using (e.g., applying) horizontal flipping. The encoder may select RB 1704 as the "best matching" reference block, for example, based on one or more cost criterion, such as a rate-distortion criterion, as described herein. The one or more cost criterion may be used with respect to RB 1704 flipped in the horizontal direction relative to CB 1702. CB 1702 may be flipped, for example, before the one or more cost criterion are used to determine RB 1704. RB 1704, for flipping in the horizontal direction, may be located in a reference region, where the reference region may be in horizontal alignment with CB 1702. A Block Vector (BV), e.g., BV 1706, may indicate the displacement between CB 1702 and RB 1704.

FIG. 17B shows an example of RRIBC or IBC mirror mode for horizontal flipping and vertical flipping. More specifically, FIG. 17B shows an example of RRIBC or IBC mirror mode for horizontal flipping and vertical flipping exploiting symmetricity for predictive coding of screen content. Several examples of RRIBC with flipping are shown in FIG. 17B. Block prediction with flipping in a RRIBC mode may be performed to take advantage of symmetricity of depicted objects, so that a part of the object may be very similar to another part if it is mirrored horizontally or vertically. These symmetric parts may be close to each other because these symmetric parts are a part of the same object, and therefore, smaller Block Vector (BV) magnitudes may be more probable than larger BV magnitudes.

An encoder may determine, for example, that a Reference Block (RB) 1704 may be the "best matching" reference block for a Current Block (CB) 1702. The encoder may determine that RB 1704 may be the "best matching" reference block for CB 1702, for example, based on using (e.g., applying) horizontal or vertical flipping. The encoder may select RB 1704 as the "best matching" reference block, for example, based on one or more cost criterion, such as a rate-distortion criterion, as described herein. The one or more cost criterion may be used with respect to RB 1704 flipped in the horizontal or vertical direction relative to CB 1702. CB 1702 may be flipped, for example, before the one or more cost criterion are used to determine RB 1704. RB 1704, for flipping in the horizontal or vertical direction, may be located in a reference region, where the reference region may be in horizontal or vertical alignment with CB 1702. A Block Vector (BV), e.g., BV 1706, may indicate the displacement between CB 1702 and RB 1704.

A reference block (that may be flipped in a direction relative to the current block) may be constrained to (i.e., selected from) a RRIBC reference region, corresponding to the direction, where the RRIBC reference region may be a subset of or within the IBC reference region. A Block Vector Predictor (BVP) may be used to predictively code a BV, for a current block, indicating a relative displacement from the current block to a reference block within the reference region (e.g., RRIBC region). Based on the RRIBC mode being indicated and based on a direction for flipping a reference block relative to a current block, the reference region (e.g., a RRIBC reference region) may be determined that corresponds to the direction for flipping. The reference region may indicate a region within a picture frame from which the reference block may be selected (e.g., after flipping of the CB). A Block Vector Predictor (BVP) may be used to predictively code a BV. A Block Vector Difference (BVD) may be determined as a difference between the BV and the BVP. The BVD may be determined, based on the BVP, as a difference between the BV and the BVP. The BVD may be encoded and sent (e.g., transmitted) along with an indication of the selected BVP in a bitstream for decoding of the CB. Examples of BVD signaling for encoding and decoding of the CB are discussed herein with regard to FIG. 18 and FIG. 19.

FIG. 18 shows an example of Block Vector Difference (BVD) signaling. FIG. 18 further shows a first example of BVD signaling with respect to VVC approaches. A first flag for signaling a BVD in the bitstream may be an "abs_bvd_greater0_flag" 1801, where the "abs_bvd_greater0_flag" 1801 may be context-coded (e.g., using Context-Aware Binary Arithmetic Coding (CABAC)). For example, this first flag may indicate that an absolute value of a magnitude of a non-null component of the BVD may be greater than 0 (or, e.g., not null). A second flag for signaling the BVD in the bitstream may be an "abs_bvd_greater1_flag" 1802, where the "abs_bvd_greater1_flag" 1802 may be also context-coded. This second flag may indicate that the absolute value of the magnitude of the non-null component of the BVD may be greater than 1. A component of the BVD may be signaled using Exponential-Golomb (Exp-Golomb) code, where the Exp-Golomb code may include a bypass-coded prefix 1803 and a bypass-coded suffix 1804. Bypass coding may be based on equiprobable (bypass) CABAC mode. A sign of the BVD may be signaled as a bypass-coded sign 1805.

Figure 19:
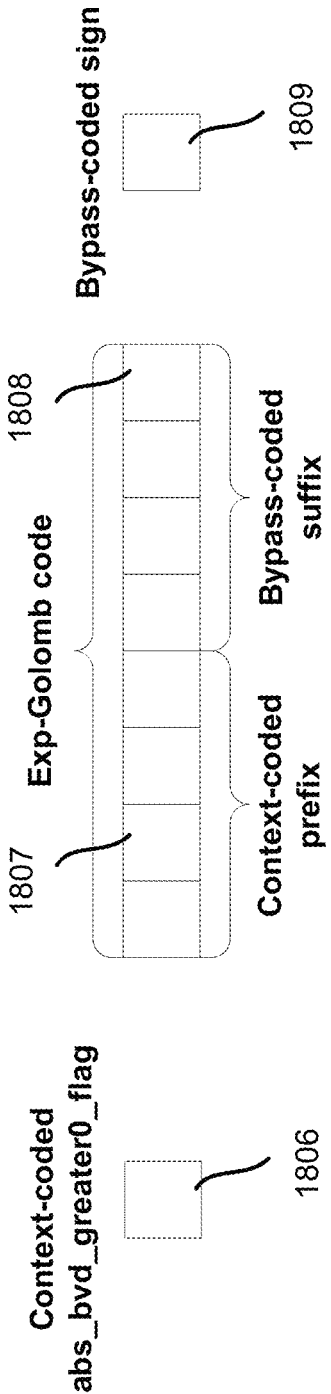
FIG. 19 shows an example of BVD signaling.

FIG. 19 shows an example of BVD signaling, where each block on FIG. 19 may represent one bin of the BVD signaling. FIG. 19 shows another BVD signaling syntax adopted into the ECM software where the "abs_bvd_greater1_flag" 1802 (as shown in FIG. 18) may be removed, and the first five (5) bins of the BVD signaled in the bitstream may be context-coded (e.g., using Context-Aware Binary Arithmetic Coding (CABAC)). A first flag for signaling a BVD in the bitstream may be an "abs_bvd_greater0_flag" 1806 and may be context-coded. This first flag may indicate that an absolute value of a magnitude of a non-null component of the BVD is greater than 0 (or, e.g., not null). A component of the BVD may be signaled using Exponential-Golomb (Exp-Golomb) code and may include a context-coded prefix 1807 and a bypass-coded suffix 1808. Bypass coding may be based on equiprobable (bypass) CABAC mode. A sign of the BVD may be signaled as a bypass-coded sign 1809.

A Block Vector (BV) may have only one non-zero (or, e.g., non-null) component, for example, if a Current Block (CB) is predicted using a Reconstruction-Reordered Intra Block Copy (RRIBC) mode. The range of valid BV component values may be limited based on the distance from the boundary of the predicted CU to the corresponding slice boundary and a dimension of the CB. The valid range of a horizontal component of a BV may be [−cbX, −cbWidth], for example, if the CB is predicted using RRIBC horizontal flipping mode. The valid range of a vertical component of a BV may be [−cbY, −cbHeight], for example, if the CB is predicted using RRIBC vertical flipping mode. However, at least some approaches for RRIBC do not take into account these restricted valid ranges of components of the BV for signaling the BV in the bitstream, or for reconstructing the BV based on a Block Vector Predictor (BVP) and a Block Vector Difference (BVD). For example, at least some approaches for RRIBC may signal indications of the BVP, as well as component signs and magnitudes of the BVD, for reconstructing the BV. Further, at least some approaches for RRIBC may not accommodate for a circumstance where samples of a Reference Block (RB) may be unavailable due to the proximity of the RB to a boundary of a reference region and to the CB. In RRIBC mode, block prediction with flipping is performed to take advantage of symmetricity of depicted objects, so that a part of the object may be very similar to another part if it is mirrored horizontally or vertically. However, these symmetric parts may be typically close to each other because these symmetric parts are a part of the same object, and therefore, smaller Block Vector (BV) magnitudes may be more probable than larger BV magnitudes. This may result in samples of the RB being unavailable for predicting the CB.

Improvements described herein include advantages such as determining, based on an indication of a Reconstruction-Reordered Intra Block Copy (RRIBC) flipping mode, a Block Vector (BV) based on a BV offset value and an indication of a magnitude of at least one component of a Block Vector Difference (BVD). An encoder or decoder may determine the BV offset value, for example, based on the indication of the RRIBC flipping mode and a dimension of a Current Block (CB). The encoder may determine at least one component of the BVD, for example, based on a combination of the BV and the BV offset value. The encoder may signal, in a bitstream, an indication of flipping a Reference Block (RB) for predicting the CB and the magnitude of the at least one component of the BVD. The encoder may skip (e.g., not perform) signaling, and the decoder may skip (e.g., not perform) parsing, of a BVD sign from the bitstream because the sign of the BVD may be determined, for example, based on the indication of the RRIBC flipping mode. The encoder may skip (e.g., not perform) signaling, and the decoder may skip (e.g., not perform) parsing, of a Block Vector Predictor (BVP) index from the bitstream because the BV may be determined, for example, based on the indication of the RRIBC flipping mode, the BV offset value, and the magnitude of the at least one component of the BVD. The BV offset value may be determined, for example, based on a width of the CB or a height of the CB. The encoder or decoder may determine an unavailable portion of one or more reference samples of the RB. The encoder or decoder may determine an unavailable portion of one or more reference samples of the RB, for example, based on comparing a dimension of the CB and a dimension of a Reference Block (RB) according to the RRIBC flipping direction. The encoder or decoder may determine replacement sample values for the unavailable portion of reference samples of the RB, for example, based on other available sample values. The encoder or decoder may determine that the at least one component of the BVD may be equal to zero (or, e.g., null). The encoder or decoder may determine that the at least one component of the BVD may be equal to zero (or, e.g., null), for example, based on a position of the CB relative to a boundary of the reference region. Consequently, the encoder may skip (e.g., not perform) signaling, and a decoder may skip (e.g., not perform) parsing, of the at least one component of the BVD in the bitstream. Skipping signaling of the BVD component may result in improved compression performance at least because the skipping may lead to a bitrate reduction of an encoded bitstream. Skipping parsing of the BVD component may improve depression performance at least because the skipping may lead to an improvement of decoding efficiency.

Figure 20:
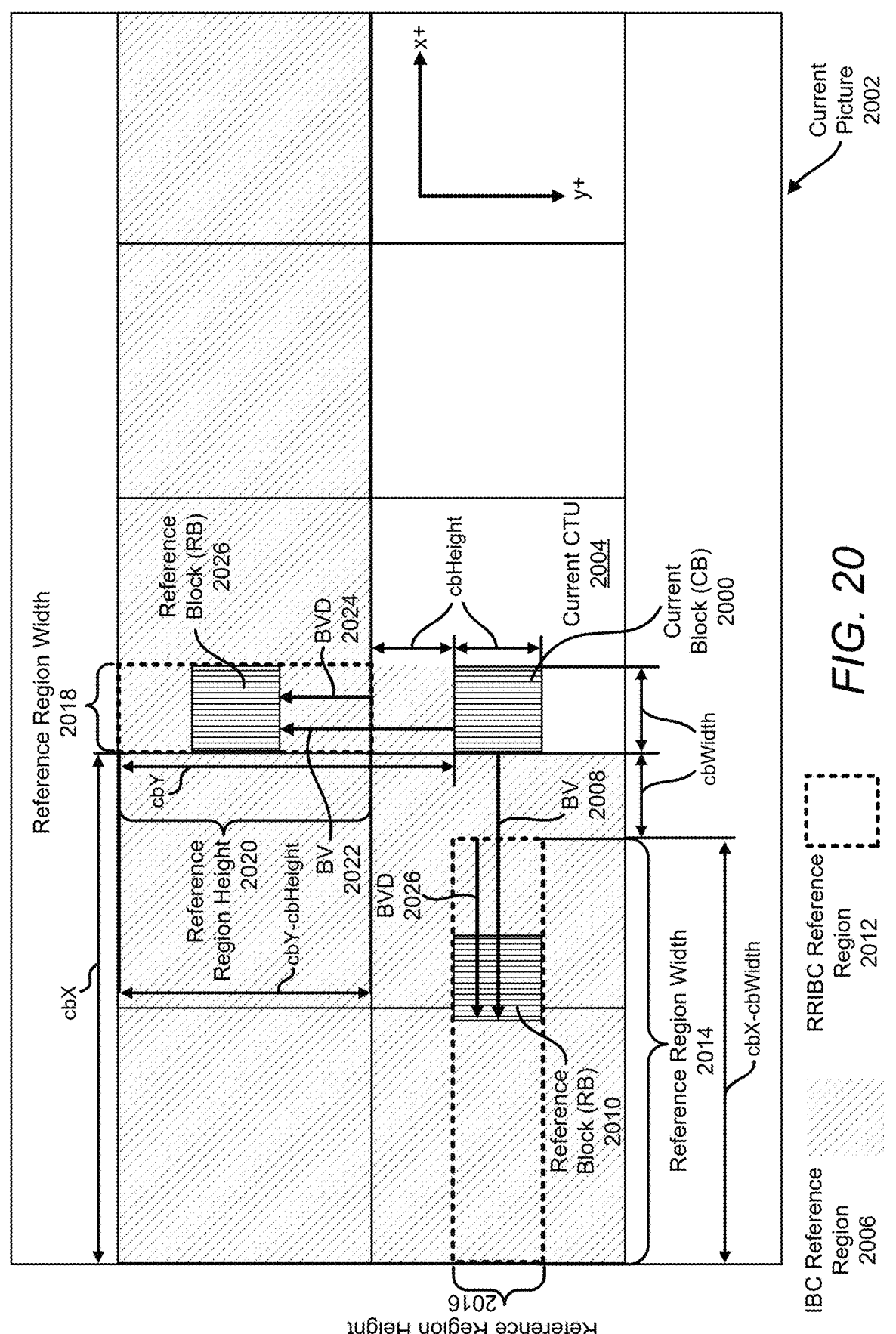
FIG. 20 shows an example of RRIBC predictive coding for horizontal flipping and vertical flipping.

FIG. 20 shows an example of Reconstruction-Reordered Intra Block Copy (RRIBC) predictive coding for horizontal flipping and vertical flipping. Because RRIBC predictive coding may be based on Intra Block Copy (IBC) predictive coding, an example of IBC predictive coding is discussed herein.

FIG. 20 shows an example of IBC predictive coding. In FIG. 20, an encoder, such as encoder 200 described herein with respect to FIG. 2, may use an IBC mode with respect to code a Current Block (CB) 2000 in a current picture (or portion of a current picture) 2002. CB 2000 may be a coding block within a Coding Tree Unit (CTU) 2004. IBC may search for a reference block in the same, current picture as the current block, unlike inter prediction that searches for a reference block in a prior decoded picture that is different than the picture of the current block being encoded. As a result, only part of the current picture may be available for searching for a reference block in IBC, for example, only the part of the current picture that has been decoded (e.g., reconstructed or encoded then decoded) prior to the encoding of the current block. This may ensure the encoding and decoding systems can produce identical results but may limit the IBC reference region.

Blocks may be scanned from left-to-right, top-to-bottom using a z-scan to form the sequence order for encoding/decoding, for example, in HEVC, VVC, and other video compression standards. CTUs (represented by the large, square tiles shown in FIG. 20) to the left and above current CTU 2004 may be encoded/decoded (i.e., reconstructed) prior to current CTU 2004 and CB 2000, for example, based on the z-scan. The samples of these CTUs (shown with hatching in FIG. 20) may form an exemplary IBC reference region 2006 for determining a reference block to predict CB 2000. In other video encoders and decoders, a different sequence order for encoding/decoding may be used, which may influence IBC reference region 2006 accordingly.

One or more additional reference region constraints may be placed on IBC reference region 2006, in addition to the encoding/decoding sequence order. IBC reference region 2006 may be constrained, for example, based on a limited memory for storing reference samples or to CTUs based on a parallel processing approach. The parallel processing approach may include, for example, tiles or wavefront parallel processing (WPP). Tiles may be used as part of a picture partitioning process for flexibly subdividing a picture into rectangular regions of CTUs such that coding dependencies between CTUs of different tiles may not be allowed. WPP may be similarly used as part of a picture partitioning process for partitioning a picture into CTU rows such that dependencies between CTUs of different partitions may not be allowed. Each of these tools may enable parallel processing of the picture partitions.

Reference to a position of a block throughout this disclosure may refer to the position of the block's top-left sample. However, in other examples, the position of a block may be determined by the position of another sample in the block. The position of a sample in a picture may be indicated by a sample number in the horizontal direction (given by the variable x) and a sample number in the vertical direction (given by the variable y) relative to the origin ((x, y)=(0,0)) of the picture coordinate system in the top left corner of the picture or relative to the top left sample of a block (e.g., a CTU), in which the sample may be located within. In the horizontal x direction, the positive direction may be to the right. As x increases, the sample location moves farther right in the positive, horizontal direction. In the vertical y direction, the positive direction is down. As y increases, the sample location moves farther down in the positive, vertical direction. The horizontal x-axis and vertical y-axis may be indicated in the lower right-hand corner of current picture 2002 for reference purposes. In the example shown in FIG. 20, the x-axis may increase from left to right, and the y-axis may increase from top to bottom.

The encoder may use (e.g., apply) a block matching technique to determine a Block Vector (BV) 2008 that indicates the relative displacement from CB 2000 to a Reference Block (RB) 2010 (or intra block compensated prediction) within IBC reference region 2006 that "best matches" CB 2000. RB 2010 may have been determined, for example, as the reference block from IBC reference region 2006 as being a better match than other blocks within IBC reference region 2006. As shown in FIG. 20, BV 2008 may point to a position indicating (e.g., a top left corner of) RB 2010. BV 2008 has a horizontal ("x") component ($BV_x$) and a vertical ("y") component ($BV_y$).

IBC reference region 2006 may be a constraint placed on BV 2008. BV 2008 may be constrained by IBC reference region 2006 to indicate a displacement from CB 2000 to a reference block (shown as RB 2010) within IBC reference region 2006. The encoder may determine the "best matching" reference block as RB 2010 from blocks tested within IBC reference region 2006, for example, if a searching process occurs. The encoder may determine that a reference block may be the "best matching" reference block, for example, based on one or more cost criterion. The one or more cost criterion may include, for example, a rate-distortion criterion (e.g., Lagrangian rate-distortion cost). The one or more cost criterion may be based on, for example, a difference between the prediction samples of the reference block (e.g., RB 2010) and the original samples of the current block (CB 2000). The difference may include, for example, a sum of squared differences (SSD), a sum of absolute differences (SAD), a sum of absolute transformed differences (SATD), or difference determined based on a hash function. RB 2010 may comprise decoded (or reconstructed) samples of current picture 2002 prior to being processed by in-loop filtering operations. The in-loop filtering operations may include, for example, deblocking or SAO filtering.

The encoder may determine or use a difference (e.g., a corresponding sample-by-sample difference) between CB 2000 and RB 2010. The encoder may determine or use a difference (e.g., a corresponding sample-by-sample difference) between CB 2000 and RB 2010, for example, after RB 2010 is determined and/or generated for CB 2000 using IBC. The difference may be referred to as a prediction error or residual. The encoder may store and/or signal in a bitstream the prediction error and the related prediction information for decoding. The prediction information may include BV 2008. The prediction information may include an indication of BV 2008. In HEVC, VVC, and other video compression schemes, BV 2008 may be predictively coded, for example, before being stored or signaled in a bitstream as explained herein.

FIG. 20 shows an example of Reconstruction-Reordered Intra Block Copy (RRIBC) predictive coding for horizontal flipping and vertical flipping. The encoder may determine a reference region corresponding to the direction for flipping. The encoder may determine a reference region corresponding to a direction for flipping, for example, based on the CB 2000 being coded in RRIBC flipping mode, and the direction for flipping CB 2000 relative to a reference block (or vice versa). The reference region may be a rectangular reference region. The reference region may be in alignment with the direction for flipping.

The reference region for coding current block 2000 may be determined as a portion RRIBC reference region 2012 including a rectangular region having a reference region width 2014 and a reference region height 2016. The reference region for coding current block 2000 may be determined as a portion RRIBC reference region 2012 that includes a rectangular region having a reference region width 2014 and a reference region height 2016, for example, if the direction for flipping is a horizontal direction. Reference region width 2014 may be a difference between a left boundary (e.g., leftmost) of IBC reference region 2006 (which typically may be an x coordinate of 0) and a position of CB 2000 (e.g., top left most sample) offset by a width (cbWidth) of CB 2000 to the left. Reference region height 2016 may be the same as a height (cbHeight) of CB 2000. As shown in FIG. 20, the portion of RRIBC reference region 2012 (applicable for flipping in the horizontal direction) may have: an upper boundary and a lower boundary that correspond to those of CB 2000; a right boundary defined by an offset of cbWidth to a left boundary of CB 2000; and a left boundary that corresponds to that of IBC reference region 2006.

The reference region for coding CB 2000 may be determined as a portion of RRIBC reference region 2012 including a rectangular region having a reference region width 2018 and a reference region height 2020. The reference region for coding CB 2000 may be determined as a portion of RRIBC reference region 2012 including a rectangular region having a reference region width 2018 and a reference region height 2020, for example, if the direction for flipping is a vertical direction. Reference region width 2018 may be the same as cbWidth of CB 2000. Reference region height 2020 may be a difference between a top boundary (e.g., top most) of IBC reference region 2006 (which may be a y coordinate of 0) and a position of CB 2000 (e.g., top left most sample) offset by a cbHeight of CB 2000 above. As shown in FIG. 20, the portion of RRIBC reference region 2012 (applicable for flipping in the vertical direction) may have: a left boundary and a right boundary that correspond to those of CB 2000; a lower boundary defined by an offset of cbHeight above an upper boundary of CB 2000; and an upper boundary that corresponds to that of IBC reference region 2006. RRIBC reference region 2012 may extend beyond the boundaries of IBC reference region 2006. The upper boundary of RRIBC reference region 2012 may extend beyond the upper boundary of IBC reference region 2006 (e.g., an upper boundary of current picture 2002).

The reference region may be defined as being offset from CB 2000 (e.g., a position of the top left sample of CB 2000) in an x direction (e.g., a horizontal direction) and in a y direction (e.g., a vertical direction). RRIBC reference region 2012 may be indicated by an offset from CB 2000 in the x direction by −cb Width and in the y direction by 0, for example, for flipping in a horizontal direction (i.e., horizontal flipping). Similarly, RRIBC reference region 2012 may be indicated by an offset from CB 2000 in the x direction by 0 and in the y direction by −cbHeight, for example, for flipping in the vertical direction (i.e., vertical flipping). Other directions for flipping may be considered, for example, by defining the reference region as an offset in two directions (or similarly an offset vector). For example, directions may be extended beyond horizontal and vertical flipping to consider flipping relative to CB 2000 at an angle. An offset having the same non-zero magnitude in the x direction and in the y direction may indicate flipping at a diagonal relative to CB 2000. The reference region (corresponding to flipping) may constrain/limit a location of a block from which a reference block may be determined.

Considering horizontal or vertical symmetry, a current block (CB) and a reference block (RB) may normally be aligned horizontally or vertically, respectively. Based on the RRIBC mode and a flipping direction, the RB may be determined from a reference region (including candidate reference blocks) aligned in the same flipping direction, as will be further described herein. The vertical component $(BV_y)$ of the Block Vector (BV) (indicating a displacement from the CB to the RB) may not need to be signaled because it may be inferred to be equal to 0 (or null), for example, if flipping in a horizontal direction is used/applied/indicated. Similarly, the horizontal component $(BV_x)$ of the BV may not need to be signaled because it may be inferred to be equal to 0 (or null), for example, if flipping in a vertical direction is used/applied/indicated. Only one component, aligned with the direction for flipping, of the BV may be encoded and signaled for the CB.

FIG. 20 further shows an example of determining a Block Vector (BV). More specifically, FIG. 20 further shows an example of determining a BV based on an indication of flipping, at least one component of a Block Vector Difference (BVD), and a BV offset value. The BV offset value may be determined based on a dimension of a Current Block (CB). More specifically, the BV may be determined according to the following equation:

$$BV=BVD+\text{offset} \tag{21}$$

where "offset" in equation (21) may be referred to herein as a "BV offset value", and "BVD" in equation (21) may refer to at least one non-null component of the BVD. The BV offset value may be determined based on the indication of the RRIBC flipping mode and a dimension of a Current Block (CB). The dimension of the CB may be limited to a specific valid range of values in a reference region based on an indication of a RRIBC flipping direction. The BV, in contrast to at least some approaches, may not be determined based on a combination of a Block Vector Predictor (BVP) and a BVD. Similarly, the BVD may not be determined based on a difference between the BV and the BVP.

FIG. 20 further shows RRIBC block prediction with horizontal flipping, as well as RRIBC block prediction with vertical flipping.

Referring to examples of the present disclosure concerning a decoder, the decoder may determine a Block Vector (BV) based on an indication of flipping, at least one component of a Block Vector Difference (BVD), and a BV offset value based on a dimension of a Current Block (CB).

Referring to RRIBC block prediction with horizontal flipping, a decoder may determine Block Vector (BV) 2008. The decoder may determine BV 2008, for example, based on a combination of a Block Vector Difference (BVD) 2028 and a BV offset value. For horizontal flipping, the BV offset value may be determined based on a dimension of CB 2000. More specifically, the BV offset value may be determined based the width of CB 2000. A horizontal component of BV 2008 may be within the range of [−cbX,−cbWidth]. cbX may refer to a horizontal position of CB 2000. BV 2008 may indicate a displacement from CB 2000 to Reference Block (RB) 2010. For horizontal flipping, the decoder may receive an indication of flipping RB 2010 for predicting CB 2000, and a magnitude of at least one component of BVD 2028.

More specifically, the decoder may determine, based on the indication of flipping, a Block Vector (BV) offset value based on a dimension of the CB. For horizontal flipping, the BV may be determined based on the BVD and the dimension of the CB as follows:

$$BV=(BV_{HOR},BV_{VER})=(-(\text{cbWidth}+BVD),0) \tag{22}$$

wherein the "BV offset value" of equation (21) may be based in (22) on the width of the CB as discussed herein, and $BV_{HOR}$ and $BV_{VER}$ may represent the horizontal and vertical components of the BV respectively.

Referring to RRIBC block prediction with vertical flipping, a decoder may determine Block Vector (BV) 2022 based on a combination of a Block Vector Difference (BVD) 2024 and a BV offset value. For vertical flipping, the BV offset value may be determined based on a dimension of CB 2000. More specifically, the BV offset value may be determined based on the height of CB 2000. A vertical component of BV 2022 may be within the range of [−cbY, −cbHeight]. cbY may refer to a vertical position of CB 2000. BV 2022 may indicate a displacement from CB 2000 to Reference Block (RB) 2026. For vertical flipping, the decoder may receive an indication of flipping RB 2026 for predicting CB 2000, and a magnitude of at least one component of BVD 2024.

The decoder may determine, based on the indication of flipping, a Block Vector (BV) offset value based on a dimension of the CB. For vertical flipping, the BV may be determined based on the BVD and the dimension of the CB as follows:

$$BV=(BV_{HOR},BV_{VER})=(0,-(\text{cbHeight}+BVD)) \tag{23}$$

wherein the "BV offset value" of equation (21) may be based in (23) on the height of the CB as discussed herein, and $BV_{HOR}$ and $BV_{VER}$ may represent the horizontal and vertical components of the BV respectively. Further disclosures of the decoder according to the example shown in FIG. 20 are discussed herein.

The decoder may receive, from a bitstream, an indication of flipping of a Reference Block (RB) for predicting a Current Block (CB) and a magnitude of at least one component of a Block Vector Difference (BVD). The indication of flipping may be a Reconstruction-Reordered Intra Block Copy (RRIBC) type flag or an IBC mirror mode flag. The indication of flipping may further comprise an indication of flipping direction. The indication of flipping direction may be a RRIBC direction flag or an IBC mirror mode direction flag. The indication of flipping direction may indicate horizontal flipping or vertical flipping.

The decoder may determine to skip (e.g., not perform) parsing of a Block Vector Predictor (BVP) index from the bitstream. The decoder may further determine to skip (e.g., not perform) parsing of a Block Vector Predictor (BVP) index from the bitstream, for example, based on the indication of flipping. The decoder may determine that a sign of the at least one component of the BVD is negative. The decoder may further determine, based on the indication of flipping, that a sign of the at least one component of the BVD is negative. The decoder may determine that a sign of the BV is negative The decoder may further determine, based on the indication of flipping, that a sign of the BV is negative. The dimension of the CB may be a width of the CB or a height of the CB. The decoder may determine the BV offset value to be equal to the width of the CB. The decoder may further determine, based on the indication of flipping direction indicating horizontal flipping, the BV offset value to be equal to the width of the CB. The decoder may determine the BV offset value to be equal to the height of the CB The decoder may further determine, based on the indication of flipping direction indicating vertical flipping, the BV offset value to be equal to the height of the CB.

The decoder may determine a magnitude of the BV. The decoder may determine a magnitude of the BV, for example, based on the BV offset value and the indication of the magnitude of the at least one component of the BVD. The indication of the magnitude of the at least one component of the BVD may comprise an absolute value of a magnitude of a non-null component of the BVD. The determining the magnitude of the BV based on the BV offset value and the indication of the magnitude of the at least one component of the BVD may further include determining, based on the indication of flipping direction indicating horizontal flipping, a non-null horizontal component of the BV comprising the inverse of a combination of the BV offset value and the magnitude of the non-null component of the BVD. The determining the magnitude of the BV based on the BV offset value and the indication of the magnitude of the at least one component of the BVD may further include determining, based on the indication of flipping direction indicating vertical flipping, a non-null vertical component of the BV comprising the inverse of a combination of the BV offset value and the magnitude of the non-null component of the BVD.

A decoder may decode the CB based on a Reference Block (RB) displaced from the CB by the BV in a reference region. The decoding the CB based on the RB displaced from the CB by the BV in the reference region may further include: receiving, from the bitstream, a residual of the CB; determining a reconstructed block based on combining the RB with the residual of the CB; determining, based on the indication of flipping, to flip the reconstructed block; flipping the reconstructed block in a direction indicated by the indication of flipping direction; and, decoding the CB based on the flipped reconstructed block. The decoder may determine a BVD scaling factor. The decoder may determine a BVD scaling factor, for example, based on an Integer Motion Vector (IMV) flag indicated in the bitstream. The decoder may multiply the magnitude of the non-null component of the BVD by the BVD scaling factor.

The decoding the CB based on the RB displaced from the CB by the BV in the reference region may further include: based on the indication of flipping direction indicating horizontal flipping, determining, based on the width of the CB being greater than a width of the RB, an unavailable portion of one or more samples comprising the RB left of the CB; based on the indication of flipping direction indicating vertical flipping, determining, based on height of the CB being greater than a height of the RB, an unavailable portion of one or more samples comprising the RB above the CB; and, padding the unavailable portion of the one or more samples with replacement sample values. The decoder may further determine the replacement sample values based on one or more of: copying samples from an available portion of the one or more samples comprising the RB into the unavailable portion of the one or more samples comprising the RB; copying neighboring samples into the unavailable portion of the one or more samples comprising the RB; copying samples determined by an intra prediction mode into the unavailable portion of the one or more samples comprising the RB; and/or, copying a constant sample value into the unavailable portion of the one or more samples comprising the RB. The constant sample value may be one of a zero value or a midpoint value of valid sample values.

A decoder may determine a respective position of the CB relative to a boundary of the reference region. The decoder may determine to skip (e.g., not perform) parsing of the at least one component of the BVD from the bitstream, for example, based on the respective position of the CB being less than a respective dimension of the CB. The decoder, based on the indication of flipping direction indicating horizontal flipping, may determine that the respective position of the CB is a horizontal position of the CB relative to a left-most boundary of the reference region left of the CB; and may determine the respective dimension to be equal to the width of the CB. The decoder, based on the indication of flipping direction indicating horizontal flipping and the horizontal position of the CB being less than the width of the CB, may set the at least one component of the BVD to be equal to zero. The decoder, based on the indication of flipping direction indicating vertical flipping, may determine that the respective position of the CB is a vertical position of the CB relative to a top-most boundary of the reference region above the CB; and may determine the respective dimension to be equal to the height of the CB. The decoder, based on the indication of flipping direction indicating vertical flipping and the vertical position of the CB being less than the height of the CB, may set the at least one component of the BVD to be equal to zero.

The indication of the magnitude of the at least one component of the BVD may comprise an indication of the magnitude of the at least one component of the BVD being greater than zero. The decoder may determine to parse, from the bitstream, an indication of a remainder of the at least one component of the BVD, for example, based on the indication of the magnitude of the at least one component of the BVD being greater than zero. The decoder may parse, from the bitstream, the indication of the remainder of the at least one component of the BVD, for example, based on the indication of the magnitude of the at least one component of the BVD being greater than zero.

Referring to examples of the present disclosure concerning an encoder, the encoder may determine at least one component of a Block Vector Difference (BVD) based on a combination of a Block Vector (BV), indicating the Current Block (CB), and a BV offset value based on a dimension of the CB. Referring to RRIBC block prediction with horizontal flipping, an encoder may determine at least one component of BVD 2028. The encoder may determine at least one component of BVD 2028 based on a combination of BV 2008, indicating CB 2000, and a BV offset value based on a dimension of CB 2000. The BV offset value for horizontal flipping may be determined based on a dimension of CB 2000, more specifically the width of CB 2000. A horizontal component of BV 2008 may be within the range of [−cbX,−cbWidth]. cbX may refer to a horizontal position of CB 2000. BV 2008 may indicate a displacement from CB 2000 to Reference Block (RB) 2010. The encoder for horizontal flipping may signal an indication of flipping RB 2010 for predicting CB 2000, and a magnitude of at least one component of BVD 2028.

More specifically, for horizontal flipping, the encoder may determine at least one component of a Block Vector Difference (BVD) based on the BV the dimension of the CB as follows:

$$BVD=BV_{HOR}-cbWidth \qquad (24)$$

wherein the "BV offset value" of equation (21) may be based in equation (24) on the width of the CB (e.g., cbWidth) as discussed herein, and $BV_{HOR}$ may represent the horizontal component of the BV.

Referring to RRIBC block prediction with vertical flipping, an encoder may determine at least one component of BVD 2024. The an encoder may determine at least one component of BVD 2024, for example, based on a combination of BV 2022, indicating CB 2000, and a BV offset value based on a dimension of CB 2000. The BV offset value for vertical flipping may be determined based on a dimension of CB 2000, more specifically the height of CB 2000. A vertical component of BV 2022 may be within the range of [−cbY, −cbHeight]. cbY may refer to a vertical position of CB 2000. BV 2022 may indicate a displacement from CB 2000 to Reference Block (RB) 2026. The encoder, for vertical flipping, may signal an indication of flipping RB 2026 for predicting CB 2000, and a magnitude of at least one component of BVD 2024.

The encoder, for vertical flipping, may determine at least one component of a Block Vector Difference (BVD) based on the BV the dimension of the CB as follows:

$$BVD=BV_{VER}-cbHeight \tag{25}$$

wherein the "BV offset value" of equation (21) may be based in equation (25) on the height of the CB (e.g., cbHeight) as discussed herein, and $BV_{VER}$ may represent the vertical component of the BV. Further disclosure concerning the encoder according to the example illustrated by FIG. 20 are discussed herein.

An encoder may determine candidate templates, of respective Reference Block (RB) candidates indicated by respective Block Vector Difference (BVD) candidates, within a reference region. The encoder may determine, based on the candidate templates, to flip the RB candidates in a flipping direction for predicting the CB. The encoder may determine to flip the RB candidates in a flipping direction for predicting the CB, for example, based on the candidate template having a shape matching that of a current template of the CB, the current template of the CB flipped in the flipping direction. The encoder may compare samples in each of the candidate templates against samples in the current template of the CB to calculate respective costs. The encoder may select, based on the costs, one of the BVD candidates as a BVD.

The encoder may determine at least one component of the BVD based on a combination of a Block Vector (BV), indicating the CB, and a BV offset value based on a dimension of the CB. The dimension of the CB may be a width of the CB or a height of the CB. The encoder may determine the BV offset value to be equal to the width of the CB, for example, based on the indication of flipping direction indicating horizontal flipping. The encoder may determine the BV offset value to be equal to the height of the CB, for example, based on the indication of flipping direction indicating vertical flipping.

The determining at least one component of the BVD based on the combination of the BV, indicating the CB, and the BV offset value based on the dimension of the CB may further include determining, based on the indication of flipping direction indicating horizontal flipping, a non-null horizontal component of the BVD. The non-null horizontal component of the BVD may comprise a combination of a non-null component horizontal component of the BV and the BV offset value. The determining at least one component of the BVD based on the combination of the BV, indicating the CB, and the BV offset value based on the dimension of the CB may further include determining, based on the indication of flipping direction indicating vertical flipping, a non-null vertical component of the BVD. The non-null vertical component of the BVD may comprise a combination of a non-null component vertical component of the BV and the BV offset value.

An encoder may signal, in a bitstream, an indication of flipping of the RB for predicting the CB and a magnitude of the at least one component of the BVD. The indication of flipping may be a Reconstruction-Reordered Intra Block Copy (RRIBC) type flag or an IBC mirror mode flag. The indication of flipping may further comprise an indication of flipping direction. The indication of flipping direction may be a RRIBC direction flag or an IBC mirror mode direction flag. The indication of flipping direction may indicate horizontal flipping or vertical flipping. The indication of the magnitude of the at least one component of the BVD may comprise an absolute value of a magnitude of a non-null component of the BVD.

An encoder may determine, based on the indication of flipping, to skip (e.g., not perform) signaling of a Block Vector Predictor (BVP) index in the bitstream. The encoder may determine, based on the indication of flipping, that a sign of the at least one component of the BVD is negative. The encoder may determine, based on the indication of flipping, that a sign of the BV is negative. The encoder may determine a residual of the CB, for example, based on a difference between the CB and the RB. The encoder may signal, in the bitstream, the residual of the CB. The encoder may determine an Integer Motion Vector (IMV) flag based on whether a magnitude of the non-null component of the BV is a multiple of a BVD scaling factor. The encoder may multiply the magnitude of the non-null component of the BVD by the BVD scaling factor, and may signal the IMV flag in the bitstream.

An encoder may, based on the indication of flipping direction indicating horizontal flipping, determine, based on the width of the CB being greater than a width of the RB, an unavailable portion of one or more samples comprising the RB left of the CB. The encoder may, based on the indication of flipping direction indicating vertical flipping, determine, based on height of the CB being greater than a height of the RB, an unavailable portion of one or more samples comprising the RB above the CB. The encoder may pad the unavailable portion of the one or more samples with replacement sample values. The encoder may determine the replacement sample values based on one or more of: copying samples from an available portion of the one or more samples comprising the RB into the unavailable portion of the one or more samples comprising the RB; copying neighboring samples into the unavailable portion of the one or more samples comprising the RB; copying samples determined by an intra prediction mode into the unavailable portion of the one or more samples comprising the RB; and/or copying a constant sample value into the unavailable portion of the one or more samples comprising the RB. The constant sample value may be one of a zero value or a midpoint value of valid sample values.

An encoder may determine a respective position of the CB relative to a boundary of the reference region. The encoder may determine to skip (e.g., not perform) signaling of the at least one component of the BVD in the bitstream, for example, based on the respective position of the CB being less than a respective dimension of the CB. The encoder, based on the indication of flipping direction indicating horizontal flipping: may determine that the respective position of the CB is a horizontal position of the CB relative to a left-most boundary of the reference region left of the CB; and may determine the respective dimension to be equal to the width of the CB. The encoder, based on the indication of flipping direction indicating horizontal flipping and the horizontal position of the CB being less than the width of the CB, set the at least one component of the BVD to be equal to zero. The encoder, based on the indication of flipping direction indicating vertical flipping and the indication of flipping direction indicating vertical flipping: may determine that the respective position of the CB is a vertical position of the CB relative to a top-most boundary of the reference region above the CB; may determine the respective dimension to be equal to the height of the CB. The encoder, based on the vertical position of the CB being less than the height of the CB, may set the at least one component of the BVD to be equal to zero.

The indication of the magnitude of the at least one component of the BVD may comprise an indication of the magnitude of the at least one component of the BVD being greater than zero. The encoder may determine to signal, in the bitstream, an indication of a remainder of the at least one component of the BVD, for example, based on the indication of the magnitude of the at least one component of the BVD being greater than zero. The encoder may signal, in the bitstream, the indication of the remainder of the at least one component of the BVD, for example, based on the indication of the magnitude of the at least one component of the BVD being greater than zero.

Figure 21:
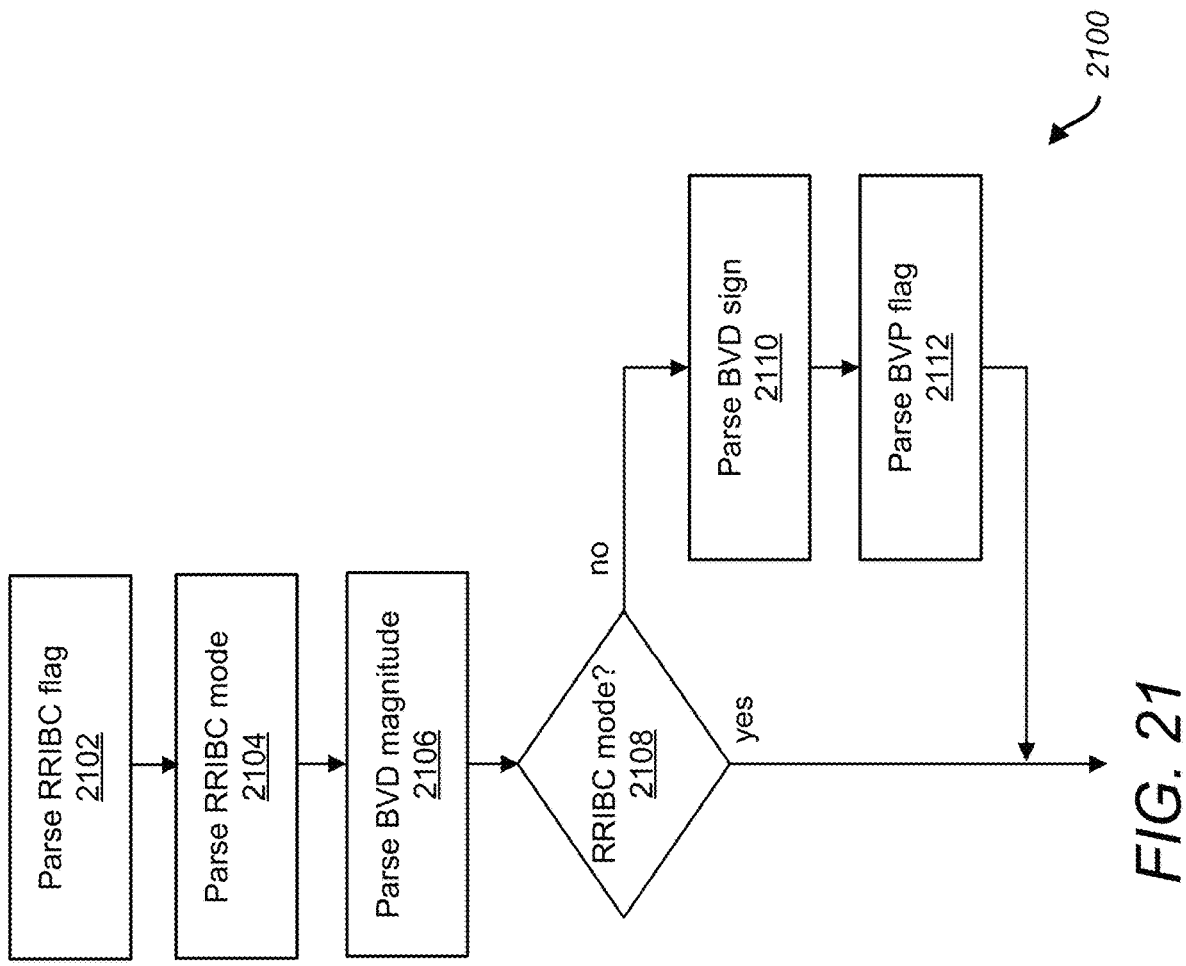
FIG. 21 shows an example method of syntax parsing.

FIG. 21 shows an example method of syntax parsing. More specifically, FIG. 21 shows an example method of syntax parsing, including conditionally indicated syntax elements, based on a RRIBC mode. FIG. 21 shows an example flowchart 2100 of a method for parsing syntax elements from a bitstream. A Block Vector Predictor (BVP) flag (or, e.g., a BVP index) and a Block Vector Difference (BVD) sign may be conditionally indicated in the bitstream based on a RRIBC mode flag. One or more steps of the example method shown in flow chart 2100 may be implemented by a decoder, such as decoder 300 described herein with respect to FIG. 3.

At step 2102 a decoder may parse a RRIBC flag (e.g., also referred to as a RRIBC type flag or an IBC mirror mode flag) from the bitstream. At step 2104, the decoder may parse an indication of a RRIBC mode (e.g., also referred to as a RRIBC direction flag or an IBC mirror mode direction flag) from the bitstream. At step 2106, the decoder may parse a BVD magnitude from the bitstream. For example, the BVD magnitude may include an absolute value of a magnitude of at least one non-null component of the BVD. At step 2108, the decoder may determine whether to parse a BVD sign and a BVP flag (or, e.g., a BVP index) from the bitstream. The decoder may determine whether to parse a BVD sign and a BVP flag from the bitstream, for example, based on the indication of the RRIBC mode. The decoder may parse a BVD sign at 2110 and parse a BVP flag at 2112 from the bitstream, for example, based on the RRIBC mode indicating that flipping is not used to predict the Current Block (CB), The decoder may determine to skip (e.g., not perform) parsing of the BVD sign and BVP flag from the bitstream, for example, based on the RRIBC mode indicating that flipping is used to predict the CB. The BVP flag may include an index indicating a selected BVP from an AMVP list or a Merge list. The decoder, as described in more detail herein with regard to FIG. 20, may skip (e.g., not perform) parsing the BVD sign and BVP flag because the BV and/or BVD may be determined based on the indication of the RRIBC type and the absolute value of the magnitude of at least one non-null component of the BVD indicated in the bitstream (i.e., neither a BVP flag nor a BVD sign are signaled in the bitstream).

Figure 22:
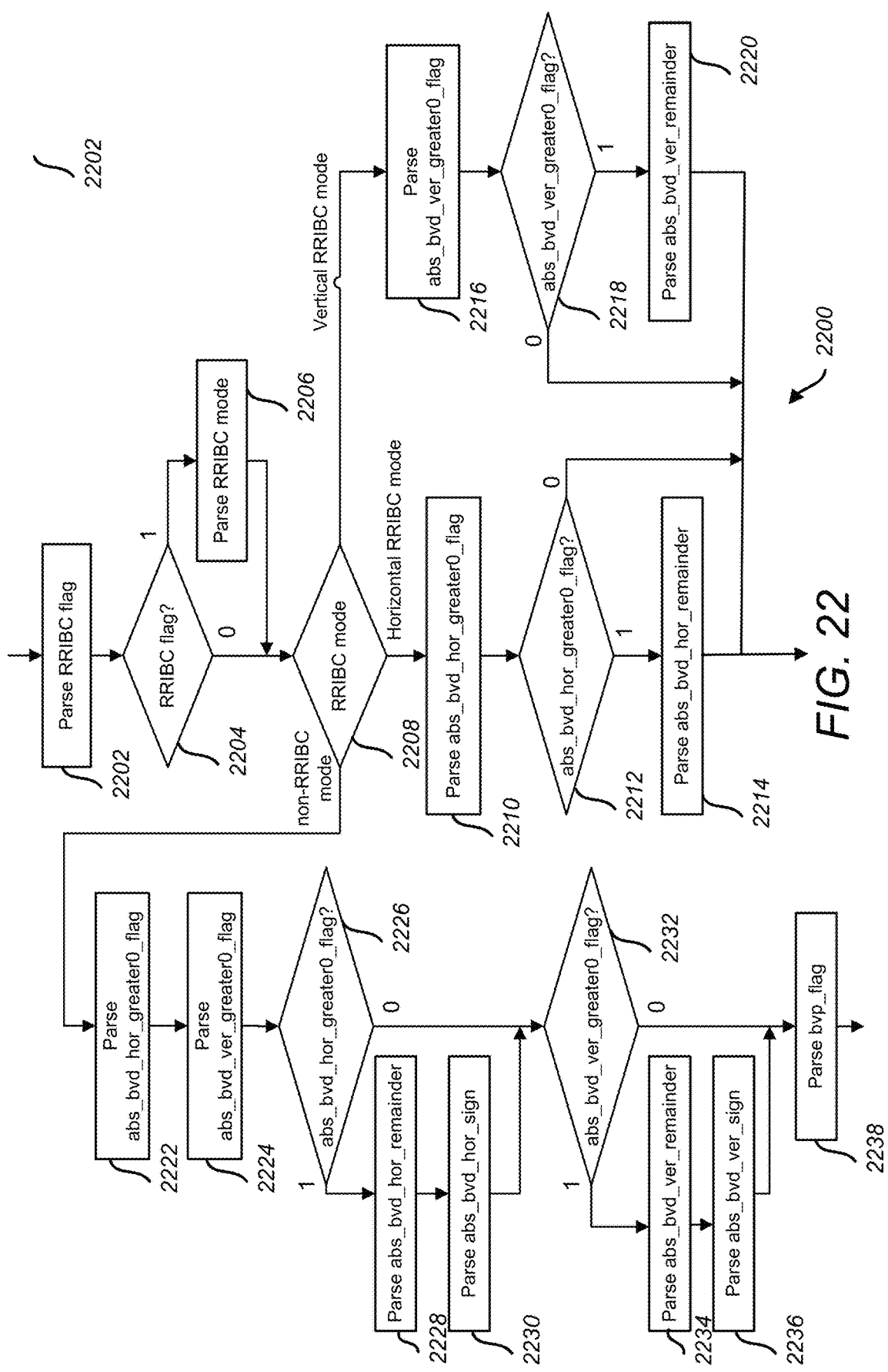
FIG. 22 shows an example method of syntax parsing.

FIG. 22 shows an example method of a syntax parsing. More specifically, FIG. 22 shows an example method of a syntax parsing, including conditionally indicated syntax elements, based on a RRIBC mode. FIG. 22 further shows an example flowchart 2200 of a method for parsing syntax elements from a bitstream. A Block Vector Predictor (BVP) flag (or, e.g., a BVP index) and a Block Vector Difference (BVD) sign may be conditionally indicated in the bitstream based on a RRIBC flag and a RRIBC mode flag. One or more steps of the example method shown in flow chart 2200 may be implemented by an decoder, such as decoder 300 described herein with respect to FIG. 3.

At step 2202, the decoder may parse a RRIBC flag (e.g., also referred to as a RRIBC type flag or IBC mirror mode flag) from the bitstream. At step 2204, the decoder may determine an indication of the RRIB flag. At step 2206, based on the indication of the RRIBC flag, the decoder may determine to parse an indication of a RRIBC mode (e.g., also referred to as a RRIBC direction flag or an IBC mirror mode direction flag) from the bitstream. At step 2208, the decoder may determine whether to parse syntax signaling elements of the BVD according to a non-RRIBC mode, a horizontal RRIBC mode, or a vertical RRIBC mode. The decoder may determine whether to parse syntax signaling elements of the BVD according to a non-RRIBC mode, a horizontal RRIBC mode, or a vertical RRIBC mode, for example, based on the indication of the RRIBC mode.

At step 2210, if a horizontal RRIBC mode is indicated, the decoder may parse an "abs_bvd_hor_greater0_flag" which indicates whether a horizontal component of the BVD is greater than zero (or not null). At step 2212, the decoder may determine whether the "abs_bvd_hor_greater0_flag" indicates that a horizontal component of the BVD is greater than zero (or not null). At step, 2214, the decoder may parse an "abs_bvd_hor_remainder" 2214 indicating the horizontal component of the BVD, for example, based on the "abs_bvd_hor_greater0_flag" indicating that the horizontal component of the BVD is greater than zero. Similarly, at step 2216, the decoder may parse an "abs_bvd_ver_greater0_flag", which indicates whether a vertical component of the BVD is greater than zero (or not null). At step 2218, the decoder may determine whether the "abs_bvd_ver_greater0_flag" indicates that a vertical component of the BVD is greater than zero (or not null). At step 2220, the decoder may parse an "abs_bvd_ver_remainder" indicating the vertical component of the BVD, for example, based on the "abs_bvd_ver_greater0_flag" indicating that the vertical component of the BVD is greater than zero. A non-RRIBC mode may indicate the existing signaling process for the BVD and BVP (step 2222, 2224, 2226, 2228, 2230, 2232, 2234, 2236 and 2238), for example, if flipping is not used for prediction.

As described in more detail herein with regard to FIG. 20, a decoder may skip (e.g., not perform) parsing the BVD sign and BVP flag because a BV and/or BVD may be determined using the indication of the RRIBC type and the absolute value of the magnitude of at least one non-null component of the BVD indicated in the bitstream (i.e., neither a BVP flag nor a BVD sign are signaled in the bitstream). Referring to the example shown in FIG. 22, steps 2214 and 2220 may comprise the following steps, for example, if BVD magnitude prediction is performed for RRIBC modes: parsing prefix bins of Golomb-Rice or Exponential-Golomb (Exp-Golomb) code; parsing least significant suffix bins of Golomb-Rice code, that are signaled, e.g., in equiprobable (bypass) CABAC mode; and, parsing hypotheses bins that are used to restore most significant suffix bins.

Figure 23:
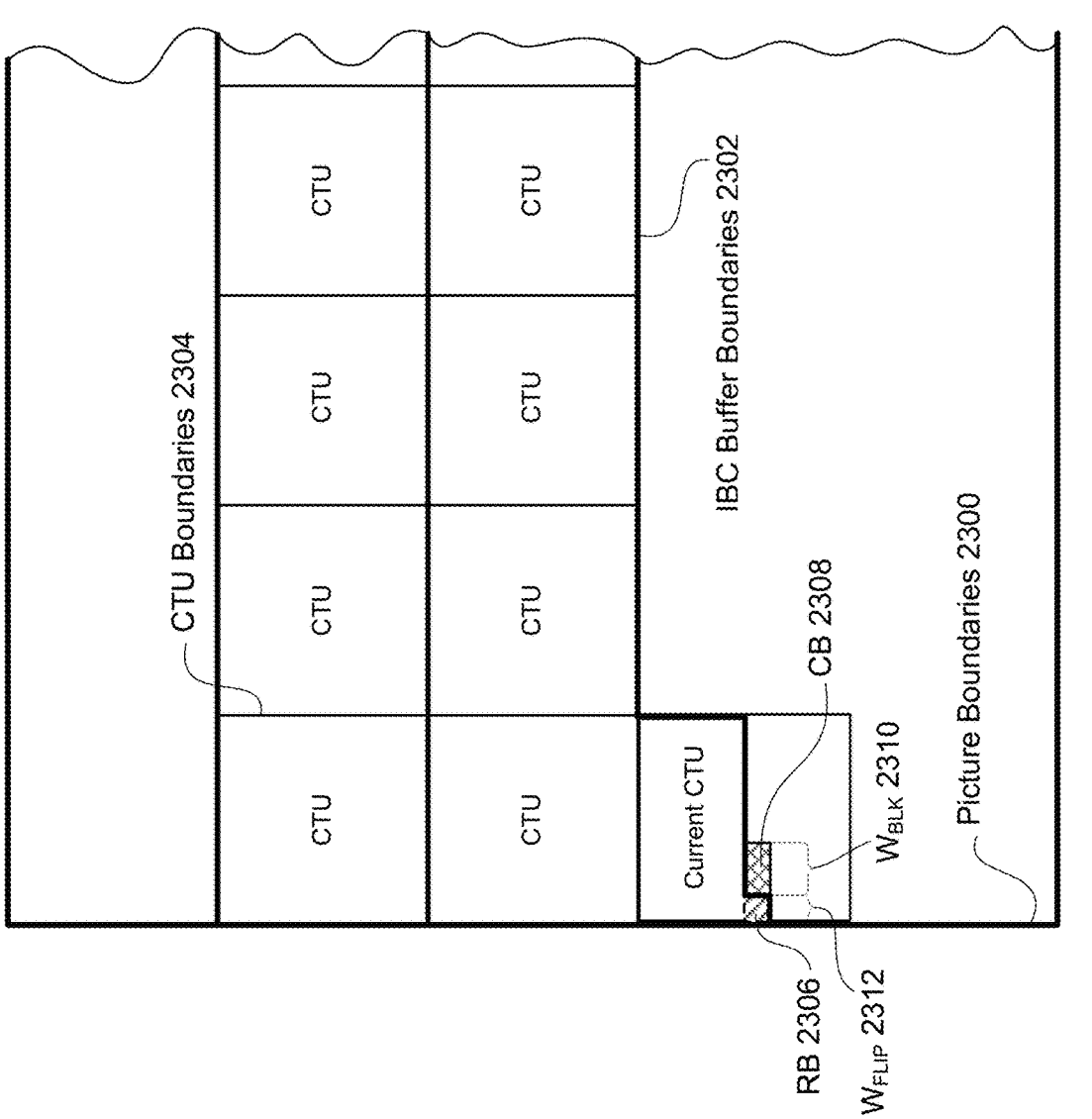
FIG. 23 shows an example of skipping signaling of a BVD.

FIG. 23 shows an example of skipping (e.g., not performing) signaling of a BVD. More specifically, FIG. 23 shows an example of skipping (e.g., not performing) signaling of a BVD based on unavailable portions of a Reference Block (RB). In FIG. 23, Picture Boundaries 2300 are shown relative to Intra Block Copy (IBC) Buffer Boundaries 2302 and Coding Trec Unit (CTU) Boundaries 2304.

FIG. 23 further shows an example wherein portions of Reference Block (RB) 2306 may be unavailable for predicting a Current Block (CB) 2308 to be predicted by flipping in a given RRIBC flipping direction (in the example shown in FIG. 23, it is a horizontal flipping direction). An encoder or decoder may determine an unavailable portion of one or more reference samples of RB 2306. An encoder or decoder may determine, based on comparing a dimension of CB 2308 (e.g., a width of CB 2308, $W_{BLK}$ 2310) and a dimension of RB 2306 (e.g., a width of RB 2306, $W_{FLIP}$ 2312) according to the RRIBC flipping direction, an unavailable portion of one or more reference samples of RB 2306.

An encoder or decoder may determine that the at least one component of the BVD is equal to zero (or, e.g., null). An encoder or decoder may determine, based on a position of CB 2308 relatively near to a boundary of the reference region (e.g., Picture Boundaries 2300), that the at least one component of the BVD is equal to zero (or, e.g., null). The encoder may skip (e.g., not perform) signaling, and a decoder may skip (e.g., not perform) parsing, of the at least one component of the BVD in the bitstream. RB 2306 may be located at some distance from CB 2308 to be predicted. This distance, for example, may be a value equal to or less than cbWidth and cbHeight for horizontal and vertical flipping, respectively. RB 2306 may be adjacent to CB 2308. An encoder or decoder may determine replacement sample values for the unavailable portion of reference samples of RB 2306. An encoder or decoder may determine replacement sample values for the unavailable portion of reference samples of RB 2306 based on other available sample values, as described in further detail herein with regard to FIG. 24.

Figure 24:
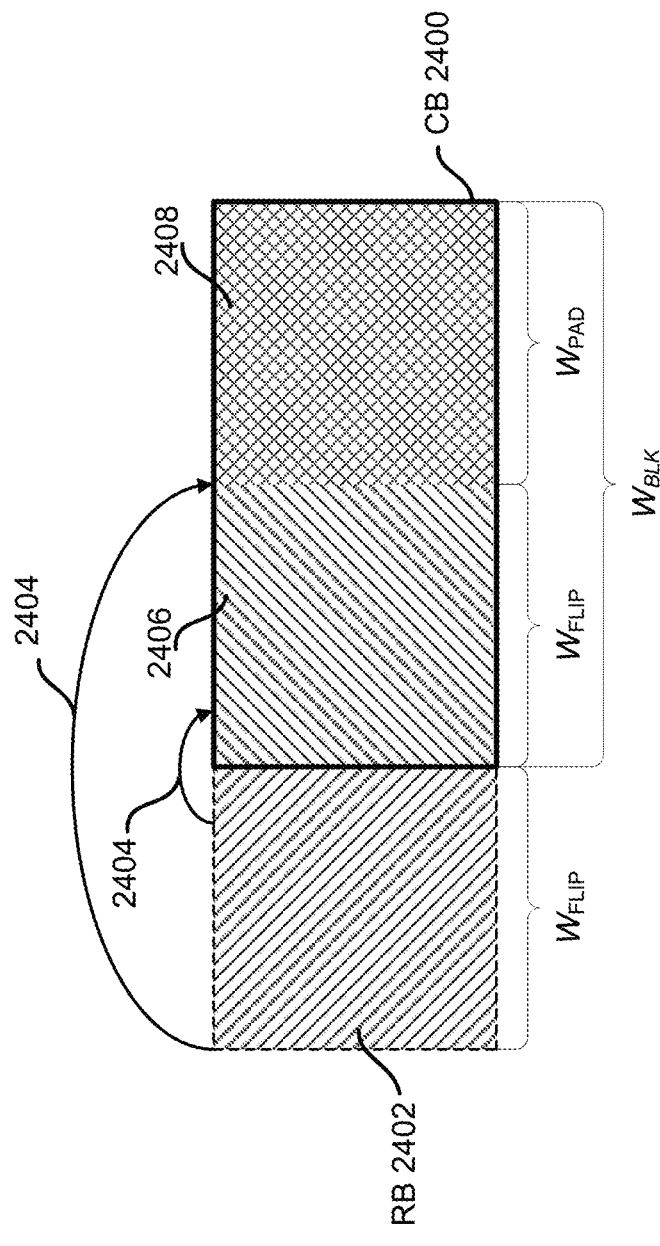
FIG. 24 shows an example of padding unavailable reference samples for predicting a current block based on a RRIBC mode.

FIG. 24 shows an example of padding unavailable reference samples for predicting a current block based on a RRIBC mode. The encoder or decoder may determine an unavailable portion of one or more reference samples of RB 2402. The encoder or decoder may determine, based on comparing a dimension of Current Block (CB) 2400 (e.g., CB width illustrated as WBLK) and a dimension of Reference Block (RB) 2402 (e.g., RB width illustrated as WFLIP) according to a RRIBC flipping direction (e.g., flipping direction 2404), an unavailable portion of one or more reference samples of RB 2402. An encoder or decoder may determine replacement sample values for the unavailable portion of reference samples of RB 2402, for example, based on other available sample values.

FIG. 24 further shows an example of filling out samples of CB 2400, for example, if one or more samples of RB 2402 may not be available for predicting the entire block of CB 2400. As shown in FIG. 24, RB 2402 may be used to predict a first portion 2406 of CB 2400 by flipping RB 2402 in accordance with a flipping direction 2404. A remaining part 2408 of CB 2400 may be filled out by one or more of: extending samples of CB 2400 taken from the available part of RB 2402 and copying them to remaining part 2408; copying neighboring samples into remaining part 2408 (e.g., a nearest column or row to first portion 2406 propagated to remaining part 2408); using another intra prediction mechanism such as directional (e.g., horizontal, vertical, or skew angular modes) or non-directional (e.g., planar, horizontal planar, vertical planar, DC, or MIP modes) intra-prediction modes; and/or, copying a constant sample value (e.g., equal to either 0 or the midpoint of a range of valid sample values) into remaining part 2408.

FIG. 25 shows an example method for determining a Block Vector (BV). More specifically, FIG. 25 shows an example method for determining a BV based on an indication of flipping, at least one component of a Block Vector Difference (BVD), and a BV offset value based on a dimension of a Current Block (CB). FIG. 25 shows an example flowchart 2500 of a method for determining the BV. One or more steps of the example method shown in flowchart 2500 may be implemented by a decoder, such as such as decoder 300 described herein with respect to FIG. 3.

At step 2502, a decoder may receive, from a bitstream, an indication of flipping of a Reference Block (RB) for predicting a Current Block (CB) and a magnitude of at least one component of a Block Vector Difference (BVD). The indication of flipping may be a Reconstruction-Reordered Intra Block Copy (RRIBC) type flag or an IBC mirror mode flag. The indication of flipping may further comprise an indication of flipping direction. The indication of flipping direction may be a RRIBC direction flag or an IBC mirror mode direction flag. The indication of flipping direction may indicate horizontal flipping or vertical flipping.

At step 2504, the decoder may determine, based on the indication of flipping, a Block Vector (BV) offset value based on a dimension of the CB. The decoder may determine to skip (e.g., not perform) parsing of a Block Vector Predictor (BVP) index from the bitstream, for example, based on the indication of flipping. The decoder may determine that a sign of the at least one component of the BVD may be negative, for example, based on the indication of flipping. The decoder may determine that a sign of the BV may be negative, for example, based on the indication of flipping. The dimension of the CB may be a width of the CB or a height of the CB. The decoder may determine the BV offset value to be equal to the width of the CB, for example, based on the indication of flipping direction indicating horizontal flipping. The decoder may determine the BV offset value to be equal to the height of the CB, for example, based on the indication of flipping direction indicating vertical flipping.

At step 2506, the decoder may determine a magnitude of the BV. The magnitude of the BV may be determined, for example, based on the BV offset value and the indication of the magnitude of the at least one component of the BVD. The indication of the magnitude of the at least one component of the BVD may comprise an absolute value of a magnitude of a non-null component of the BVD. The determining the magnitude of the BV based on the BV offset value and the indication of the magnitude of the at least one component of the BVD may further include determining, based on the indication of flipping direction indicating horizontal flipping, a non-null horizontal component of the BV. The non-null horizontal component of the BV may comprise the inverse of a combination of the BV offset value and the magnitude of the non-null component of the BVD. The determining the magnitude of the BV based on the BV offset value and the indication of the magnitude of the at least one component of the BVD may further include determining, based on the indication of flipping direction indicating vertical flipping, a non-null vertical component of the BV. The non-null vertical component of the BV may comprise the inverse of a combination of the BV offset value and the magnitude of the non-null component of the BVD.

At step 2508, the decoder may decode the CB based on a Reference Block (RB) displaced from the CB by the BV in a reference region. The decoding the CB based on the RB displaced from the CB by the BV in the reference region may further include: receiving, from the bitstream, a residual of the CB; determining a reconstructed block based on combining the RB with the residual of the CB; determining, based on the indication of flipping, to flip the reconstructed block; flipping the reconstructed block in a direction indicated by the indication of flipping direction; and, decoding the CB based on the flipped reconstructed block. The decoder may determine, based on an Integer Motion Vector (IMV) flag indicated in the bitstream, a BVD scaling factor, and multiply the magnitude of the non-null component of the BVD by the BVD scaling factor.

The decoding the CB based on the RB displaced from the CB by the BV in the reference region may include: based on the indication of flipping direction indicating horizontal flipping, determining, based on the width of the CB being greater than a width of the RB, an unavailable portion of one or more samples comprising the RB left of the CB; based on the indication of flipping direction indicating vertical flipping, determining, based on height of the CB being greater than a height of the RB, an unavailable portion of one or more samples comprising the RB above the CB; and, padding the unavailable portion of the one or more samples with replacement sample values. The decoder may determine the replacement sample values, for example, based on one or more of: copying samples from an available portion of the one or more samples comprising the RB into the unavailable portion of the one or more samples comprising the RB; copying neighboring samples into the unavailable portion of the one or more samples comprising the RB; copying samples determined by an intra prediction mode into the unavailable portion of the one or more samples comprising the RB; and/or, copying a constant sample value into the unavailable portion of the one or more samples comprising the RB. The constant sample value may be one of a zero value or a midpoint value of valid sample values.

The decoder may determine a respective position of the CB relative to a boundary of the reference region. The decoder may determine to skip (e.g., not perform) parsing of the at least one component of the BVD from the bitstream, for example, based on the respective position of the CB being less than a respective dimension of the CB. The decoder may, based on the indication of flipping direction indicating horizontal flipping: determine that the respective position of the CB may be a horizontal position of the CB relative to a left-most boundary of the reference region left of the CB; determine the respective dimension to be equal to the width of the CB; and, based on the horizontal position of the CB being less than the width of the CB, set the at least one component of the BVD to be equal to zero. The decoder may, based on the indication of flipping direction indicating vertical flipping: determine that the respective position of the CB is a vertical position of the CB relative to a top-most boundary of the reference region above the CB; determine the respective dimension to be equal to the height of the CB; and, based on the vertical position of the CB being less than the height of the CB, set the at least one component of the BVD to be equal to zero.

The indication of the magnitude of the at least one component of the BVD may further comprise an indication of the magnitude of the at least one component of the BVD being greater than zero. The decoder, based on the indication of the magnitude of the at least one component of the BVD being greater than zero, may further determine to parse, from the bitstream, an indication of a remainder of the at least one component of the BVD, and may parse, from the bitstream, the indication of the remainder of the at least one component of the BVD.

The example method discussed herein with respect to FIG. 25 may be used (e.g., applied) with respect to an MV and MVD used in inter prediction in addition or alternatively to a BV and BVD used in RRIBC. For inter prediction, the terms BV, BVD, and BVD candidate used in the example flowchart 2500 and discussed herein with respect to FIG. 25 may be replaced by the terms MV, MVD, and MVD candidate.

FIG. 26 shows an example method for determining at least one component of a Block Vector Difference (BVD). More specifically, FIG. 26 shows an example method for determining at least one component of a Block Vector Difference (BVD) based on a combination of a Block Vector (BV), indicating the Current Block (CB), and a BV offset value based on a dimension of the CB. FIG. 26 shows an example flowchart 2600 of a method for determining at least one component of a Block Vector Difference (BVD). One or more steps of the example method shown in flowchart 2600 may be implemented by an encoder, such as encoder 200 described herein with respect to FIG. 2.

At step 2602, an encoder may determine candidate templates, of respective Reference Block (RB) candidates indicated by respective Block Vector Difference (BVD) candidates, within a reference region. At step 2604, the encoder may determine, based on the candidate templates, to flip the RB candidates in a flipping direction for predicting the CB. The encoder may determine to flip the RB candidates in the flipping direction, for example, based on the candidate template having a shape matching that of a current template of the CB, flipped in the flipping direction. At step 2606, the encoder may compare samples in each of the candidate templates against samples in the current template of the CB to calculate respective costs. At step 2608, the encoder may select, based on the costs, one of the BVD candidates as a BVD.

At step 2610, the encoder may determine at least one component of the BVD based on a combination of a Block Vector (BV), indicating the CB, and a BV offset value based on a dimension of the CB. The dimension of the CB may be a width of the CB or a height of the CB. The encoder may determine the BV offset value to be equal to the width of the CB, for example, based on the indication of flipping direction indicating horizontal flipping. The encoder may determine the BV offset value to be equal to the height of the CB, for example, based on the indication of flipping direction indicating vertical flipping.

The determining at least one component of the BVD based on the combination of the BV, indicating the CB, and the BV offset value based on the dimension of the CB may further include determining, based on the indication of flipping direction indicating horizontal flipping, a non-null horizontal component of the BVD comprising a combination of a non-null component horizontal component of the BV and the BV offset value. The determining at least one component of the BVD based on the combination of the BV, indicating the CB, and the BV offset value based on the dimension of the CB may further include determining, based on the indication of flipping direction indicating vertical flipping, a non-null vertical component of the BVD comprising a combination of a non-null component vertical component of the BV and the BV offset value.

At step 2612, the encoder may signal, in a bitstream, an indication of flipping of the RB for predicting the CB and a magnitude of the at least one component of the BVD. The indication of flipping may be a Reconstruction-Reordered Intra Block Copy (RRIBC) type flag or an IBC mirror mode flag. The indication of flipping may further comprise an indication of flipping direction. The indication of flipping direction may be a RRIBC direction flag or an IBC mirror mode direction flag. The indication of flipping direction may indicate horizontal flipping or vertical flipping. The indication of the magnitude of the at least one component of the BVD may comprise an absolute value of a magnitude of a non-null component of the BVD.

The encoder may determine, based on the indication of flipping, to skip (e.g., not perform) signaling of a Block Vector Predictor (BVP) index in the bitstream. The encoder may determine, based on the indication of flipping, that a sign of the at least one component of the BVD may be negative. The encoder may determine, based on the indication of flipping, that a sign of the BV may be negative. The encoder may determine a residual of the CB, for example, based on a difference between the CB and the RB. The encoder may signal, in the bitstream, the residual of the CB. The encoder may determine an Integer Motion Vector (IMV) flag based on whether a magnitude of the non-null component of the BV may be a multiple of a BVD scaling factor, may multiply the magnitude of the non-null component of the BVD by the BVD scaling factor, and may signal the IMV flag in the bitstream.

The encoder may: based on the indication of flipping direction indicating horizontal flipping, determine, based on the width of the CB being greater than a width of the RB, an unavailable portion of one or more samples comprising the RB left of the CB; based on the indication of flipping direction indicating vertical flipping, determine, based on height of the CB being greater than a height of the RB, an unavailable portion of one or more samples comprising the RB above the CB; and, pad the unavailable portion of the one or more samples with replacement sample values. The encoder may determine the replacement sample values based on one or more of: copying samples from an available portion of the one or more samples comprising the RB into the unavailable portion of the one or more samples comprising the RB; copying neighboring samples into the unavailable portion of the one or more samples comprising the RB; copying samples determined by an intra prediction mode into the unavailable portion of the one or more samples comprising the RB; and/or copying a constant sample value into the unavailable portion of the one or more samples comprising the RB. The constant sample value may be one of a zero value or a midpoint value of valid sample values.

The encoder may determine a respective position of the CB relative to a boundary of the reference region and, based on the respective position of the CB being less than a respective dimension of the CB, may determine to skip (e.g., not perform) signaling of the at least one component of the BVD in the bitstream. The encoder may, based on the indication of flipping direction indicating horizontal flipping: determine that the respective position of the CB may be a horizontal position of the CB relative to a left-most boundary of the reference region left of the CB; determine the respective dimension to be equal to the width of the CB; and, based on the horizontal position of the CB being less than the width of the CB, set the at least one component of the BVD to be equal to zero. The encoder may, based on the indication of flipping direction indicating vertical flipping: determine that the respective position of the CB may be a vertical position of the CB relative to a top-most boundary of the reference region above the CB; determine the respective dimension to be equal to the height of the CB; and, based on the vertical position of the CB being less than the height of the CB, set the at least one component of the BVD to be equal to zero.

The indication of the magnitude of the at least one component of the BVD may further comprise an indication of the magnitude of the at least one component of the BVD being greater than zero. The encoder, based on the indication of the magnitude of the at least one component of the BVD being greater than zero, may further: determine to signal, in the bitstream, an indication of a remainder of the at least one component of the BVD; and, may signal, in the bitstream, the indication of the remainder of the at least one component of the BVD.

The example method discussed herein with respect to FIG. 26 may be used (e.g., applied) with respect to an MV and MVD used in inter prediction in addition or alternatively to a BV and BVD used in RRIBC. For inter prediction, the terms BV, BVD, and BVD candidate used in the example flowchart 2600 and described herein with respect to FIG. 26 may be replaced by the terms MV, MVD, and MVD candidate.

Figure 27:
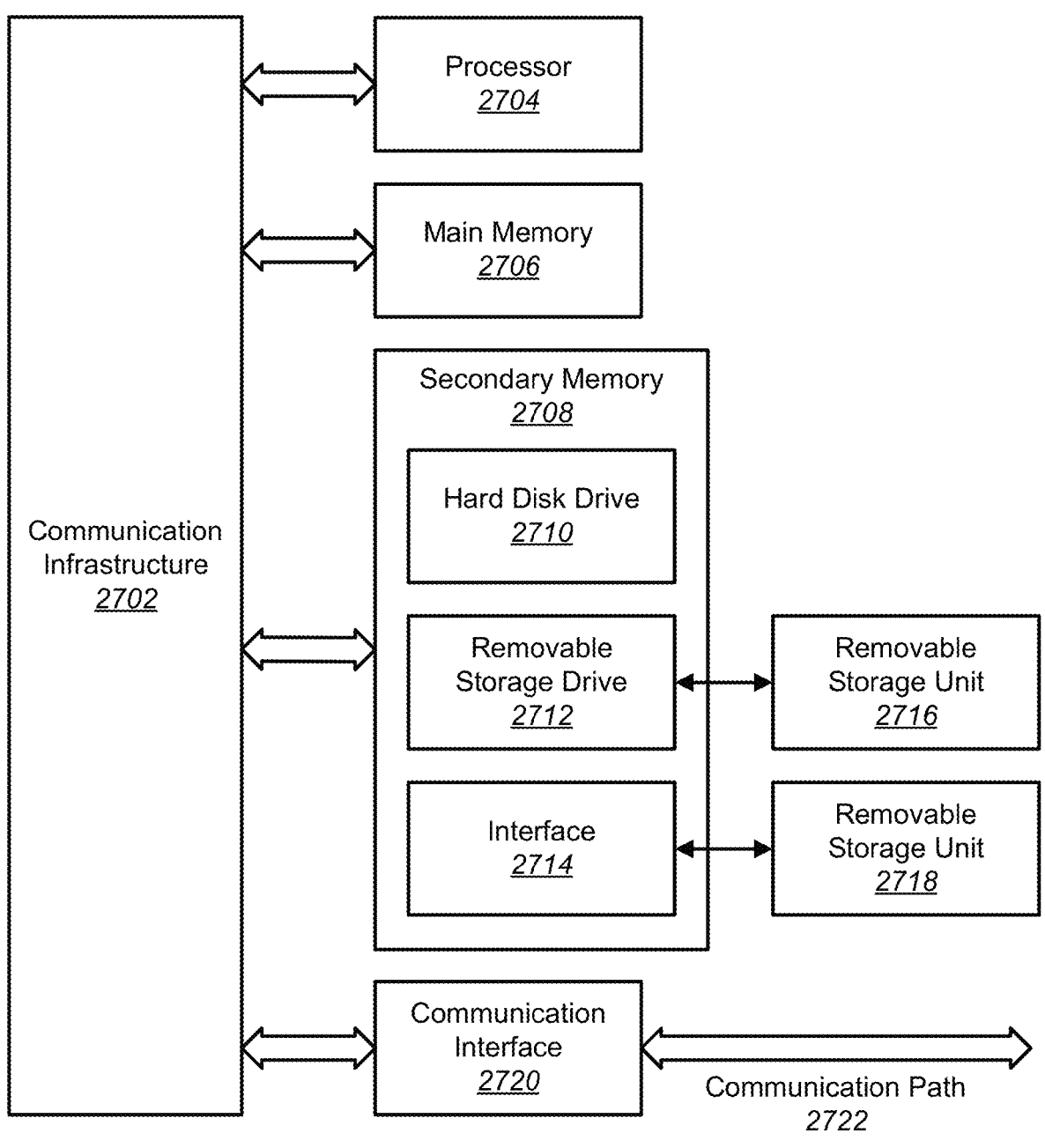
FIG. 27 shows a block diagram of an example computer system in which embodiments of the present disclosure may be implemented.

FIG. 27 shows an example computer system in which examples of the present disclosure may be implemented. For example, the example computer system 2700 shown in FIG. 27 may implement one or more of the methods described herein. For example, various devices and/or systems described herein (e.g., in FIGS. 1, 2, and 3) may be implemented in the form of one or more computer systems 2700. Furthermore, each of the steps of the flowcharts depicted in this disclosure may be implemented on one or more computer systems 2700.

The computer system 2700 may comprise one or more processors, such as a processor 2704. The processor 2704 may be a special purpose processor, a general purpose processor, a microprocessor, and/or a digital signal processor. The processor 2704 may be connected to a communication infrastructure 2702 (for example, a bus or network). The computer system 2700 may also comprise a main memory 2706 (e.g., a random access memory (RAM)), and/or a secondary memory 2708.

The secondary memory 2708 may comprise a hard disk drive 2710 and/or a removable storage drive 2712 (e.g., a magnetic tape drive, an optical disk drive, and/or the like). The removable storage drive 2712 may read from and/or write to a removable storage unit 2716. The removable storage unit 2716 may comprise a magnetic tape, optical disk, and/or the like. The removable storage unit 2716 may be read by and/or may be written to the removable storage drive 2712. The removable storage unit 2716 may comprise a computer usable storage medium having stored therein computer software and/or data.

The secondary memory 2708 may comprise other similar means for allowing computer programs or other instructions to be loaded into the computer system 2700. Such means may include a removable storage unit 2718 and/or an interface 2714. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 2718 and interfaces 2714 which may allow software and/or data to be transferred from the removable storage unit 2718 to the computer system 2700.

The computer system 2700 may also comprise a communications interface 2720. The communications interface 2720 may allow software and data to be transferred between the computer system 2700 and external devices. Examples of the communications interface 2720 may include a modem, a network interface (e.g., an Ethernet card), a communications port, etc. Software and/or data transferred via the communications interface 2720 may be in the form of signals which may be electronic, electromagnetic, optical, and/or other signals capable of being received by the communications interface 2720. The signals may be provided to the communications interface 2720 via a communications path 2722. The communications path 2722 may carry signals and may be implemented using wire or cable, fiber optics, a phone line, a cellular phone link, an RF link, and/or any other communications channel(s).

A computer program medium and/or a computer readable medium may be used to refer to tangible storage media, such as removable storage units 2716 and 2718 or a hard disk installed in the hard disk drive 2710. The computer program products may be means for providing software to the computer system 2700. The computer programs (which may also be called computer control logic) may be stored in the main memory 2706 and/or the secondary memory 2708. The computer programs may be received via the communications interface 2720. Such computer programs, when executed, may enable the computer system 2700 to implement the present disclosure as discussed herein. In particular, the computer programs, when executed, may enable the processor 2704 to implement the processes of the present disclosure, such as any of the methods described herein. Accordingly, such computer programs may represent controllers of the computer system 2700.

Figure 28:
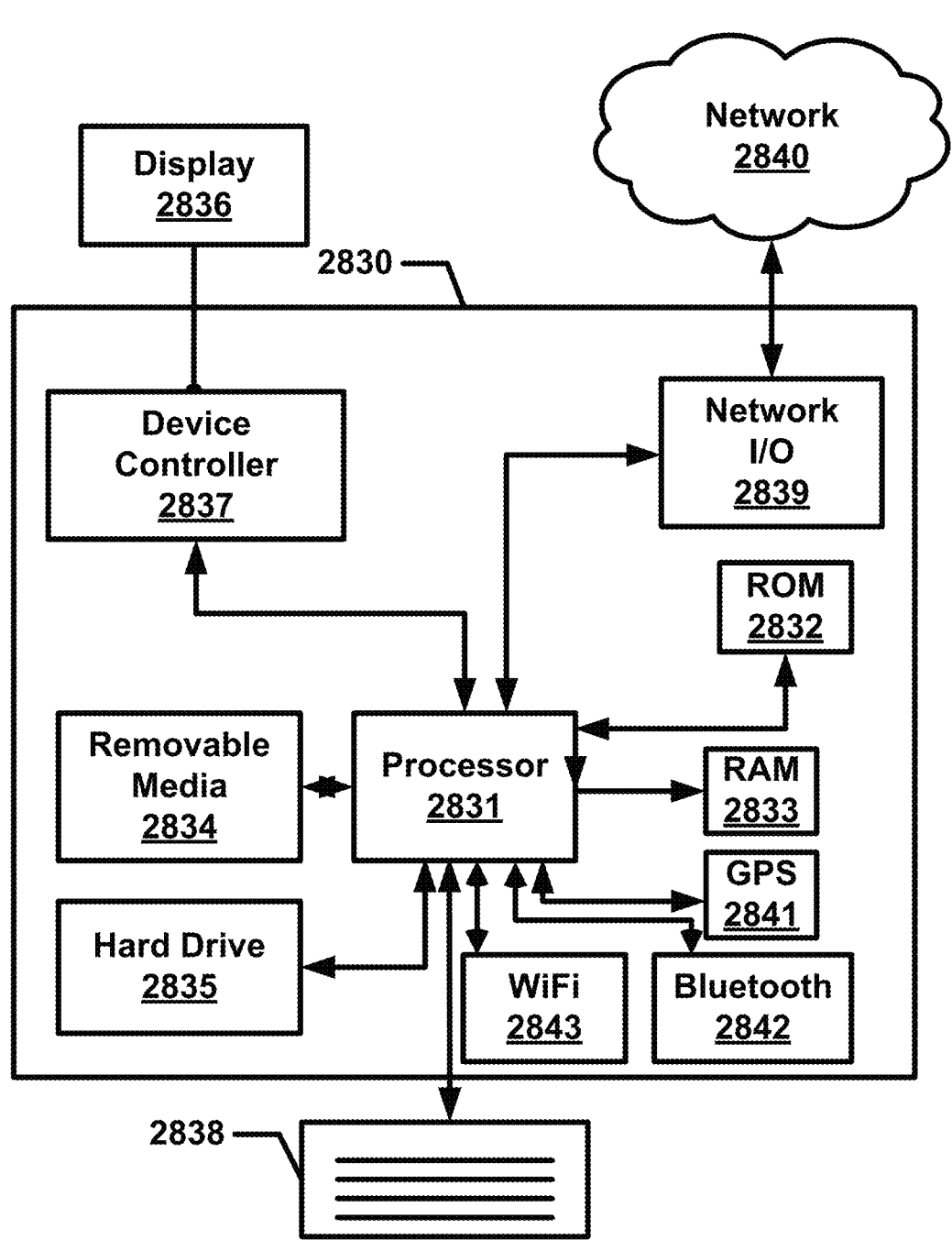
FIG. 28 shows example elements of a computing device that may be used to implement any of the various devices described herein.

FIG. 28 shows example elements of a computing device that may be used to implement any of the various devices described herein, including, for example, a source device (e.g., 102), an encoder (e.g., 200), a destination device (e.g., 106), a decoder (e.g., 300), and/or any computing device described herein. The computing device 2830 may include one or more processors 2831, which may execute instructions stored in the random-access memory (RAM) 2833, the removable media 2834 (such as a Universal Serial Bus (USB) drive, compact disk (CD) or digital versatile disk (DVD), or floppy disk drive), or any other desired storage medium. Instructions may also be stored in an attached (or internal) hard drive 2835. The computing device 2830 may also include a security processor (not shown), which may execute instructions of one or more computer programs to monitor the processes executing on the processor 2831 and any process that requests access to any hardware and/or software components of the computing device 2830 (e.g., ROM 2832, RAM 2833, the removable media 2834, the hard drive 2835, the device controller 2837, a network interface 2839, a GPS 2841, a Bluetooth interface 2842, a WiFi interface 2843, etc.). The computing device 2830 may include one or more output devices, such as the display 2836 (e.g., a screen, a display device, a monitor, a television, etc.), and may include one or more output device controllers 2837, such as a video processor. There may also be one or more user input devices 2838, such as a remote control, keyboard, mouse, touch screen, microphone, etc. The computing device 2830 may also include one or more network interfaces, such as a network interface 2839, which may be a wired interface, a wireless interface, or a combination of the two. The network interface 2839 may provide an interface for the computing device 2830 to communicate with a network 2840 (e.g., a RAN, or any other network). The network interface 2839 may include a modem (e.g., a cable modem), and the external network 2840 may include communication links, an external network, an in-home network, a provider's wireless, coaxial, fiber, or hybrid fiber/coaxial distribution system (e.g., a DOCSIS network), or any other desired network. Additionally, the computing device 2830 may include a location-detecting device, such as a global positioning system (GPS) microprocessor 2841, which may be configured to receive and process global positioning signals and determine, with possible assistance from an external server and antenna, a geographic position of the computing device 2830.

The example in FIG. 28 may be a hardware configuration, although the components shown may be implemented as software as well. Modifications may be made to add, remove, combine, divide, etc. components of the computing device 2830 as desired. Additionally, the components may be implemented using basic computing devices and components, and the same components (e.g., processor 2831, ROM storage 2832, display 2836, etc.) may be used to implement any of the other computing devices and components described herein. For example, the various components described herein may be implemented using computing devices having components such as a processor executing computer-executable instructions stored on a computer-readable medium, as shown in FIG. 28. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. The computing device may receive, from a bitstream, an indication of: flipping of a reference block (RB) for predicting a current block (CB); and a magnitude of at least one component of a block vector difference (BVD). The computing device may determine, based on the indication of flipping, a block vector (BV) offset value associated with a dimension of the CB. The computing device may determine a magnitude of a BV for restoring the BV based on: the BV offset value; and the indication of the magnitude of the at least one component of the BVD. The computing device may decode the CB based on the RB displaced from the CB by the BV. The computing device may determine, based on the indication of flipping, to skip parsing of a Block Vector Predictor (BVP) index from the bitstream. The computing device may determine, based on the indication of flipping, that a sign of the at least one component of the BVD is negative; or may determine, based on the indication of flipping, that a sign of the BV is negative, wherein the indication of flipping may further comprises an indication of flipping direction; and wherein the indication of flipping direction may be a Reconstruction-Reordered Intra Block Copy (RRIBC) direction flag or an Intra Block Copy (IBC) mirror mode direction flag; wherein the indication of flipping direction may indicate horizontal flipping or vertical flipping; and wherein the dimension of the CB may be a width of the CB or a height of the CB; wherein the indication of flipping may further comprise an indication of flipping direction. The computing device may determine, based on the indication of flipping direction indicating horizontal flipping, the BV offset value to be equal to the width of CB; or may determine, based on the indication of flipping direction indicating vertical flipping, the BV offset value to be equal to the height of the CB, wherein the indication of flipping may further comprise an indication of flipping direction, and wherein the decoding the CB may further comprise: receiving, from the bitstream, a residual of the CB; determining a reconstructed block based on combining the RB with the residual of the CB; determining, based on the indication of flipping, to flip the reconstructed block; flipping the reconstructed block in a direction relative to the indication of flipping direction; and decoding the CB based on the flipped reconstructed block; wherein the indication of the magnitude of the at least one component of the BVD may comprise an absolute value of a magnitude of a non-null component of the BVD. The computing device may determine, based on an Integer Motion Vector (IMV) flag indicated in the bitstream, a BVD scaling factor; and may multiply the magnitude of the non-null component of the BVD by the BVD scaling factor. The computing device may determine a position of the CB relative to a boundary of a reference region; and based on the position of the CB being less than a dimension of the CB, may determine to skip parsing of the at least one component of the BVD from the bitstream, wherein the indication of flipping may comprise an indication of horizontal flipping. The computing device may determine that a position of the CB is a horizontal position of the CB relative to a left-most boundary of a reference region; may determine a dimension of the CB to be equal to a width of the CB; and based on the horizontal position of the CB being less than the width of the CB, may set the at least one component of the BVD to be equal to zero, wherein the indication of flipping may comprise an indication of vertical flipping. The computing device may determine that a position of the CB is a vertical position of the CB relative to a top-most boundary of a reference region; may determine a dimension of the CB to be equal to a height of the CB; and based on the vertical position of the CB being less than the height of the CB, may set the at least one component of the BVD to be equal to zero, wherein the indication of the magnitude of the at least one component of the BVD further comprises an indication of the magnitude of the at least one component of the BVD being greater than zero; and the method further comprising: based on the indication of the magnitude of the at least one component of the BVD being greater than zero: determining to parse, from the bitstream, an indication of a remainder of the at least one component of the BVD; and parsing, from the bitstream, the indication of the remainder of the at least one component of the BVD; wherein the indication of flipping may be a Reconstruction-Reordered Intra Block Copy (RRIBC) type flag or an IBC mirror mode flag; wherein the constant sample value is one of a zero value or a midpoint value of valid sample values. A computing device comprising: one or more processors; and memory storing instructions that, when executed by the one or more processors, cause the computing device to perform the described method, additional operations and/or include the additional elements. A system comprising: a first computing device configured to perform the described method, additional operations and/or include the additional elements; and a second computing device configured to signal, in a bitstream, an indication of a magnitude of the at least one component of the BVD. A computer-readable medium storing instructions that, when executed, cause performance of the described method, additional operations and/or include the additional elements.

A computing device may perform a method comprising multiple operations. The computing device may receive, from a bitstream, an indication of flipping of a reference block (RB) associated with predicting a current block (CB); may determine a magnitude of a block vector (BV) based on: a BV offset value associated with a dimension of the CB; and an indication of a magnitude of the at least one component of a block vector difference (BVD); may decode the CB based on the RB displaced from the CB by the BV in a reference region; based on the indication of flipping direction, may determine an unavailable portion of one or more samples; and may pad the unavailable portion of the one or more samples with replacement sample values, wherein the indication of flipping may indicate horizontal flipping, and wherein the determining the unavailable portion of the one or more samples may comprise: determining, based on a width of the CB being greater than a width of the RB, the unavailable portion of the one or more samples comprising an RB left of the CB; wherein the indication of flipping may indicate vertical flipping, and wherein the determining the unavailable portion of the one or more samples may comprise: determining, based on a height of the CB being greater than a height of the RB, the unavailable portion of the one or more samples comprising an RB above the CB. The computing device may determine the replacement sample values based on at least one of: copying samples from an available portion of the one or more samples comprising the RB into the unavailable portion of the one or more samples comprising the RB. The computing device may copy neighboring samples into the unavailable portion of the one or more samples comprising the RB. The computing device may copy samples determined by an intra prediction mode into the unavailable portion of the one or more samples comprising the RB; or may copy a constant sample value into the unavailable portion of the one or more samples comprising the RB, wherein the indication of flipping may be a Reconstruction-Reordered Intra Block Copy (RRIBC) type flag or an IBC mirror mode flag; wherein the constant sample value is one of a zero value or a midpoint value of valid sample values. A computing device comprising: one or more processors; and memory storing instructions that, when executed by the one or more processors, cause the computing device to perform the described method, additional operations and/or include the additional elements. A system comprising: a first computing device configured to perform the described method, additional operations and/or include the additional elements; and a second computing device configured to signal, in a bitstream, an indication of a magnitude of the at least one component of the BVD. A computer-readable medium storing instructions that, when executed, cause performance of the method of the described method, additional operations and/or include the additional elements.

A computing device may perform a method comprising multiple operations. The computing device may determine candidate templates of respective reference block (RB) candidates, indicated by respective block vector difference (BVD) candidates, within a reference region; may determine, based on the candidate templates, to flip the respective RB candidates in a flipping direction for predicting a current block (CB); may compare samples in each of the candidate templates against samples in a current template of the CB to calculate respective costs, wherein a shape of at least one of the candidate templates matches a shape of the current template that is flipped in the flipping direction; may select, based on the respective costs, one of the BVD candidates as a BVD; may determine at least one component of the BVD based on: a block vector (BV) indicating the CB; and a BV offset value associated with a dimension of the CB; and may signal, in a bitstream, an indication of: flipping of the RB associated with predicting the CB; and a magnitude of the at least one component of the BVD. The computing device may determine, based on the indication of flipping, to skip signaling of a Block Vector Predictor (BVP) index in the bitstream. The computing device may, based on the indication of flipping indicating horizontal flipping, determine the BV offset value to be equal to a width of the CB; or based on the indication of flipping indicating vertical flipping, may determine the BV offset value to be equal to a height of the CB. The computing device may determine an Integer Motion Vector (IMV) flag based on whether a magnitude of a non-null component of the BV is a multiple of a BVD scaling factor; may multiply the magnitude of the non-null component of the block BVD by the BVD scaling factor; and may signal the IMV flag in the bitstream. The computing device may determine, based on the indication of flipping: that a sign of the at least one component of the BVD is negative; or that a sign of the BV is negative. The computing device may determine, based on the indication of flipping, to skip signaling of a Block Vector Predictor (BVP) index in the bitstream. The computing device may determine a respective position of the CB relative to a boundary of the reference region; and based on the respective position of the CB being less than a respective dimension of the CB, may determining to skip signaling of the at least one component of the BVD in the bitstream. The computing device may, based on an indication of flipping direction indicating horizontal flipping, may determine that the respective position of the CB may be a horizontal position of the CB relative to a left-most boundary of the reference region left of the CB; may determine the respective dimension to be equal to a width of the CB; and based on the horizontal position of the CB being less than the width of the CB, may set the at least one component of the BVD to be equal to zero. The computing device may, based on the indication of flipping direction indicating vertical flipping, determine that the respective position of the CB may be a vertical position of the CB relative to a top-most boundary of the reference region above the CB; may determine the respective dimension to be equal to a height of the CB; and based on the vertical position of the CB being less than the height of the CB, may set the at least one component of the BVD to be equal to zero, wherein the indication of the magnitude of the at least one component of the BVD may further comprise an indication of the magnitude of the at least one component of the BVD being greater than zero. The computing device may, based on the indication of the magnitude of the at least one component of the BVD being greater than zero, determine to signal, in the bitstream, an indication of a remainder of the at least one component of the BVD; and may signal, in the bitstream, the indication of the remainder of the at least one component of the BVD, wherein the indication of flipping may be a Reconstruction-Reordered Intra Block Copy (RRIBC) type flag or an IBC mirror mode flag, wherein the indication of flipping further may comprise an indication of flipping direction; wherein the indication of flipping direction may be a RRIBC direction flag or an IBC mirror mode direction flag; wherein the indication of the magnitude of the at least one component of the BVD may comprise an absolute value of a magnitude of a non-null component of the BVD; wherein the determining at least one component of the BVD based on the combination of the BV, indicating the CB, and the BV offset value based on the dimension of the CB may further comprise: determining, based on the indication of flipping direction indicating horizontal flipping, a non-null horizontal component of the BVD comprising a combination of a non-null horizontal component of the BV and the BV offset value; and determining, based on the indication of flipping direction indicating vertical flipping, a non-null vertical component of the BVD comprising a combination of a non-null component vertical component of the BV and the BV offset value. The computing device may determine a residual of the CB based on a difference between the CB and the RB; and may signal, in the bitstream, the residual of the CB. The computing device may determine an Integer Motion Vector (IMV) flag based on whether a magnitude of the non-null component of the BV is a multiple of a BVD scaling factor; may multiply the magnitude of the non-null component of the BVD by the BVD scaling factor; and may signal the IMV flag in the bitstream, wherein the constant sample value may be one of a zero value or a midpoint value of valid sample values. A computing device comprising: one or more processors; and memory storing instructions that, when executed by the one or more processors, cause the computing device to perform the described method, additional operations and/or include the additional elements. A system comprising: a first computing device configured to perform the described method, additional operations and/or include the additional elements; and a second computing device configured to decode the CB based on the RB displaced from the CB by the BV. A computer-readable medium storing instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
   receiving, by a computing device and from a bitstream, an indication of:
      flipping of a reference block (RB) for predicting a current block (CB) of content; and
      a magnitude of at least one component of a block vector difference (BVD);
   determining, based on the indication of flipping and based on a dimension of the CB, a block vector (BV) offset value; and
   determining a magnitude of a BV based on:
      the BV offset value; and
      the indication of the magnitude of the at least one component of the BVD; and
   decoding the CB based on the RB displaced from the CB by the BV.

2. The method of claim 1, further comprising:
   determining, based on the indication of flipping, to skip parsing of a Block Vector Predictor (BVP) index from the bitstream;
   determining, based on the indication of flipping, that a sign of the at least one component of the BVD is negative; or
   determining, based on the indication of flipping, that a sign of the BV is negative.

3. The method of claim 1, wherein the indication of flipping further comprises an indication of flipping direction; and wherein the indication of flipping direction is a Reconstruction-Reordered Intra Block Copy (RRIBC) direction flag or an Intra Block Copy (IBC) mirror mode direction flag.

4. The method of claim 3, wherein the indication of flipping direction indicates horizontal flipping or vertical flipping; and wherein the dimension of the CB is a width of the CB or a height of the CB.

5. The method of claim 1, wherein the indication of flipping further comprises an indication of flipping direction, the method further comprising:

determining, based on the indication of flipping direction indicating horizontal flipping, the BV offset value to be equal to a width of CB; or determining, based on the indication of flipping direction indicating vertical flipping, the BV offset value to be equal to a height of the CB.

6. The method of claim 1, wherein the indication of flipping further comprises an indication of flipping direction, and wherein the decoding the CB further comprises:

receiving, from the bitstream, a residual of the CB;

determining a reconstructed block based on combining the RB with the residual of the CB;

determining, based on the indication of flipping, to flip the reconstructed block;

flipping the reconstructed block in a direction relative to the indication of flipping direction; and decoding the CB based on the flipped reconstructed block.

7. The method of claim 1, wherein the indication of the magnitude of the at least one component of the BVD comprises an absolute value of a magnitude of a non-null component of the BVD.

8. The method of claim 7, further comprising:

determining, based on an Integer Motion Vector (IMV) flag indicated in the bitstream, a BVD scaling factor; and multiplying the magnitude of the non-null component of the BVD by the BVD scaling factor.

9. The method of claim 1, further comprising:

determining a position of the CB relative to a boundary of a reference region; and based on the position of the CB being less than a dimension of the CB, determining to skip parsing of the at least one component of the BVD from the bitstream.

10. The method of claim 1, wherein the indication of flipping comprises an indication of horizontal flipping, the method further comprising:

determining that a position of the CB is a horizontal position of the CB relative to a left-most boundary of a reference region;

determining a dimension of the CB to be equal to a width of the CB; and based on the horizontal position of the CB being less than the width of the CB, setting the at least one component of the BVD to be equal to zero.

11. The method of claim 1, wherein the indication of flipping comprises an indication of vertical flipping, the method further comprising:

determining that a position of the CB is a vertical position of the CB relative to a top-most boundary of a reference region;

determining a dimension of the CB to be equal to a height of the CB; and based on the vertical position of the CB being less than the height of the CB, setting the at least one component of the BVD to be equal to zero.

12. A method comprising:

receiving, by a computing device and from a bitstream, an indication of flipping of a reference block (RB) associated with predicting a current block (CB) of content;

determining a magnitude of a block vector (BV) based on:

a BV offset value associated with a dimension of the CB; and an indication of a magnitude of at least one component of a block vector difference (BVD);

decoding the CB based on the RB displaced from the CB by the BV in a reference region;

based on the indication of flipping direction, determining an unavailable portion of one or more samples; and padding the unavailable portion of the one or more samples with replacement sample values.

13. The method of claim 12, wherein the indication of flipping indicates horizontal flipping, and wherein the determining the unavailable portion of the one or more samples comprises:

determining, based on a width of the CB being greater than a width of the RB, the unavailable portion of the one or more samples comprising an RB left of the CB.

14. The method of claim 12, wherein the indication of flipping indicates vertical flipping, and wherein the determining the unavailable portion of the one or more samples comprises:

determining, based on a height of the CB being greater than a height of the RB, the unavailable portion of the one or more samples comprising an RB above the CB.

15. The method of claim 12, further comprising determining the replacement sample values based on at least one of:

copying samples from an available portion of the one or more samples comprising the RB into the unavailable portion of the one or more samples comprising the RB;

copying neighboring samples into the unavailable portion of the one or more samples comprising the RB;

copying samples determined by an intra prediction mode into the unavailable portion of the one or more samples comprising the RB; or copying a constant sample value into the unavailable portion of the one or more samples comprising the RB.

16. A method comprising:

determining, by a computing device, candidate templates of respective reference block (RB) candidates, indicated by respective block vector difference (BVD) candidates, within a reference region;

determining, based on the candidate templates, to flip the respective RB candidates in a flipping direction for predicting a current block (CB) of content;

comparing samples in each of the candidate templates against samples in a current template of the CB to calculate respective costs, wherein a shape of at least one of the candidate templates matches a shape of the current template that is flipped in the flipping direction;

selecting, based on the respective costs, one of the BVD candidates as a BVD;

determining at least one component of the BVD based on:

a block vector (BV) indicating the CB; and a BV offset value associated with a dimension of the CB; and signaling, in a bitstream, an indication of:

flipping of the RB associated with predicting the CB; and a magnitude of the at least one component of the BVD.

17. The method of claim 16, further comprising:

determining, based on the indication of flipping, to skip signaling of a Block Vector Predictor (BVP) index in the bitstream.

18. The method of claim 16, further comprising:

based on the indication of flipping indicating horizontal flipping, determining the BV offset value to be equal to a width of the CB; or based on the indication of flipping indicating vertical flipping, determining the BV offset value to be equal to a height of the CB.

19. The method of claim 16, further comprising:

determining an Integer Motion Vector (IMV) flag based on whether a magnitude of a non-null component of the BV is a multiple of a BVD scaling factor;

multiplying the magnitude of the non-null component of the block BVD by the BVD scaling factor; and signaling the IMV flag in the bitstream.

20. The method of claim 16, further comprising:

determining, based on the indication of flipping:

that a sign of the at least one component of the BVD is negative; or that a sign of the BV is negative.

* * * * *